(12) United States Patent
Weed et al.

(10) Patent No.: US 10,491,414 B1
(45) Date of Patent: Nov. 26, 2019

(54) SYSTEM AND METHOD OF PROVIDING A CONTROLLED INTERFACE BETWEEN DEVICES

(71) Applicant: WeedWare LLC, Vienna, VA (US)

(72) Inventors: John G. Weed, Fredericksburg, VA (US); Thomas M. Isaacson, Huntingtown, MD (US)

(73) Assignee: Weedware LLC, Vienna, VA (US)

( * ) Notice: Subject to any disclaimer, the term of this patent is extended or adjusted under 35 U.S.C. 154(b) by 0 days.

(21) Appl. No.: 16/298,649

(22) Filed: Mar. 11, 2019

Related U.S. Application Data

(60) Provisional application No. 62/641,726, filed on Mar. 12, 2018.

(51) Int. Cl.
*H04L 12/28* (2006.01)

(52) U.S. Cl.
CPC .................. *H04L 12/28* (2013.01)

(58) Field of Classification Search
CPC ........... H04L 12/2805; H04L 12/282; H04L 12/2807; H04L 12/24; H04L 41/0803; H04L 41/0806; H04L 41/069; H04L 29/06
See application file for complete search history.

(56) References Cited

U.S. PATENT DOCUMENTS

| | | | |
|---|---|---|---|
| 6,118,771 A | 9/2000 | Tajika et al. | |
| 7,260,833 B1 | 8/2007 | Schaeffer | |
| 8,700,772 B2* | 4/2014 | Saint Clair | ............ G05B 15/00 709/225 |
| 2003/0021281 A1 | 1/2003 | Tanaka et al. | |
| 2007/0024702 A1* | 2/2007 | Huang | ................. H04N 9/7921 348/83 |

* cited by examiner

*Primary Examiner* — Hanh N Nguyen

(57) ABSTRACT

A controlled interface includes a first component communicating with a first device via a network connection, a first media converter having a first media converter disabled transmit port and a first media converter receive port, the first media converter connected via a connection to the first component, a second media converter having a second media converter transmit port and a second media converter receive port, the second media converter connected via a third network connection to the first component. A second component communicates with the second device via a connection. A third media converter has a third media converter transmit port and a third media converter receive port. The third media converter communicates with the second component via a connection. A fourth media converter has a fourth media converter disabled transmit port and a fourth media converter receive port. The fourth media converter communicates with the second component via a connection and a fifth media converter has a fifth media convert disabled receive port and a fifth media converter transmit port. A spoofing fiber-optic signal is transmitted from the fifth media converter transmit port to both of the second media converter receive port and the third media converter receive port.

20 Claims, 23 Drawing Sheets

SYSTEM AND METHOD OF PROVIDING A CONTROLLED INTERFACE BETWEEN DEVICES

PRIORITY CLAIM

The present application claims priority to provisional application No. 62/641,726, filed on Mar. 12, 2018, the contents of which are incorporated herein by reference.

1. FIELD OF THE INVENTION

The present technology pertains to a controlled interface between a first device and a second device in a network that hides knowledge of the first device from the second device.

2. BACKGROUND

A media access control address (MAC address) of a device is a unique identifier assigned to network interfaces for communications at the data link layer of a network segment. MAC addresses are used as a network address for most IEEE 802 network technologies, including Ethernet and Wi-Fi. Logically, MAC addresses are used in the media access control protocol sublayer of the OSI (Open Systems Interconnection) reference model.

MAC addresses are most often assigned by the manufacturer of a network interface controller (NIC) and are stored in its hardware, such as the card's read-only memory or some other firmware mechanism. If assigned by the manufacturer, a MAC address usually encodes the manufacturer's registered identification number and may be referred to as the burned-in address (BIA). It may also be known as an Ethernet hardware address (EHA), hardware address or physical address (not to be confused with a memory physical address). This can be contrasted to a programmed address, where the host device issues commands to the NIC to use an arbitrary address.

A network node may have multiple NICs and each NIC must have a unique MAC address. Sophisticated network equipment such as a multilayer switch or router may require one or more permanently assigned MAC addresses.

MAC addresses are formed according to the rules of one of three numbering name spaces managed by the Institute of Electrical and Electronics Engineers (IEEE): MAC-48, EUI-48, and EUI-64. The IEEE claims trademarks on the names EUI-48 and EUI-64, in which EUI is an abbreviation for Extended Unique Identifier.

The US National Security Agency has a system that tracks the movements of everyone in a city by monitoring the MAC addresses of their electronic devices. As a result of users being trackable by their devices' MAC addresses, some companies like Apple have started using random MAC addresses in their iOS line of devices while scanning for networks. If random MAC addresses are not used, researchers have confirmed that it is possible to link a real identity to a particular wireless MAC address.

Many network interfaces (including wireless ones) support changing their MAC address. The configuration is specific to the operating system. On most Unix-like systems, the ifconfig command may be used to add and remove "link" (Ethernet MAC family) address aliases. For instance, the "active" ifconfig directive may then be used on NetBSD to specify which of the attached addresses to activate. Hence, various configuration scripts and utilities allow to randomize the MAC address at boot or network connection time.

Using wireless access points in service set identification (SSID)-hidden mode (see network cloaking), a mobile wireless device may not only disclose its own MAC address when traveling, but even the MAC addresses associated to SSIDs the device has already connected to, if they are configured to send these as part of probe request packets. Alternative modes to prevent this include configuring access points to be either in beacon-broadcasting mode, or probe-response with SSID mode. In these modes, probe requests may be unnecessary, or sent in broadcast mode without disclosing the identity of previously-known networks.

Even with a random address, hackers can obtain a MAC address and do much damage. When a hacker has a user's MAC Address and the hacker and the user both belong to the same Network, the hacker can spoof the router's MAC address and pretend to be the router. The hacker can steal the user's credentials by doing a "Man in the Middle" attack or attacks similar to that in which MAC address plays an important role. In another scenario, the hacker can pretend to be user and trick the user's router to authenticate the hacker. This normally happens in a two-way handshake, where an already authenticated device is sent a key which can be manipulated by MAC Address. Hackers have been able to hack into many different computer systems such as government systems, Target, and others seeking personal data and financial data.

In another scenario, a further issue is managing communications between different networks that have different security clearances. For example, one network within a government or enterprise might have a low-level of security and a second network might have a high level of security. Individuals on the different networks may desire to share information across the network. These different networks can be called security enclaves or can have different security class levels. Given the different networks, individuals cannot at-will from one network (say the low-level security network) be able access data or devices on the other network (the high security network). In some cases, the secure network is completely separated from outside networks or the Internet to ensure that it is unhackable to the extent possible with current and predictable emerging technologies. One way of being able to exchange data between such networks is to manually carry data into the secure network and manually type the data into the secure network. This manual process does not provide a real-time update of information on the secure network and would therefore not work in many scenarios where real-time data is desired to be provided to a secure protected enclave.

What is needed is an improved mechanism of protecting devices from hackers and other bad actors on a network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
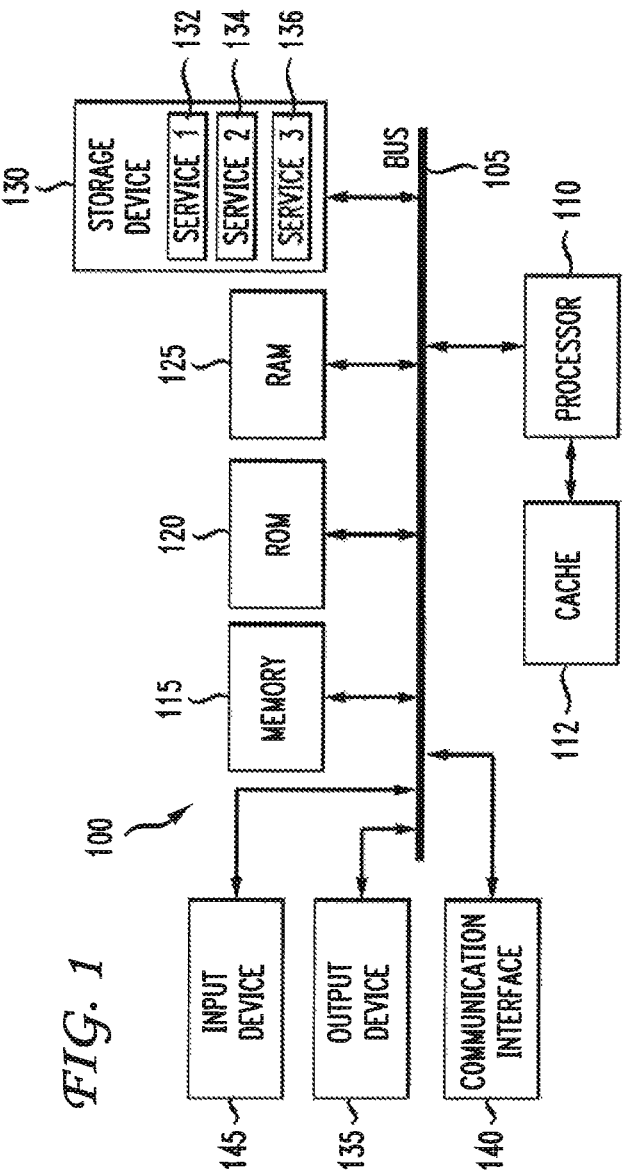
FIG. 1 illustrates an example computing device for use on any component disclosed herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Brief Overview

The present disclosure solves the problem of hackers being able to get access to a device on a network. There is a war on truth that is currently being waged and there is a companion war on a country or entity's ability to convey and preserve truthful information. Hostile enemies have been able to steal vital data from storage systems that seek to preserve that data. The Equifax hacking experience is one recent example. Enemies are able to breach communication networks and threaten the ability to control vital military, transportation and industrial operations. What follows is a disclosure of a way to make networks secure from hostile and unauthorized interference. This disclosure makes possible what has seemed to be impossible: Truly secure communication over the Internet that is invisible to everyone except the parties that are involved.

The controlled interface disclosed herein addresses this problem by providing a specific set of hardware components as controlled by software to prevent a system on a network to even identify or know that a device having a MAC address is even on the network, while at the same time, being able to transmit from and receive data at the device through the network with other devices. A controlled interface is disclosed for managing signals communicated between a first device and a second device. The controlled interface includes a first component communicating with the first device via a first network connection, a first media converter having a first media converter disabled transmit port and a first media converter receive port, the first media converter being connected via a second network connection to the first component, a second media converter having a second media converter transmit port and a second media converter receive port, the second media converter being connected via a third network connection to the first component, a second component communicating with the second device via a fourth network connection, a third media converter having a third media converter transmit port and a third media converter receive port, the third media converter communicating with the second component via a fifth network connection, a fourth media converter having a fourth media converter disabled transmit port and a fourth media converter receive port, the fourth media converter communicating with the second component via a sixth network connection and a fifth media converter having a fifth media convert disabled receive port and a fifth media converter transmit port.

A spoofing fiber-optic signal can be transmitted from the fifth media converter transmit port to both of the second media converter receive port and the third media converter receive port. In one aspect, the fifth media converter can include two spoofing media converters or sources of a fiber-optic signal, in which each spoofing media converter transmits a spoofing signal to the respective media converter.

The third media converter transmit port is connected to the first media converter receive port and the second media converter transmit port is connected to the fourth media converter receive port.

In one aspect, the controlled interface has only one spoofing media converter, and the signal from the spoofer media converter is split for transmission to two different devices. A splitter can receive the spoofing fiber-optic signal transmitted from the fifth media converter transmit port and splits the spoofing fiber-optic signal into a first spoofing fiber-optic signal and a second spoofing fiber-optic signal and sends the first spoofing fiber-optic signal to the second media converter receiver port and the second spoofing fiber-optic signal to the third media converter receive port. The production of a signal to be used to deceive one or more of the media converters into assuming that there is a bidirectional communication link with another device can occur in any number of ways. Any type of dummy signal can be provided to a receive port on the one or more media converters.

The fifth media converter can include a first spoofer media converter and a second spoofer media convert, wherein the first spoofer media converter provides a first spoofing fiber-optic signal to the second media converter receiver port and the second spoofer media converter provides a second spoofing fiber-optic signal to the third media converter receiving port.

Another aspect of this disclosure relates to a method embodiment. A method of communicating signals between a first device and a second device via a controlled interface includes the controlled interface including several features: (1) a first component communicating with the first device via a first network connection; (2) a first media converter having a first media converter disabled transmit port and a first media converter receive port, the first media converter connected via a second network connection to the first component; (3) a second media converter having a second media converter transmit port and a second media converter receive port, the second media converter connected via a third network connection to the first component; (4) a second component communicating with the second device via a fourth network connection; (5) a third media converter having a third media converter transmit port and a third media converter receive port, the third media converter communicating with the second component via a fifth network connection (6) a fourth media converter having a fourth media converter disabled transmit port and a fourth media converter receive port, the fourth media converter communicating with the second component via a sixth network connection; and (7) a fifth media converter having a fifth media convert disabled receive port and a fifth media converter transmit port. A spoofing fiber-optic signal transmitted from the fifth media converter transmit port is communicated to both of the second media converter receive port and the third media converter receive port. The third media converter transmit port can be connected to the first media converter receive port and the second media converter transmit port can be connected to the fourth media converter receive port.

With the above configuration, the method can include (1) storing at least one of a first low-level protocol address for the first device and a second low-level protocol address for the second device in the first component and the second component, (2) receiving a first signal from the first device at the first component, (3) transmitting, via the third network connection, the first signal to the second media converter for converting the signal to a first fiber-optic signal, (4) transmitting the first fiber-optic signal from the second media converter transmit port to the fourth media converter receive port for converting the first fiber-optic signal into a first received signal, (5) transmitting the first received signal to the second component via the sixth network connection and (6) transmitting the first received signal from the second component to the second device, via the fourth network connection. A single address can be stored which can correspond to both devices. In other words, the first address and the second address can be the same address.

The method can further include transmitting a second signal from the second device by: (7) receiving the second signal via the fourth network connection at the second component; (8) transmitting the second signal from the second component to the third media converter via the fifth network connection for conversion to a second fiber-optic signal; (8) transmitting the second fiber-optic signal from the third media converter transmit port to the first media converter receive port for conversion to a second received signal; (9) transmitting the second received signal from the first media converter to the first component via the second network connection; and (10) transmitting the second received signal from the first component to the first device via the first network connection.

An advantage of the controlled interface disclosed herein is that it can enable secure communication of data to and from a protected enclave such that real-time information can be provided to a secure system which can enable valuable processing, and reporting of data in many situations in which real-time data is extremely important. For example, war time asset management and strategy, banking contexts, and so forth are examples of scenarios were secure network enclaves would require real time data while maintaining a high confident level of security.

Another method example includes receiving data at a first component and from a first device, converting, via the first component, packet headers associated with the data into a low-level addressing configuration and transmitting the data according to the low-level addressing configuration to a fiber-optic component including at least one media converter and at least one spoofer media converter the provides a spoofing signal (fiber-optic or other type of signal) to at least one other media converter in the fiber-optic component The method further includes receiving the data from the fiber-optic component at a second component, converting, via the second component, from the low-level addressing configuration of the data to new packet headers into a protocol such as an IP protocol and transmitting the data with the new packet headers to a second device. The converting that occurs via the first component and/or the second component can occur via application of configured XML files (or other type of files) which identify IP addresses (or other addressing data) associated with the first device and the second device and associated low-level addressing data used for communicating data through the fiber-optic components.

This disclosure can include claims from the standpoint of any component or device disclosed herein. The controlled interface connects a first device to a second device using a novel structure and novel processes. Each device performs particular steps. Accordingly, the processes performed by any individual device, as well as signs received at or transmitted from any particular component can be the subject of a claim. All processes from the standpoint of any individual device are considered as within this disclosure even if not expressly described. This includes processes and interactions with a network-based system (feature 814 shown in FIG. 8). Thus, a "system" as described herein can include any component or group of two or more components that can be considered as part of the controlled interface between a first device and a second device.

Detailed Description

The disclosure now turns to FIG. 1, which illustrates an example computing system including various hardware components, which can be used to implement the system, depot, robot, server, communication device, or any other computing device disclosed herein.

In this example, FIG. 1 illustrates a computing system architecture 100 including components in electrical communication with each other using a connection 105, such as a bus. System 100 includes a processing unit (CPU or processor) 110 and a system connection 105 that couples various system components including the system memory 115, such as read only memory (ROM) 120 and random access memory (RAM) 125, to the processor 110. The system 100) can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general-purpose processor and a hardware or software service, such as service 1 132, service 2 134, and service 3 136 stored in storage device 130, configured to control the processor 110 as well as a special-purpose processor where software instructions are incorporated into the actual processor design. The processor 110 may be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include services 132, 134, 136 for controlling the processor 110. Other hardware or software modules are contemplated. The storage device 130 can be connected to the system connection 105. In one aspect, a hardware module that performs a particular function can include the software component stored in a computer-readable medium in connection with the necessary hardware components, such as the processor 110, connection 105, output device 135, and so forth, to carry out the function.

For clarity of explanation, in some instances the present technology may be presented as including individual functional blocks including functional blocks including devices, device components, steps or routines in a method embodied in software, or combinations of hardware and software.

The systems and methods disclosed herein address the problem of hacking into a device that is connected to a network by providing a controlled interface that enables communication of data between a first device and a second device on a network. The controlled interface can enable the ability of computer-generated data or manually generated data to be able to be provided, or communicated in real time to a protected enclave. For example, data gathered from social media exchanges could be provided to a secure government enclave through the use of the controlled interface disclosed herein. Such data can be utilized by the military or government agencies to track or evaluate such data for the purpose of identifying potential terrorist attacks.

Figure 2A:
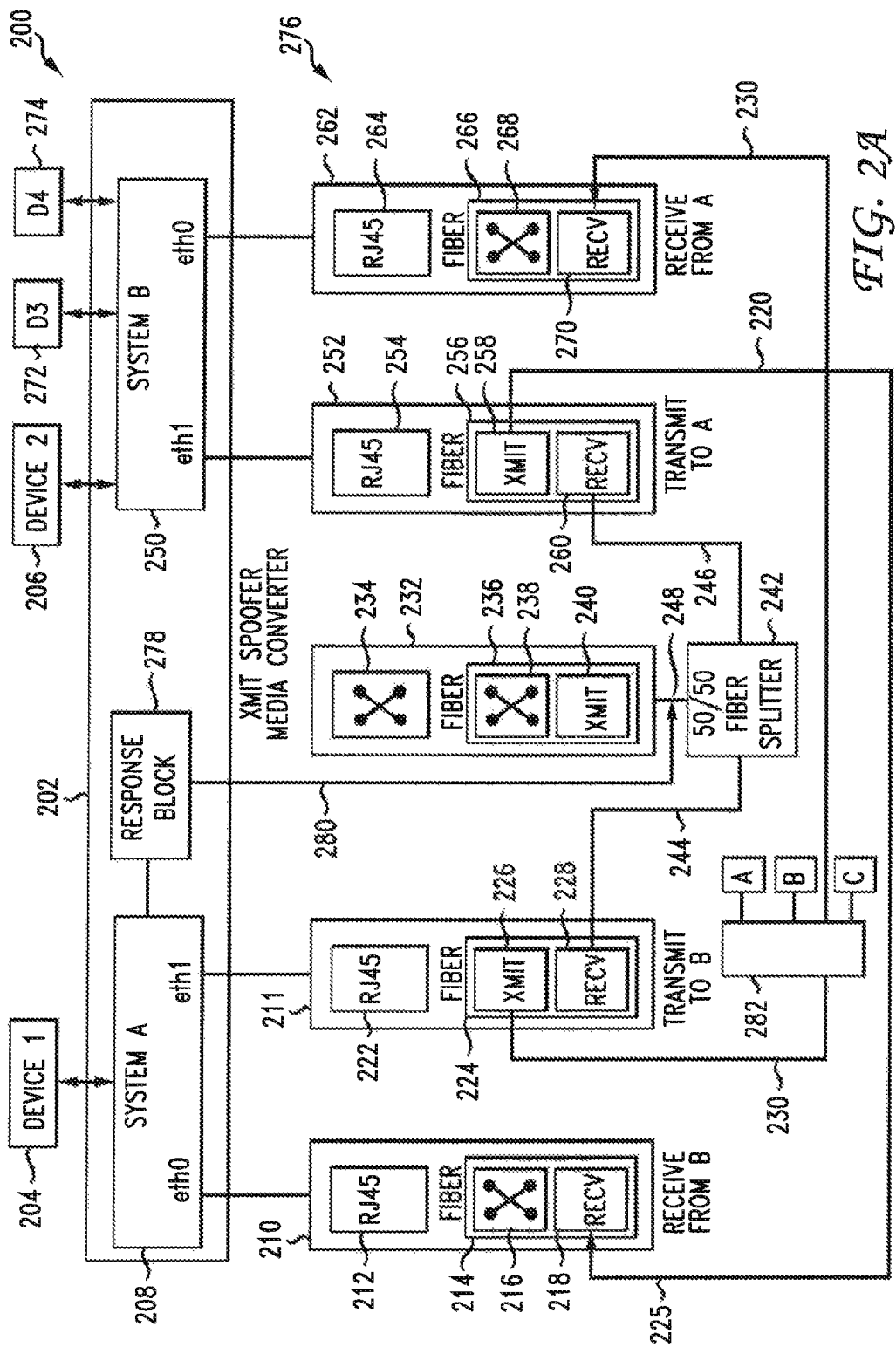
FIG. 2A illustrates the hardware components for a controlled interface.

FIG. 2A illustrates an example controlled interface device 200 having various components. The present disclosure solves the problem of hackers being able to get access to a device on a network. The controlled interface 200 disclosed herein addresses this problem by providing a specific set of hardware components as controlled by software to prevent a device on a network to even identify or know that a device having a MAC address is even on the network, while at the same time, being able to transmit from and received data at the device through the network with other devices. The controlled interface 200 is disclosed for managing signals communicated between a first device 204 and a second device 206. The controlled interface 200 includes a first component 208 communicating with the first device 204 via a first network connection, a first media converter 210 having a first media converter disabled transmit port 216 and a first media converter receive port 218, the first media converter 210 being connected via a second network connection to the first component 208. The first media converter 210 has a copper port 212, which can be, for example, in RJ45 type connection for connecting to, for example, an ethernet port of the first component 208. While an RJ45 standard twisted-pair connection is described, any physical network interface for connecting the media converter 210 with the first component 208 can be utilized. Generally speaking, the input to the media converter 210 via the ports 212 is the copper connection. Feature 276 in FIG. 2A generally represents the various media converters including the spoofing media converter. Feature 276 can be referred to as a fiber-optic component that includes at least one spoofer media converter or fiber-optic signal source and at least one other media converter, and preferably for other media converters, for bidirectionally communicating data between device 204 and device 206. Devices 208, 250 can also include ports (not shown, but they can be of any protocol or type) for receiving the initiation data (XML files or the like) to enable communication through the system.

A second media converter 211 has a second media converter transmit port 226 and a second media converter receive port 228, the second media converter 211 can be connected via a third network connection to the first component 208. Again, an RJ45 connection 222 can provide communication via a copper wire to an Ethernet port of the first component 208. A second component 250 can communicate with the second device 206 via a fourth network connection. A third media converter 252 can have a third media converter transmit port 258 and a third media converter receive port 260 as part of a set of fiber-optic ports 256. The third media converter 252 can communicate with the second component 250 via a fifth network connection. A fourth media converter 262 can have a fourth media converter disabled transmit port 268 and a fourth media converter receive port 270 as part of a set of fiber-optic ports 266. The fourth media converter can communicate with the second component 250 via a sixth network connection. A fifth media converter 232 can have a fifth media convert disabled receive port 238 and a fifth media converter transmit port 240 as part of its set of fiber-optic ports 236. The fifth media converter 232 has a disabled copper port 234.

A spoofing fiber-optic signal can be transmitted from the fifth media converter transmit port 240 to both of the second media converter receive port 228 and the third media converter receive port 260. In one aspect, the fifth media converter 232 can include two spoofing media converters or sources of a fiber-optic signal, in which each spoofing media converter transmits a spoofing signal to the respective media converter. The reason for this spoofing fiber-optic signal is that media converters usually work only when they are able to receive information without having timing issues. Thus, the second media converter 211 and the third media converter 252 need to be spoofed into thinking they have a traditional bidirectional connection, otherwise they will not transmit a signal.

The third media converter transmit port 258 is connected to the first media converter receive port 218 and the second media converter transmit port 226 is connected to the fourth media converter receive port 270.

In one aspect, the controlled interface has only one spoofing media converter, but needs to split the output signal for transmission to two different devices. A splitter can receive the spoofing fiber-optic signal transmitted from the fifth media converter transmit port 240 and splits the spoofing fiber-optic signal into a first spoofing fiber-optic signal and a second spoofing fiber-optic signal and sends the first spoofing fiber-optic signal to the second media converter receive port 228 and the second spoofing fiber-optic signal to the third media converter receive port 260.

The fifth media converter 232 can include a first spoofer media converter and a second spoofer media convert, wherein the first spoofer media converter provides a first spoofing fiber-optic signal 244 to the second media converter receive port 228 and the second spoofer media converter provides a second spoofing fiber-optic signal 246 to the third media converter receive port 260.

An example of the media converters used herein is the TX2FX-12 Ethernet media converter. The TX2FX-12 Ethernet media converter made by MPL that translates transmission signals from a twisted-pair 10/100/1000BASE-TX to a 100/1000BASE-X fiber-optic cable. It can expand network data transmission distances beyond the 100 meter limitation of copper wire, to over 10 kilometers by using single-mode fiber-optic cable.

Any standard Small Form-Factor Pluggable (SIP) transceiver module can be used on the fiber-optic port. These SFP transceivers modules are available in a variety of transmitter and receiver types. This feature allows users to select the appropriate module for the required fiber-optical interface. The TX2FX-12 Ethernet media converter provides automatic detection and initializing of the SFP Module (speed and full or half duplex operation) and read diagnostic LEDs for continuous status reports on network speed, traffic, and status of the fiber-optic port. The TX2FX-12 allows the use of standard RJ45 UTP/STP and various fiber-optic cables.

Several other features of the TX2FX-12 Ethernet media converter include Jumbo Frames support, Triple speed (10/100/1000 Mbit) copper Ethernet interface, Automatic detection and initializing of the SFP module (100 Mbit-FX, 1000 Mbit-X), Single wide power supply input (5 to 28V), a configurable flow control feature, a configurable link loss forwarding feature, a configurable link speed forwarding feature, 2 different mechanical versions and an extended temperature option. These features make the TX2FX-12 ideally suited for any industrial application. Through the low power consumption, robust, and flexible design, the product can be used in any embedded system.

The particular configuration of the copper to fiber media converter is configurable. For example, the copper port in the fiber-optical port can be placed side-by-side, in opposition to each other, facing each other, or in any other configuration. For example, there are several different versions of the TX2FX, including the TX2FX-11 with an RJ45 connection and SFP on the same side, the TX2FX-12 with the RF45 an SFP on the opposite side, the TX2FX-13 which has two RJ45's and one SFP ports and an unmanaged switch, and the TX2FX-14 which has 2 copper ports (an RJ45 and a 2 mm header) and one SFP which can be used as an unmanaged switch. The controlled interface can also utilize a plurality of different configurations of copper to fiber-optic media converters. While the TX2FX-12 Ethernet media converter is preferable for its rugged construction and available use in an extended temperature range (available from −40° C. up to +85° C.), any copper to fiber-optic media converter can be applicable to the present disclosure.

The basic communication of data between the first device 204 and the second device 206 will be described next. Assume that first data to be communicated from the first device 204 to the second device 206 is communicated to the first component 208 which transmits the first data through its eth1 port to the second component 250 at its Ethernet port eth0. The first data is communicated to the media converter 211 over a copper wire Ethernet connection and received at port 222. The first data is converted to a fiber-optic signal and transmitted out the transmit port 226 along fiber-optic cable 230 and received at the fourth media converters receive fiber-optic port 270. The first data is then converted from a fiber-optic signal to a copper signal and transmitted from the copper ports 264 to the input Ethernet port eth0 of the second component 250. The second media converter 211 will only transmit the first data from the fiber-optic transmit port 226 because it sees a fiber-optic spoofing signal 244 on its receive port 228. The second component 250 communicates the first data to the second device 206.

Assume next that the second device 206 desires to send second data from the second device 206 to the first device 204. The second data is communicated from the second device 206 to the second component 250. The second it is communicated via a copper wire from the Ethernet port eth1 of the second component 250 to the copper input 254 of the third media converter 252. The signal is converted to a fiber-optic signal and transmitted out the fiber-optic transmit port 258 of the third media converter 252. The fiber-optic signal embodying the second data is received at the receive fiber-optic input port 218 of the first media converter 210. The signal converted from a fiber-optic signal 2252, a copper signal and output the copper port 212 of the first media converter 210. The first component 208 receives the second data on the Ethernet port eth0 and communicates the data to the first device 204. It is noted that the third media converter 252 will not transmit the data out its fiber-optic transmit port 258 without the spoofing signal 246 being seen at the receive fiber-optic input port 260. It is a basic operation of the media converters that they will not transmit out of their fiber-optic transmit port unless they see the laser or the light source in their receive port, which gives them a basic confirmation of a bidirectional connection that is available. This functionality is part of the basic 802 communication protocol that was developed such as that in a fiber-optic communication system. The media converter, for timing purposes, must-see a bidirectional communication before transmitting a fiber-optic signal. A novelty disclosed herein is that the signal seen at the receive port of the second media converter 211 and the third media converter 252 is not actually the other side of a bidirectional communication but it is a spoof or fiber-optic signal. It is also noted that cutting off the spoofer fiber-optic signal is one mechanism of shutting down the communication in the controlled interface 200.

In one example, the first device 204 is a camera. Assume that the second device 206 will receive a video feed from the camera 204 and also need to provide controlling signals to the camera 204. In order to completely separate the camera 204 from the device 206, the XML files will be established in advance in the first component 208 and the second component 250. When the user of the second device 206 initiates a browser or other controlling software, they normally might enter the IP address of the camera 204 in order to communicate with the camera. In this disclosure, the device 206 does not know the IP address of the camera 204. However, the XML files in both the system 208 and system 250 will be configured, in advance, such that the user of device 206 can know that there is a camera with a particular name (such as "camera12" or any naming scheme or addressing scheme) that it desires to connect with. Thus, when the user enters the identifying data into a browser for the device 204 that is operating on device 206, the use of the various XML files that are preconfigured enables an initiation signal to be communicated from the system 250, stripped of its IP protocol carrier packet headers and reduced to a lowest level addressing protocol and transmitted through the fiber-optic component 276, through the system 208, which includes an XML file with the appropriate network address of the device 204 such that the data can be converted from a low-level addressing scheme to an IP protocol scheme for transmission to the camera 204. A "high-level" addressing scheme can include any protocol such as X.25 or an IP protocol. When the camera 204 responds with a confirmation signal, that signal can also be communicated back through the fiber-optic component 276 and back to the device 206. In this manner, bidirectional communication can be established between device 206 and a camera 204 such that each device does not have to have any knowledge of a high-level network address of the other device. There are a fair amount of simultaneous connections that need to occur, with timing issues as well, when the initial communication occurs between the device 206 and the device 204. The components 208 and 250 will build up the necessary database for establishing the bidirectional communication between the devices 204, 206. Multiple paths through the fiber-optic component 276 can be established for communicating audio, video, control signals, etc., between the devices 204, 206.

It is noted that in the controlled interface 200 shown in FIG. 2A, that the first media converter 210 does not need a spoofing signal because it only receives a fiber-optic signal 225 on its receive port 218. Similarly, the fourth media converter 262 does not need a spoofing signal because it also only receives a signal 230 at the receive port 270.

In one aspect, a link loss forwarding setting should be disabled on the fifth media converter 232. In preferable media converters, such features as flow control, link loss, forwarding, link speed, forwarding, as well as other features, can be configurable. Where link loss forwarding is configurable in the media converter, it should be disabled so that the media converter does not auto negotiate. Link loss forwarding can provide an instant notification of fiber segment link problems. For example, such a feature could allow indirect sensing of a fiber link loss via a 100 Base-TX UTP (unshielded twisted pair) connection. For example, if the media converter 232 were to detect a link loss condition on the receive fiber port (which is not configured to receive any fiber signal other than the signal from the spoofing media converter 232), it could disable its UTP transmitter so that a link loss condition will be sensed in the receive UTP port. The link loss can then be sensed and reported by a network management agent at a host equipment of a remote UTP port. In some media converters, this feature is enabled by default. One aspect of this disclosure requires the disabling of the link loss forwarding feature such that the spoofer media converter 232 will merely provide the necessary spoofing signal 248 for one or more other media converters to believe that they have a bidirectional fiber-optic connection.

Figure 4:
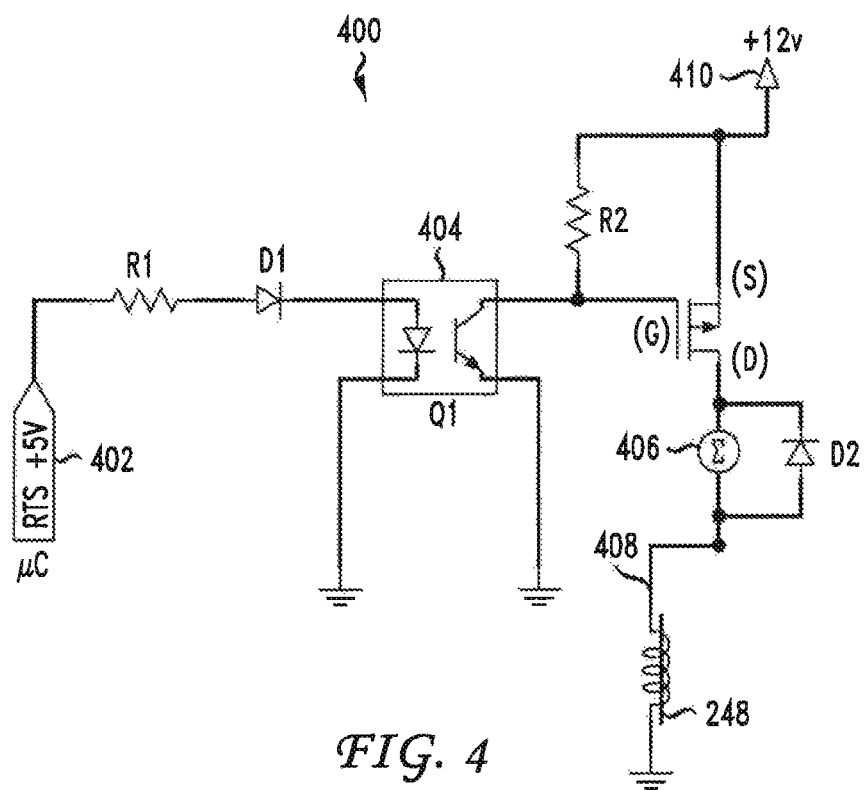
FIG. 4 illustrates hotwire response unit which can cut off a connection between a device and a network.

The hardware configuration in FIG. 2A enforces the isolation of the second device 206 from the first device 204. Another aspect of this disclosure relates to how, in an emergency situation, one can cut off the communication link between the first device 204 and the second device 206. Again, one could think of these devices as being in different network enclaves between a low security network enclave, where the first device 204 could exist, and a high-security network enclave where the second device 206 resides. If some issue were detected where the communicating link between these two devices should be removed, the response block 278 can provide a solution. FIG. 4 illustrates an example component which can detect or be triggered by an event and cause a signal 280 to be provided to the fiber-optic output 248 of the spoof or media converter 232 which can sever that fiber-optic cable 248. Thus, if an attempted hacking situation were to be detected, the response block 278 could provide a high amp signal 280, which could, for example, include a copper wrap around the fiber-optic cable 248 and physically sever the fiber-optic cable 248. With no spoofing signal 244 provided to the second media converter 211, it will cease to transmit from the transmit port 226. Similarly, with no spoofing signal 246 provided to the receive port 260 of the third media converter 262, it will also cease to transmit from its fiber-optic transmit port 258. Thus, severing the fiber-optic cable 248 will physically separate and cease all communication between the first device 204 and the second device 206.

In another aspect, a backup fiber interface 276 may be desirable. For example, as disclosed herein, several different types of triggering mechanisms could be employed to sever a fiber-optic line 248 transmitted from the spoofer media converter 232. For example, if a cover is accidentally slightly opened on a controlled interface 200 and the response block 278 causes a severing of the fiber-optic line 248 to occur due to detecting photons through the opening, the system could include a pre-connection to a backup fiber interface 276 between system 208 and system 250. In such a scenario, a switch or multiple switches could be provided which caused communications between system 208 and the original media converters 210 and 211 to be switched to an alternate set of media converters, an alternate spoofer media converter and further media converters to communicate with system 250. In this scenario, a threshold could be set such that if the fiber-optic link 248 is severed on accident, a signal could be provided to switch all the communications to an alternate set of media converters 276 for continued communication between device 206 and device 204.

In one aspect, setting up the XML files for establishing to a communication between a first device and the second device can be done graphically. FIG. 2C illustrates an example user interface 282 in which a first set of devices (device1, device2, device3) is on one side of a network and several other devices (device4 and device5, or a second set of devices) are on the other side of the network. Assume an administrator desires to establish secure connections between one or more devices of the first set of devices and one or more of the second set of devices. In one example, graphical interface 282 the user could drag and drop an icon associated with device2 onto a graphical component which identifies a secure communication 284. Dragging and dropping the icon associated with device2 can cause data associated with that device to be identified 286 for preparation of the XML file. Also shown in FIG. 2C is a user dragging and dropping device5 over the secure communication graphical component 284. This can cause an indication of addressing data for device5 to be shown 288. The user could confirm the configuration 290 via the graphical interface 282 which can then cause the generation of the appropriate XML files which can then be loaded on device 208 and device 250. More than one device in either enclave could be selected. Further graphical interfaces could be employed to select a level of control or of interaction between devices. For example, one device may only be able to view streaming data, while another device might be able to view a video stream and control a camera movement. The graphical interface could also be used dynamically for modifying XML files. The graphical interface 282 could represent the configuration of a current XML file, or XML files. Adjustments could then be made to one or more files using the graphical user interface. Accordingly, the graphical interface 282 can be utilized to either generate the initial XML files or to modify an existing XML file.

In this manner, the graphical user interface can be utilized to simplify the process of generating the multiple XML files which are then loaded onto device 208 and device 250 for secure communication between the chosen devices. The graphical interface 282 includes an icon associated with each of one or more devices in a first enclave, and an icon associated with each of one or more devices and the second enclave. The system receives user input, which identifies at least one device in the first enclave at least one device in the second enclave. The system identifies one or more of the following data associated with each of the devices chosen by the user: addressing information, naming information, network-based information, characteristics of each device, power consumption, control capabilities, audiovisual capabilities, network capacity data, computing power, operating system type, software functionality, and so forth. Any data associated with the device can be accessed as part of this configuration process. The system utilizes the configuration data for each device in each respective enclave to generate a first XML file associated with the first chosen device and a second XML file associated with the second device in the second enclave. The system may also simply generate data and update an existing XML file on the component 208 and component 250. The system then loads the respective XML files or updates respective XML files on the system 208 and the system 250, such that the chosen devices can communicate with each other, even though they are in different enclaves.

Figure 2B:
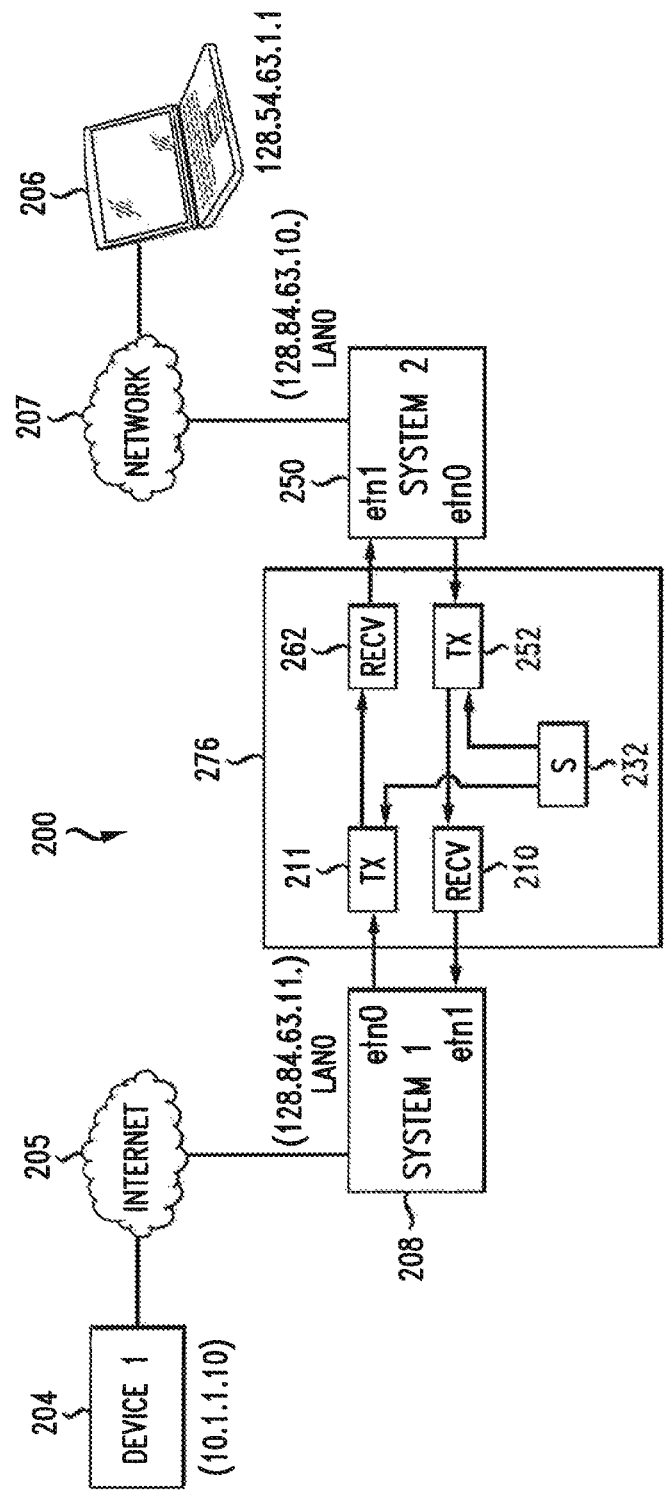
FIG. 2B illustrates a simplified hardware configuration for the controlled interface.
Figure 2C:
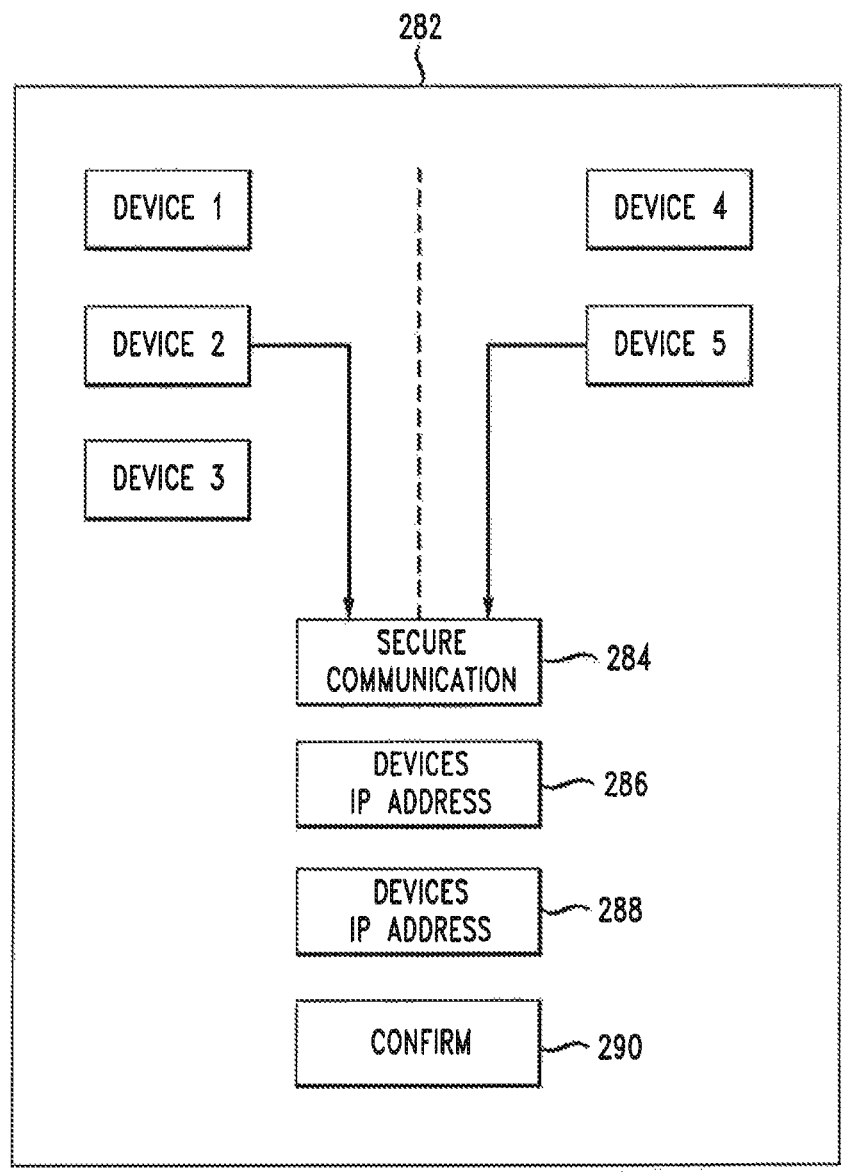
FIG. 2C illustrates a graphical interface.
Figure 2D:
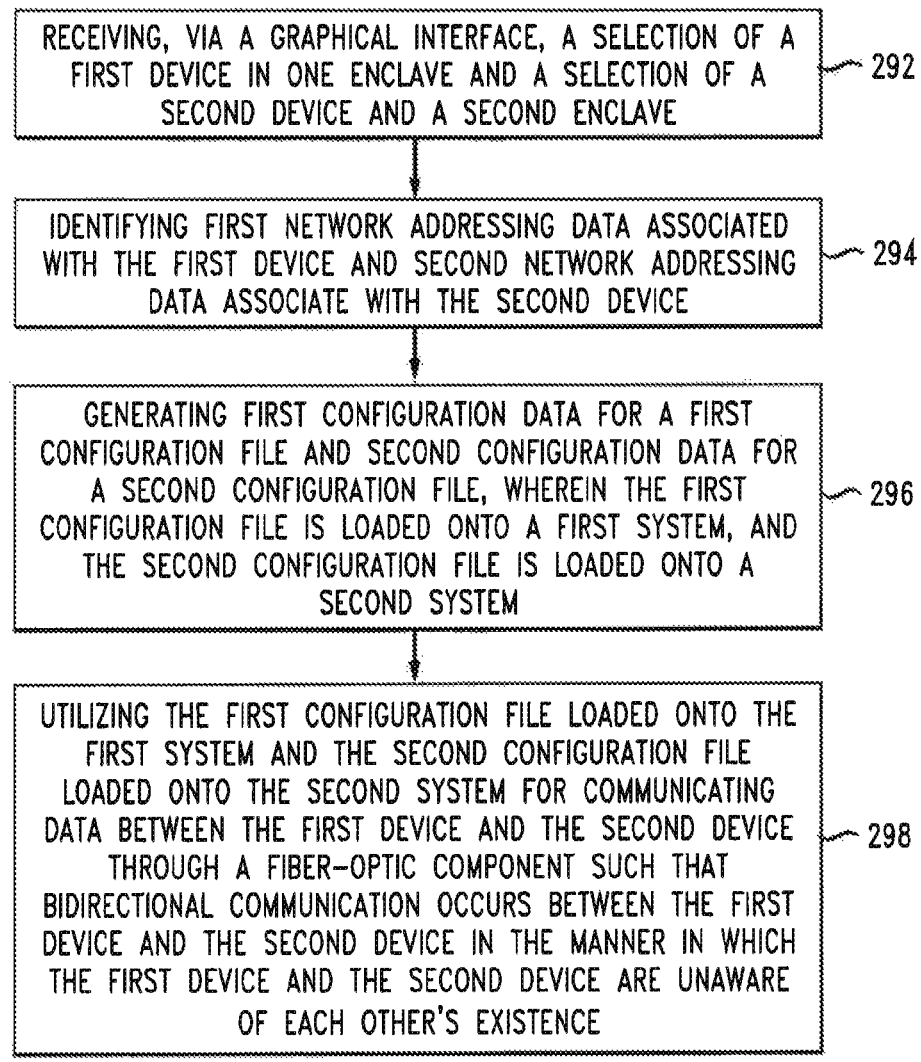
FIG. 2D illustrates a method embodiment.

FIG. 2D illustrates a method embodiment in this regard. The method includes receiving, via a graphical interface, a selection of a first device in one enclave and a selection of a second device and a second enclave (292), identifying first network addressing data associated with the first device and second network addressing data associate with the second device (294), and generating first configuration data for a first configuration file and second configuration data for a second configuration file, wherein the first configuration file is loaded onto a first system, and the second configuration file is loaded onto a second system (296). The method further includes utilizing the first configuration file loaded onto the first system and the second configuration file loaded onto the second system for communicating data between the first device and the second device through a fiber-optic component such that bidirectional communication occurs between the first device and the second device in the manner in which the first device and the second device are unaware of each other's existence (298).

In one aspect, all of the high-level addressing data as well as the low-level addressing data are configured in the respective XML files in advance. In another aspect, in the initiating step, only part of the addressing data is stored in the XML files. For example, the high-level addressing data may be initially recorded in the XML files for each of the first device and the second device that are going to communicate with each other. Upon initiation, the initial signals get transmitted from the first device to the second device and appropriate responses are received from the second device. The XML files may dynamically be built and other data can be provided that is necessary to achieve the bidirectional communication. For example, as the initial communication channels are established, at that time, low-level addresses might be assigned to the various streams.

Figure 3:
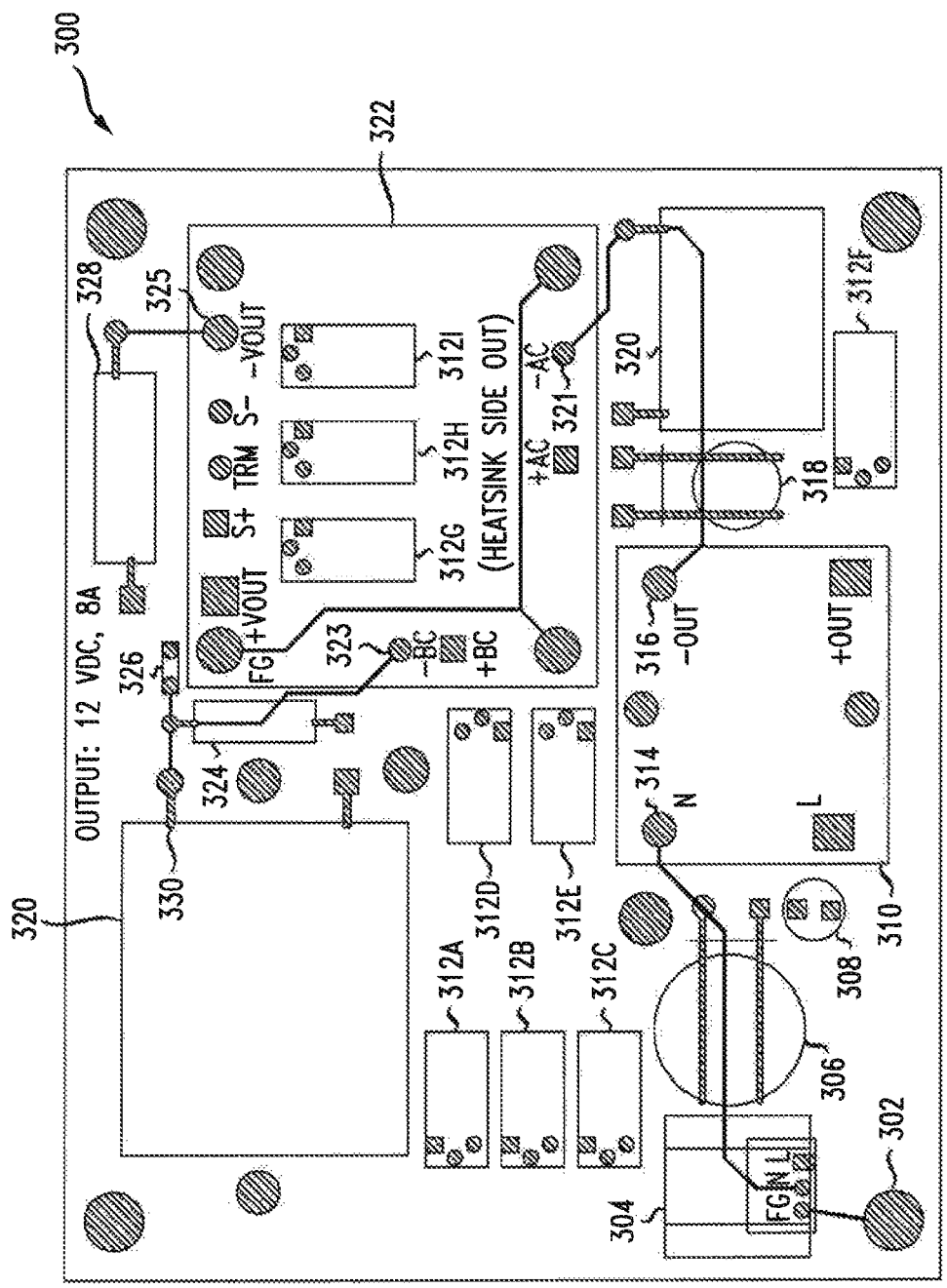
FIG. 3 illustrates another aspect of the hardware components for the controlled interface.

FIG. 3 illustrates an example AC/DC circuit 300 for providing DC power to one or more of the components disclosed in FIG. 2A. Alternating Current (AC) is provided at the input 302 at between 85-264 VAC. The AC input is received at an input device 304 at the FG terminal which can include a combination of a 3-position terminal block header, part No. 691305340003, provided by Wurth Electronics, or the like. The component 304 can also include a pluggable terminal block, part No. 69130433003 from Wurth Electronics, or the like. The output of terminal N is connected to a varistor, such as TMOV20RP300E, a thermally protected varistor provided by Mouser Electronics. A Fuse holder 308 can be provided such as MC/PCS provided by Digi-Key Electronics for protection of one or more components in the circuit 300. The signal from the varistor is provided to a terminal 314 of an EMI filter and single-phase AC/DC converter 310, such as the AIM1714BB6MC7D5T04 made by Vicor Corporation. The output of AC/DC converter 310 can be, for example, 24 Volts DC at output terminal 316. The output is provided to an NTC thermistor 318 such as, for example, thermistor 8D2-111C from Mouser Electronics. The thermistor 318 suppresses inrush current in the circuit which can protect the equipment from being damaged by limiting the inrush current. An inrush current is a surge current or switch on surge that represents a maximal instantaneous input current that can be drawn by an elliptical device, for example, when first turned on.

The output signal from the thermistor 318 can be provided to a film capacitor 320, such as an interference suppression film capacitor, part number BFC233914105, from Vishay, and the like. The output from the capacitor 320 is provided to an input 321 to an AC/DC power module 322 such as part No. TUNS100F12 from Cosel. The power module 322 provides the maximum output of 50.4 Watts with a DC output of 12V and 4.2 A. Depending on the power module desired, these numbers of course can change depending on which power module is applied. In one aspect, the heat sink of the module 322 is positioned outward. An output 323 from the −BC port of the power supply 322 is connected to component 324, part No. 500D47M450BB2A. The output of the FG port of power supply 322 is connected to an input of component 326, which can be, for example, a film capacitor such as Part No. BFC237051222, from Vishay, which provides an output. The output from component 326 is combined with an output from component 324 and input to an input terminal 330 of component 332, which can be an aluminum electrolytic capacitor, such as Part No. MLP201M420EA0A from Cornell Dubilier. The output 325 from power supply 322 is provided to a capacitor 328 such as Part No. MAL211890509E3 from Vishay. The final output from the capacitor 328 is about 12VDC and 8 A. This power is provided to one or more components.

Components 312A, 312B, 312C, 312D, 312E, 312F, 312G, 312H, 312I represent cable mounting accessory clips.

FIG. 4 illustrates the hotwire response circuit 278. A power supply provides a voltage, such as 5 V 402, to the circuit 400. The 5V can be connected to an RS 232 port of a computing device. A controller can initiate the signal to provide 5 V to the circuit 400. The circuit can generate 2000 degree heat via the wrapping 408 which is wrapped around the fiber-optic component 248. The circuit 400 works as follows. A first resistor R1 is provided in series which can be, for example, 1480 ohms. An example resistor is an RC55LF-D-140R-B-B resistor. The signal from the resistor R1 is provided to a diode D1, which can be, for example, a 1N4148 diode. The signal from the diode D1 is provided to an input port of a four PIN DIP phototransistor photo coupler (Q1) 404. For example, the TPC817 MB phototransistor photo coupler from Taiwan Semiconductor could be utilized. Two of the ports of the photo coupler 44 are provided to ground. The third output from the coupler 404 could provide the signal to resistor R2, which could be, for example, 10 k Ohms and be the RWPB03W010K0BS resistor, and to the gate G of a MOSFET (metal-oxide-semiconductor field-effect transistor), such as an FQP47P06 P0-Channel MOSFET from Fairchild Semiconductor. The source S terminal is connected to a 12V power supply 410 with a large number of amps available, such as 8 amps. The D terminal is connected to a summing circuit 406 in parallel with a diode D2 which can be, for example, the 1N4004G diode. The output copper wire 408 is shown as wrapped around the fiber-optic cable 248 from FIG. 2A. While a P-channel symbol for the MOSFET is shown in FIG. 4, any other type of transistor could be utilized as well. The basic function is that when the proper voltage is applied to the gate terminal, to increase the conductivity of the MOSFET, that a large current will flow from the 12V power supply 410 and cause the wire 408 to instantly heat up. Because the wire 408 (such as a nichrome wire that is very small and that heats up quickly due to the large amount of current flow) is wrapped around the fiber-optic cable 248, it will sever the fiber providing the spoofing signal and sever the communication between the first device 204 and the second device 206. The output 408 can also be provided to an explosive fuse or other component that disables the system. The circuit 400 generally provides the process of causing a large amount of current to flow from the 12V source through the MOSFET to the wire 408 for generating heat when the circuit 400 receives the 5V at resistor R1.

If the controlled interface 200 utilized two spoofer media converters 232, then the response block 278 could include wires 280 to each respective fiber-optic cable 248 from each respective spoofer media converter to sever the respective cable and eliminate communication between the devices. A single spoofer media converter 232 is preferable with the fiber splitter 242 to reduce power consumption and space needed for the components in the device 200.

One way of transmitting a signal from one device to another is similar to an RS232 serial approach. One could use a one-way diode to send a signal, for example, from the first device 204 to the second device 206. Using a one-way diode is a standard approach attempted by companies to address the problems outlined above. The problem with utilizing that approach is that whoever implements such a system would have to solve the problem of packetization and would have to arrive a particular protocol for communicating the data. Such an approach would take a lot of processor overhead to manage. Utilizing the approach disclosed herein enables the device 200 to take advantage of all of the features of the Ethernet protocol. Deploying the system enables the system to no longer worry about a protocol or methodology of framing data.

Since the connections disclosed in FIG. 2A are one-way connections, the only protocol that one would be able to use, if one is talking about a TCP/IP stack, would be UDP (the User Datagram Protocol), the most common protocol. The UDP protocol is a core member of the Internet protocol suite. It is formally defined in the RFC 768, incorporated herein by reference. With UDP, computer applications can send messages, in this case referred to as datagrams, to other hosts or computers on an Internet Protocol (IP) network or any other protocol. Prior communications are not required in order to set up communication channels or data paths.

UDP uses a simple connectionless communication model with a minimum of protocol mechanisms. UDP provides checksums for data integrity, and port numbers for addressing different functions at the source and destination of the datagram. It has no handshaking dialogues. There is no guarantee of delivery, ordering, or duplicate protection. If error-correction facilities are needed at the network interface level, an application may use the Transmission Control Protocol (TCP) or Stream Control Transmission Protocol (SCTP) which are designed for this purpose. In one aspect of this disclosure, however, no TCP/IP stack is loaded onto the first component 208 or the second component 250.

UDP is suitable for purposes where error checking and correction are either not necessary or are performed in the application; UDP avoids the overhead of such processing in the protocol stack. Time-sensitive applications often use UDP because dropping packets is preferable to waiting for packets delayed due to retransmission, which may not be an option in a real-time system.

An example of the application of UDP, in the absence of a TCP/IP stack loaded onto device 208 and device 250, is as follows. Assume streaming video is to be communicated from the first device 204 to the second device 206. As shown in FIG. 2A, the streaming video data would first be communicated to the first component 208. To enable this communication, the system 200 uses a particular addressing scheme. For example, the first component 208 can create a network address using a DECnet protocol. DECnet generally refers to a specific set of hardware and software networking products which implement the DIGITAL Network Architecture (DNA). The development of the DECnet architecture began in the early 1970s and has evolved over several phases. The protocol at one phase allowed for support of a network of up to 64,449 nodes with the datalink capabilities expanded beyond DDCMP (Digital Data Communications Message Protocol), to include Ethernet local area network support as the datalink of choice, expanded adaptive routing capability to include hierarchal routing (areas, level 1 and level 2 routers), VMScluster support, and host services. Later phases include support for architecturally unlimited networks as well as movement towards an open system architecture.

A protocol as disclosed herein has been developed based on the DECnet structure for enabling one or more data threads between the first component 208 and the second component 250 and through the fiber-optic circuit 276. The disclosed protocol cannibalizes some of the DECnet structure for purposes different from the intended purposes. For example, this disclosure describes using a portion of an addressing scheme that was intended for identifying a protocol type for addressing and identifying data streams through a fiber optic network. Any phase or structure of the DECnet or similar type of addressing protocol can be used herein.

The communication can be unidirectional or bidirectional. For a bidirectional communication, the system sets up addressing for two threads. The unique protocol utilizes in the packet header at least three data parameters. The first parameter is an address, the second parameter is a protocol type, and third parameter is a device name. A symbol, such as a dollar sign ($) or any other symbol, can be used to delineate between data types.

FIG. 2B illustrates a simplified version of the system of FIG. 2A. Assume by way of an example that the first device 204 is a video camera producing H.264 protocol (or other protocol like UDP) video streams. The video camera has an IP address of 10.1.1.10 and communicates with the first component 208, having an IP address of 10.1.1.11, via the Internet 205 or any other network. The second device 206 is a laptop that is to receive the video stream and has an IP address of 128.84.63.11. The second component 208 has an IP address of 128.84.63.10 and is in communication with the device 206 through a network 207.

This disclosure shall next step through the signal processing and addressing that is used as part of the process of connecting the device 206 with device 204 through the controlled interface 200. In general, it could be considered that device 204 is on a public network and device 206 is on a private network. Of course, any two networks or network types can also be applicable.

In one scenario, it is assumed the addressing scheme is identified in advance, such that device 206, for example, will be utilized to access and control device 204. Initially, the user device 206, desiring to access a camera 204, will enter in an IP address, and potentially a port number associated with the system 2 (250). Thus, the user may input into a browser input field an address like the following: HTTP://128.84.63.10:80. This IP address and port number of 80 represents the LAN0 port connection of the system 250. The system 250 essentially sets up a listening web services socket that can appear as a website or a camera to the device 206. Normally, if device 206 was going to communicate with device 204, the user would type in the IP address of the device 204 such that it would come up in the browser. However, that can't be done here. In this case, the user in a browser or interface of device 206 enters in the IP address of system 205. For example, the user may enter "PrivateNetwork:80" or "cicero:80" or "http://128.84.63.10:80." The initial data is sent utilizing the full IP protocol stack from device 206 to the LAN0 port of system 250. The full IP protocol stack is considered in one aspect as a "high-level addressing scheme." System 250 will include a file, such as an XML file, that will convert the data from a full IP protocol stack to a bidirectional limited protocol stack which is used to communicate data between system 208 and system 250 utilizing the fiber-optic component 276.

For example, an XML file on system 250 could include the following data: 128.84.63.11$LAN080<>AB.00.04.00.55.55$ETH020080

The left side of this data represents the IP address of the device 206, a delineator character "$" an identification of the LAN0 Ethernet connection and port 80. This data corresponds to the address information on the right side of this data pair. The portion of the data including "AB.00.04.00.55.5" can be termed the IP endpoint qualifier, which can be a series of octets separated by periods. The "protocol" or protocol type is the "20080" value in the addressing scheme which acts like a port number through the system, although it was not designed to be a port number.

The protocol used represents a modification of a DECnet addressing structure and is configured in a limited protocol stack or a low-level hardware addressing scheme. The protocol identifies in addressing scheme which can be utilized to identify different streams of data that are communicated through the fiber optic network 276. For example, the streams are identified via the output port ETH0 and a combination of the number data in the address. For example, each stream can be identified based on a combination of the "55.55" data plus the protocol type "20080". This addressing scheme uses the old "protocol type" field in the DECnet scheme to identify data streams for communicating through the network 276. The data "20080" could also be considered a device name associated with device 204. Any combination of the data fields within the addressing scheme can be utilized to identify specific data streams. Thus, millions of different data streams could be identified between the system 208 and the system 250 through the fiber-optic interface 276. In one aspect, the system could initially set up and assign one hundred addresses for the medications between device 204 and device 206. For example, the system could set up addresses 20080-20179 in preassigned those to the various communications between the devices. For example, this group of addresses could be used for communicating control signals, video signals, audio signals, pop up interfaces, payment communications, and so forth. Depending on the type of device that device 204 is, and the kinds of signals that would be communicated between device 204 and device 206, the system can set up any number of different addresses to handle the different types of communications between the devices. In one aspect, the various "ports" can be for an instruction to go infrared, a stream for a pop-up login window, and so forth. These ports can be dynamic and pop up to be used and then dropped.

Initially, the system 250 sends a create link request to the system 208 through the network 276 utilizing the addressing identified above. Once the system 208 receives the create link request, it will respond using a similar addressing scheme with a response signal. These are asynchronous communications. The response signal utilizes the same address: AB.00.04.00.55.55$ETH020080. If the network 205 is a public network and network 207 is a private network, this create link request can be considered a request from the private network to the public network for a communication path. Note that in system 208, that transmission from system 208 through the controlled interface 276 to the system 250 also is provided via the "ETH0" port. In another aspect, the Ethernet ports could be labeled differently. In this system, the ETH1 port is the receive port for both system 208 and system 250. Thus, the same addressing scheme can be utilized to transmit bidirectionally through the fiber-optic component 276 and between system 208 and system 250. The use of "the data 20080" can differentiate the port or address for the payload from the LAN port 80. Any other convention could be used. As can be appreciated, the concept disclosed, rather than connecting device 206 to device 204 using an Ethernet protocol, inserts a separate addressing scheme in the middle of a communication of data, which separate addressing scheme uses an old DECnet protocol such that the new identification of a "port" (using number 20080) uses the protocol type portion of the DECnet addressing scheme. Each different address (20081, 20082, etc.) looks like a unique interface port.

A response from the public side or from the network 205 side to the create link request will be a response using the same DECnet-based addressing scheme: AB.00.04.00.55.55$ETH020080.

While bidirectional communication is being established between system 208 and system 250, system 208 will create a communication link between the LAN0 port of system 208 and the device 204. This effort to create the link with device 204 is as instructed from the XML file. Assume the IP address of the LAN0 port of the system 208 is 10.1.1.11. System 208 sends a-connect-to-the camera request to establish that communication link. An XML file in system 208 can include the following mapping:

AB.00.04.00.55.55$ETH120080< >10.1.1.11$LAN080

This represents a mapping of data received on the ETH1port of system 208 having the addressing data identifying stream "55.55" (the address) and "20080" (the "protocol type") to the device at IP address 10.1.1.11 at the LAN0 Ethernet connection port 80. Note that the IP address used in the addressing could either be the IP address of the LAN0 port (10.1.1.11) or the IP address of the device 204 (10.1.1.10). This mapping enables device 208 to establish a bidirectional communication link between system 208 and device 204. If a range of one hundred addresses was set up for the vindication between device 204 and device 206, that same range would be set up in both system 208 and system 250. Once the bidirectional communication links between the various components is set up, then device 204 can communicate with device 206 through each of the system 208 and the system 250 such that conversions occur between the full IP protocol stack the bidirectional limited protocol stack for payload data is communicated between the two devices. In this structure, essentially everything in FIG. 2B below the network 207 and the Internet 205 is invisible to device 204 and device 206. The essentially believe that they are communicating with each other directly but they are not.

Once the pathways are established as described above, data can be communicated from the device 204 to device 206 and the following manner. The first component 208 can receive data from the camera 204 with the high-level addressing scheme or packet headers according to the full IP protocol stack (such as 10.1.1.10:80) and replaces the addressing scheme of the data with a new addressing scheme according to the limited protocol stack disclosed herein (AB.00.04.00.55.55$ETH020080). In one aspect, the requirements for one or more devices to communicate over a network with one or more other devices is identified in advance, such that the specific addressing structure can be established and configured within a file to enable the proper device to communicate with the other proper device. For security purposes, the XML file only establishes a single location for a source of data. The XML file, utilizing the addressing structure disclosed herein, identifies a single source of data and one or more destinations for data. Note that the addressing for transmission of data from either system 208 or system 250 is the same: AB.00.04.00.55.55$ETH020080. In other words, both use the ETH0 port to transmit data. This is by way of convention. Different ports could be used for transmission but it may simply cause some confusion. In this example, both components 208, 250 are configured to receive data on the ETH 1 port. The addressing scheme used for communicating between system 208 and system 250 through the controlled interface 276 is a virtual address scheme.

The low-level or limited protocol stack could be UDP, or any other protocol type and the name could also be any name. In this scheme, the component 208 will utilize the address and port number to send data to its ETH0 for transmission. The data according to the DECnet protocol is check-summed and appropriately blocked. The second component 250 needs to receive the data on its ETH1 port. This component 250 will bring up the link on its ETH1 port and indicates that it will only receive data on this port. Filters are set so that data is only received at the certain address and using the appropriate protocol.

For example, the component 250 could receive data and enable the routing of the data for the device 206 using the following entry in an XML file:

AB.00.04.00.55.55$ETH120080<>128.84.63.
10$LAN080

Note that the IP address used in the addressing could either be the IP address of the LAN0 port (128.84.63.10) or the IP address of the device 204 (128.84.63.11). The port address is used above. The software can instruct the second component 250 to set filters so that the system only receives data according to particular address and that protocol type. For example, component 250 will receive data on ETH1 with an address of "55.55" for protocol type "20080." Using the mapping above, the data will be sent to the LAN0 port 80 for communication to device 206. This approach uses low-level hardware addressing rather than the more complicated TCP/IP stack. With the low-level hardware addressing, the system does not use a MAC address or an IP address in order to establish source and destination ports within the system 200. The data (payload) received by the second component 250 at port ETH1 can then be configured via the IP protocol stack and for the LAN output port of the second component 250 and transmitted to the second device 206 at IP address 128.84.63.11. Utilizing this approach, the device 204 is only aware of the IP address 10.1.1.11 of the first component 208. The device 204 does not know the MAC address or IP address of the second device 206 nor does it need to know.

Using this approach, the system can provide multiple different threads between devices. For example, component 250 could store the following mappings for data received from the device 206 and to be delivered ultimately to the device 204:

128.84.63.11$$LAN080<>AB.00.04.00.55.55$ ETH020081
    128.84.63.11        $LAN080<>AB.00.04.00.55.55$ ETH020082
    128.84.63.11        $LAN080<>AB.00.04.00.55.54$ ETH020080

Many more mappings could be stored as well. Corresponding data in an XML file on component 208 could be established as follows:

10.1.1.10$LAN080< >AB3.00.04.00.55.55$ETH120081
    10.1.1.10$LAN080< >AB.00.04.00.55.55$ETH120082
    10.1.1.10$LAN080< >AB.00.04.00.55.54$ETH120080

Again, note that the IP address could be the LAN0 address or the device address, depending on how the addressing is configured. Thus, for example, if a user of device 206 was to have access to three different cameras, each represented as device 204, then the system could establish three ports (like port 80, 81 and 82) or sets of data in the XML files. The files would all be set up and the user of device 206 would be told which addresses to use to access the three cameras. The addresses would get the user to the proper port of system 250, after which the user would have no idea of the IP addresses beyond that point in the system.

It is noted that there are various structures for this low-level hardware addressing approach, which could identify one of multiple addresses for a thread of data including identification of an Ethernet port, a protocol type, a device name, a communication protocol, and so forth. It is also noted that the protocol type (not a port strictly speaking) is used to communicate data. Thus, for communicating data in the controlled interface 276, the system does not use "ports" for the various data streams, but uses protocol types. The IP stack has no idea what the use of these protocol types mean in that the use of the protocol types in the addressing scheme is unusual and different from the standard meaning of the fields of the DECnet protocol structure. In one aspect, whatever the port number is for LAN0 in system 250, the software running on system 250 can add 20,000 to that port number for the protocol type to use for communicating payload through the controlled interface 276.

When the handshakes occur between the various devices, rejections can be transmitted if there are issues with any respective effort to establish a link.

The addressing, protocol type, and/or device name for the particular devices that will communicate through the system can be established in advance via an XML file. For example, as is shown in FIG. 2A, assume that a camera 204 is to communicate data to multiple devices 206, 272, and 274. In some scenarios, the data received from the camera 204 could include audio data, video data, text data, metadata, video, formatting data, control signals, and so forth. Such data can be received at the first component 208 or the second component 250 according to an IP protocol. X.25 or any other communication protocol. In other words, the data would have associated metadata or other data contained within packet headers which identify IP addresses associated with a source host and the destination host. Typically, the IP protocol is responsible for addressing hosts, encapsulating data into datagrams that can include such components as fragmentation and reassembly, and routing datagrams from a source host to a destination host across a network. The Internet protocol defines the format of the packets and the addressing system. The header of a datagrams can include such information as source IP addresses, destination IP addresses, or any other data needed to route and deliver the datagram. The actual data to be delivered is called the data payload. The process of nesting the data payload in the packet with the header can be called encapsulation. The header structure, of course, does not have to relate to the OSI model or IP addressing. The system could utilize X.25 or RDP (Remote Desktop Protocol) or any other protocol for communicating data.

In one aspect, the first component 208 and the second component 250 store files such as XML files that are utilized after the component 208 strips away the header information associated with a payload to eliminate the IP addresses or other metadata that might be utilized to identify or deliver the payload. The encapsulation of a payload can include a link layer with frame header information, frame data in a frame footer, it can include an Internet layer which can include an IP header and IP data, and it can include a transport layer with a UDP header and UDP data as well as an application layer, which can include just the data. The first component 208 and/or the second component 250 will receive a datagram with a header and a payload and will strip away the header structure. Thus, IP addresses, and any other metadata will be stripped away from the data payload. Using the stored file, the respective component will assign a low-level address to the data so that it can properly be communicated through the network of media converters 276.

In one aspect, each type of data that is received from a device is communicated to the system with its own address. For example, the audio data could use address AB.00.04.55.55$ETH020080 and the video data could use AB.00.04.55.56$ETH020080. The number of available addresses according to this protocol can be in the order of 65,535×65,535 (FFFF×FFFF). Again, the addressing scheme uses a combination of the "55.55" fields and the protocol type or device field "20080" in the addressing above. This represents how large the number of virtual threads the system can be established through the controlled interface 276. The threads used for communication between devices can be set up in advance and reserved or can be dynamically set up such that the devices 208, 250 negotiate over the new addressing schemes for new devices coming on line.

In many scenarios, particular devices will be controlled through the use of the controlled interface 200. Accordingly, where the device to be controlled and the controlling or monitoring devices are known, and XML file can be established in advance to enable the specific bidirectional communication and control of the device. Where there are multiple networks that receive the data, as shown by feature 282 in FIG. 2A, the addressing can be used to direct the data to the appropriate device A, device B, and/or device C. Each of these devices can be on the same network or different networks or enclaves. Block 282 can represent a "dumb" hub, not a switch, that will not seek to interpret the packets it receives but will just multi-cast the received data to each of devices A. B and C. This broadcast could be configured likely in advance (for example, in an XML file) for a multicast of the data on line 230 to the various devices. UDP multicast can be used, for example, such that the network can replicate the packet received to reach the multiple receivers A, B, C, etc. In the addressing scheme, AB.00.04.00.55.55.55$ETH020080, the value of "B" can indicate that this is a multicast or broadcast payload or packet. Thus, if block 282 receives the payload with an addressing scheme with a "B" in the proper position, the block will broadcast the packet to all the other ports according to the switch. For a point-to-point communication through the controlled interface 276, the addressing scheme can be changed to AA.00.04.00.55.55$ETH020080, where the "B" is replaced with an "A" for sending unicast packets.

In another aspect, assume the device 206 desires to surf the web utilizing the controlled interface 200 for protection from hacking. In one basic example of the use of the controlled interface, XML files are established with the necessary data to identify devices that source data and the devices that receive the data within the network. The XML file establishes the sources of data and the destinations of data through the controlled interface 200 using the lower-level (DECnet type) addressing scheme. For generalized Internet surfing, it may not be possible to a priori identify all of the websites that the user may access. Accordingly, several solutions can be provided to solve this issue.

One solution can be to utilize a separate device or service which provides a database of websites which are commonly searched. This solution is described first with respect to device 272 performing functions to coordinate and update XML files. Later in this disclosure, FIG. 8 will illustrate another network-based server that also provides a dynamic approach to configuring XML files and to connect devices through the controlled interface 200. Device D3 272 in FIG. 2A can represent a first example of such a service. A trusted source can identify safe websites and enable the device 206 to only serve and access websites that are authorized by the service 272. In this regard, the service 272 may store, for example, 10,000 safe websites such that as the device 206 navigates to any particular websites such as www.facebook.com or www.amazon.com, that the proper low-level addressing can be utilized to transmit and receive data to and from the selected respective website. The system can control what network-based websites a user could access via the use of the XML files.

In another aspect, assume the dynamic evaluation process is configured within a service, such that when the device 206 utilizes an Internet browser to access a site not currently set up in an XML file is being a trusted established device, the service 272 can provide the following operations. The service 272 to do a preliminary evaluation of the site and whether the site is dangerous. A service 272 could access the site and determine whether cookies are downloaded or any attempts to hack the device 206 are experienced. The service 272 could access other databases with information about the site as well. After having completed a review process of the new site, if there are issues identified with respect to the site, then the device 206 could be prevented from accessing the new site. On the other hand, when the service 272 confirms that the new site is safe, then an XML file, or other data file associated with the control interface 200, can be updated such that the appropriate IP addresses, low-level addresses, protocol types, device names, and so forth can be added to the first component 208 and the second component 250. In this manner, the user can then dynamically be able to access the new site through the control interface 200. Utilizing a service 272, as described above would likely require authorization by the administrator, since any kind of access to the XML files disclosed herein can represent a potential security breach.

In another aspect, each individual site could be provided with an encrypted key or other kind of identification, which can be utilized to enable access from the device 206, behind the controlled interface 200.

The following is an example of a device 206 accessing a server on the internet, such as at www.facebook.com which would reside on a device 204. The user experience of navigating a website requires an exchange of information back and forth between a browser operating on the device 206 into which the user clicks on items, menus, posts, etc. The click information is transmitted through the controlled interface 200 to the Facebook server 204 which then responds with the new structure of the user interface based on the received interactions. Video may start to stream as part of the user clicking on a video in their Facebook news feed. Thus, the question is how does the controlled interface 200 handle such bidirectional communications in that each type of data (control, video streaming, click data, etc.) will require a separate path through the controlled interface 200. Again, the purpose of the structure 200 is to enable the user on device 206 to access in both transmit data to and receive data from a device 204 which can be a camera, a server, or any other computing device on a network.

The user of device 206 typically needs to be able to log into the device 204. The user of device 206 will use a browser to type in the address or URL of the device 204. For example, the user may type in 172.168.3.50:12345, or may just type in www.facebook.com. That data is received by the second component 250 or system B, which indicates to the second component 250 that the user of device 206 is seeking to establish a connection with the device at IP address 172.168.3.50. Preloaded into the XML files of the second component 250 is the use of one or more sets of low-level hardware addresses for use in communicating between the second component 250 and the first component 208. The second component 250 identities one or more of the low-level hardware addresses and sends the request through the third media converter 252 to the first media converter 210, which request is received by the first component 208. The first component 208 references its XML files and determines that the data received, according to the particular low-level hardware address or addresses used is for the device at 172.168.3.50 (which may be www.facebook.com). The first component 208 then transmits the initiation signal to the device 204. Once communication is established with the device 204 at the appropriate IP address, data can be received from the device 204 at the first component 208 for transmission through the controlled interface 200. The initial process of establishing the bidirectional communication includes a round robin approach. This round robin approach involves establishing each separate path through the fiber-optic component 276 in connection with the data in the respective XML files so that the system establishes that each respective path is properly configured. If the system that is set up, however, is unidirectional, the system may just come up without a round robin approach of confirming bidirectional communication for each path. The system can utilize an Ethernet link level connection, which does not represent any user data, but in an initial 46 bytes of data that is used to establish a basic bidirectional communication link. For each thread in a bidirectional link, the system has a requirement that one side be able to communicate with the other side. To create all the XML threads through the network, the system will transmit a basic signal to the device having the bidirectional link and it will wait until there is a path through the network to the device and thereby establish all of the XML files for communication with that device.

Each thread of data (control signal, graphical data, video data, text data, audio data, metadata, and so forth) can have its own set of low-level hardware addresses for communication between the first component 208 and the second component 250.

As can be appreciated, pre-configuring the XML files in the manner described herein enables the first component 208 to only have knowledge of IP addresses or MAC addresses of devices, such as device 204, on its network. When the first component 208 transmits data through its eth1 port to the media converter 211, it does not know anything beyond that transmission. There is no mechanism of the first component 208 to be able to identify or access the device 206. Similarly, the device 206, by virtue of the establishment of the XML files stored on the second component 250, will have no capability of identifying or directly reaching out to device 204. The controlled interface 200 fully separates device 204 and device 206 from each other from the standpoint of a MAC address, an IP address or any other high-level addressing scheme. They will never know that the other device exists.

Here is another example of the data in an XML file that outlines the various pieces of data:
_AB.00.04.00.12.34    $eth11234:_27.156.198.43$_tcp 42670:_AB.00.04.00.12.35$eth2 1235:

In this regard, the first component 208 and the second component 250 perform the functionality of receiving data from a device on their network and converting that data from having an IP type address to only including a low-level hardware addressing scheme which enables the data to be transmitted through the controlled interface 200. The first component 208 and the second component 250 can manage hundreds and thousands of different data streams, each data stream having an independent addressing component.

We now return to the example of the device 204 being initiated for communication with device 206. The first component 208 transmits a request to establish a communication with device 204. The device 204 will respond with the standard IP protocol responses. The first component 208 and the second component 250 will work quickly to establish a stack of the various ports and addresses necessary to communicate bidirectionally between the device 206 and the device 204. Timing elements can be incorporated into this process inasmuch as timeouts can occur in some cases. A reestablishment of the communication link may be necessary. Each type of data utilizes a different low-level hardware address according to the addressing scheme disclosed herein for identifying the path used between the first component 208 and the second component 250.

Assume video starts to be streamed from the device 204. The video is transmitted through the controlled interface, as described herein, and to the browser on device 206 such that the user can view the video. The data is transmitted via one or more paths through the network of media converters 276. If the user desires to change the device 204 by controlling the video camera (zoom, move, etc.), or clicking on a buy button, or performing any other action that causes a control signal to be sent to the device 204, that control signal will be sent through the network of media converters 276 in the manner disclosed herein on a path identified by a separate address. All the information to be exchanged is extracted from the IP protocol carrier and reduced to the lowest possible level of signaling (or a low-level of signaling) with the low-level hardware addressing scheme.

In another aspect, the XML file for a particular camera 204 can be established such that one device, 206 can initiate a connection to the camera 204 and log into the camera and control its movement, zoom, and so forth. Another device 272 or device 274 can be set up with a different set of protocols such that those devices can only receive the video feed. Thus, by breaking up each data path such that a different low-level hardware address is used for that path through the controlled interface 200, the system can be established to control which devices are enabled to use certain pathways of data. Thus, device 272 and device 274 could be set up to only receive a video stream, but not be provided with the capability of providing control signals. Absent a programming of the XML file to enable control signals to be received from device 272, or device 274, there would simply be no mechanism or pathway which could be identified to transmit such control signals through the controlled interface 200 to the camera 204. In this regard, the structure of the XML files can be such that capabilities of devices 204, 272 and 274 can be tailored and configured differently with respect to viewing, hearing, controlling and any other interactive feature or function associated with communication with the device 204. The XML files can also restrict how many simultaneous communication channels are available for any particular device through the fiber-optic component 276.

In one aspect, the low-level hardware addressing scheme utilized herein is a connectionless addressing scheme. It is connectionless in the sense that data is transmitted from the Ethernet ports of system 208 and system number 250 into the fiber-optic component 276 without the need of a handshake or the establishment of a bidirectional communication. This is in contrast to a connection-oriented communication network approach in which a communication session or a semi-permanent connection is established in advance of the transmission of any data.

An example rule set is provided in Appendix A which outlines an example structure to manage the novel formatting and device naming convention disclosed herein. This rule set outlines how the TCP (Transmission Control Protocol), UDP (User Datagram Protocol), UDP multicast and Web Services qualifiers can be set up and applied in the controlled interface 200. As can be seen in the example rule set, the various fields within the addressing and device naming convention can be established in the file including reference to TCP, UDP, UMC, iws1, iwc1, eth1, eth2, eth3 and eth4. Note too that the "element name" of "port" has a minimum value of 0 and a maximum value of 65,535. This field in the structure enables a large number of different pathways which can be identified through the controlled interface 200 for many data streams. Any web service technology that is utilized for machine-to-machine communication can be utilized. A web service is typically a software system designed to support interoperable machine-to-machine interaction over a network. Each respective web service can have an interface described in a machine-processable format (specifically WSDL (web services description language)). Other systems interact with the web service in a manner prescribed by its description using SOAP (Simple Object Access Protocol)-messages, typically conveyed using HTTP with an XML serialization in conjunction with other web-related standards. The addressing scheme described herein can apply to any web services format for connecting network endpoints or ports.

Figure 5:
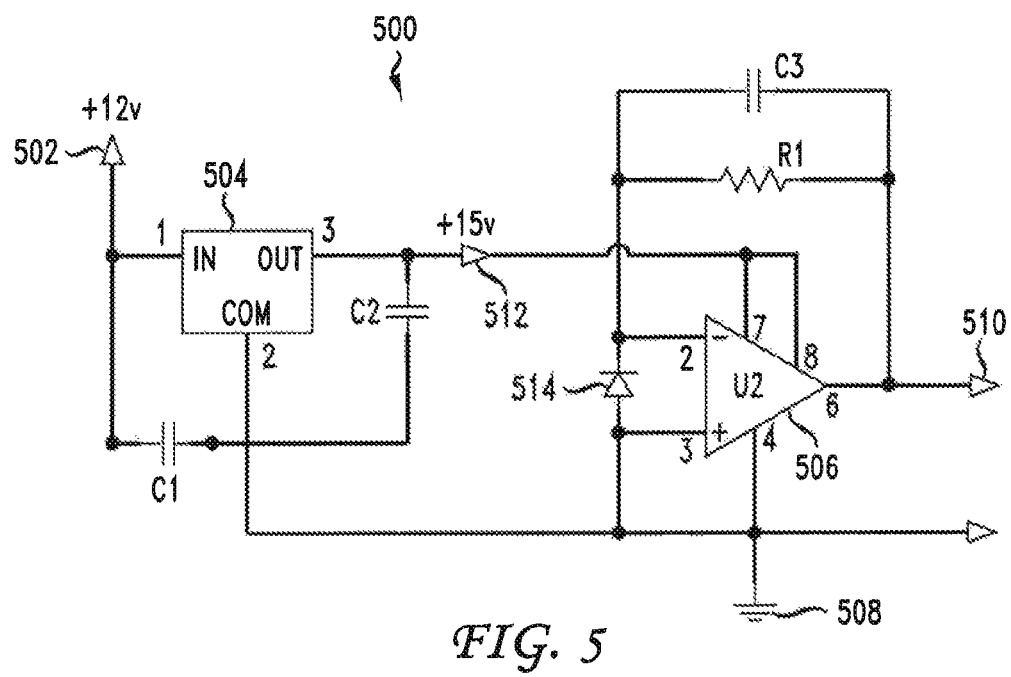
FIG. 5 illustrates light sensitive component which can cut off a connection between a device and a network at a detection of light.

FIG. 5 illustrates an example circuit 500 which can trigger an action based on sensitivity to light. This can component can be represented by feature 278 in FIG. 2A. An example of the application of the light-sensitive circuit 500 can be the following. Assume that the example circuit is configured within the enclosure of the controlled interface 200. It might be desirable to prevent hacking to cause the circuit to completely stop working or to have some other action occur if somebody tries to break into the outer container of the circuit. Assume a light-sensitive circuit 500 is positioned inside a container. Assume a person tries to break in to view the interior circuitry of the controlled interface 200. That scenario, the circuit 500 could cause the fiber output 248 from the spoof media converter 232 to instantly break due to the instant heat generated by the nichrome coil around the fiber-optic line 248. The output could also be connected to explosives, or some other mechanism that could destroy one or more components of the controlled interface 200. This circuit 500 can be triggered by just a few photons.

The light-sensitive circuit 500 is powered by a power source 502 of typically 12V. The 12V is connected to an input port 1 of component 514 which can be a linear voltage regulator, such as part No. LM78L15 from Texas Instruments. A ground port 2 is connected to ground 508. A capacitor C1, which can be, for example, Part No. 222-339-24105, is provided between the 12V input and ground 508. The output 3 from the voltage regulator 504 is provided to a thermistor 512 which can be, for example, Part No. 8D2-11LC, with the output also connected to ground through a capacitor C2 which can be, for example, part No. MLP201M420EA0A. The voltage out of the thermistor is 15V. The 15V signal can be provided to an input 7 and 8 of component 506, which can be, for example, an operational amplifier TLC271CP from Texas Instruments. The terminals 3 and 4 of the component 506 are connected to ground and diode 514 connects terminal 3 to terminal 2. Terminal 2 of the component 506 is connected through resistor R1 (which can be, for example, MOX-7509231008FE) and capacitor C3 (which can be, for example. Part No. 80-C410C101J5G, or a 10 pF, 50V capacitor) to the output terminal 6 to generate the output signal 510. The function of this circuit is to provide an output signal 510 to cause an event to happen upon a small amount of light being detected by the circuit 500.

The light circuit can also detect infrared light and any other light frequency in order to prevent access to the inner components in a dark location. For example, someone could use some type of night vision device in order to circumvent the light-sensitive security circuit. Also, the circuit can include a bypass device which would disable this security feature in order to allow authorized repair personnel to perform necessary maintenance. Biometrics could be used to bypass the device.

Figure 6:
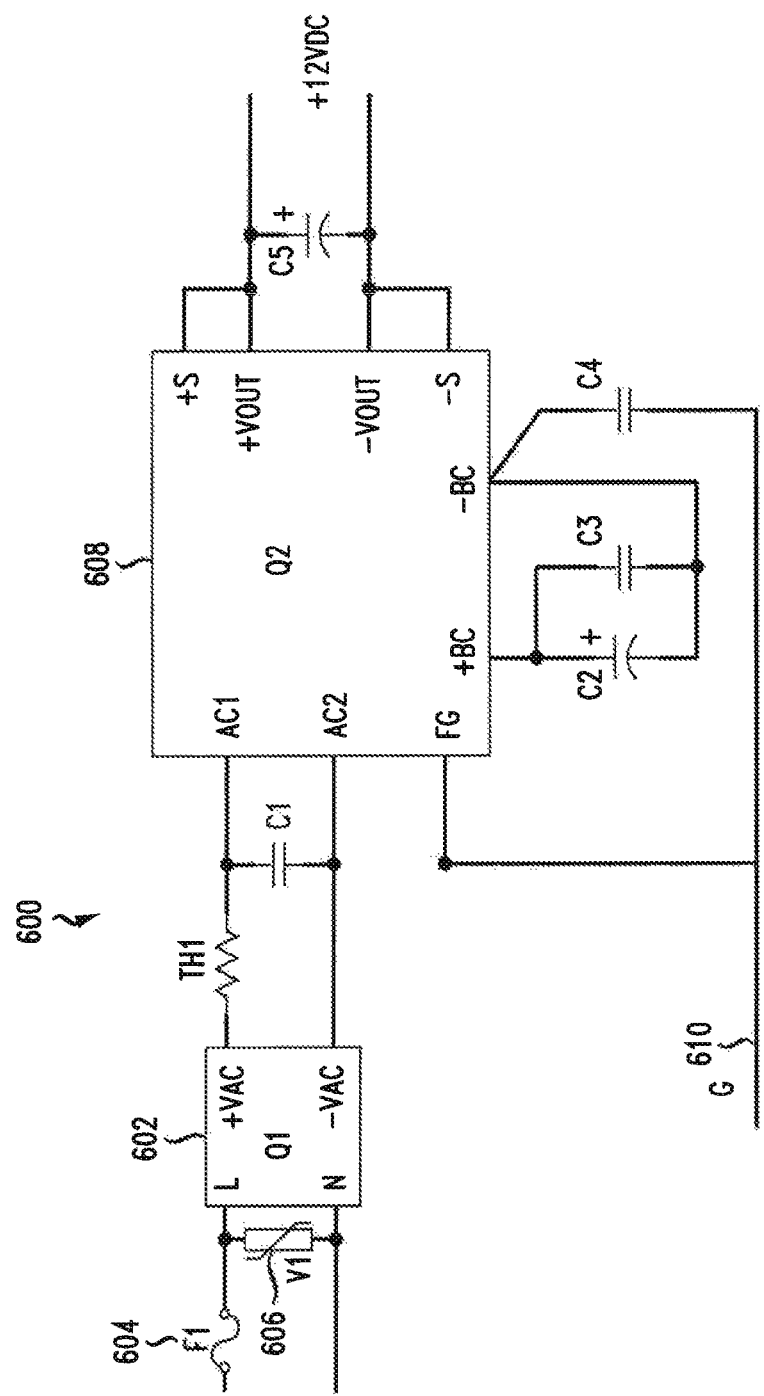
FIG. 6 illustrates a component that provides DC power to a device.

FIG. 6 illustrates a simpler version of the AC/DC power circuit shown in FIG. 3. In this circuit 600, an 85-264 VAC signal is provided to a fuse F1 604 which enables the connection of the input signal to a thermally protected varistor V1 606. The signal is provided to the input L and ground N of the EMI filter and single-phase AC/DC converter 602. The output signal from the positive terminal is provided to a thermistor TH1 which produces an output connected to ground via a capacitor C1 as well as being connected to an AC1 input of an AC/DC power module 608. The +S and +VOUT outputs of the power module 608 are connected through a capacitor C5 with the output of the −S and −VOUT terminals of the power module 608 to produce the +12V DC output.

The FG terminal of the power module 608 is connected to ground 610. The +BC terminal is connected to a capacitor C2 and C3 in parallel as shown in the figure. The output of C2 and C3 is connected to the −BC terminal of the power module 608. The −BC terminal is also connected through a capacitor C4 to ground 610.

Figure 7:
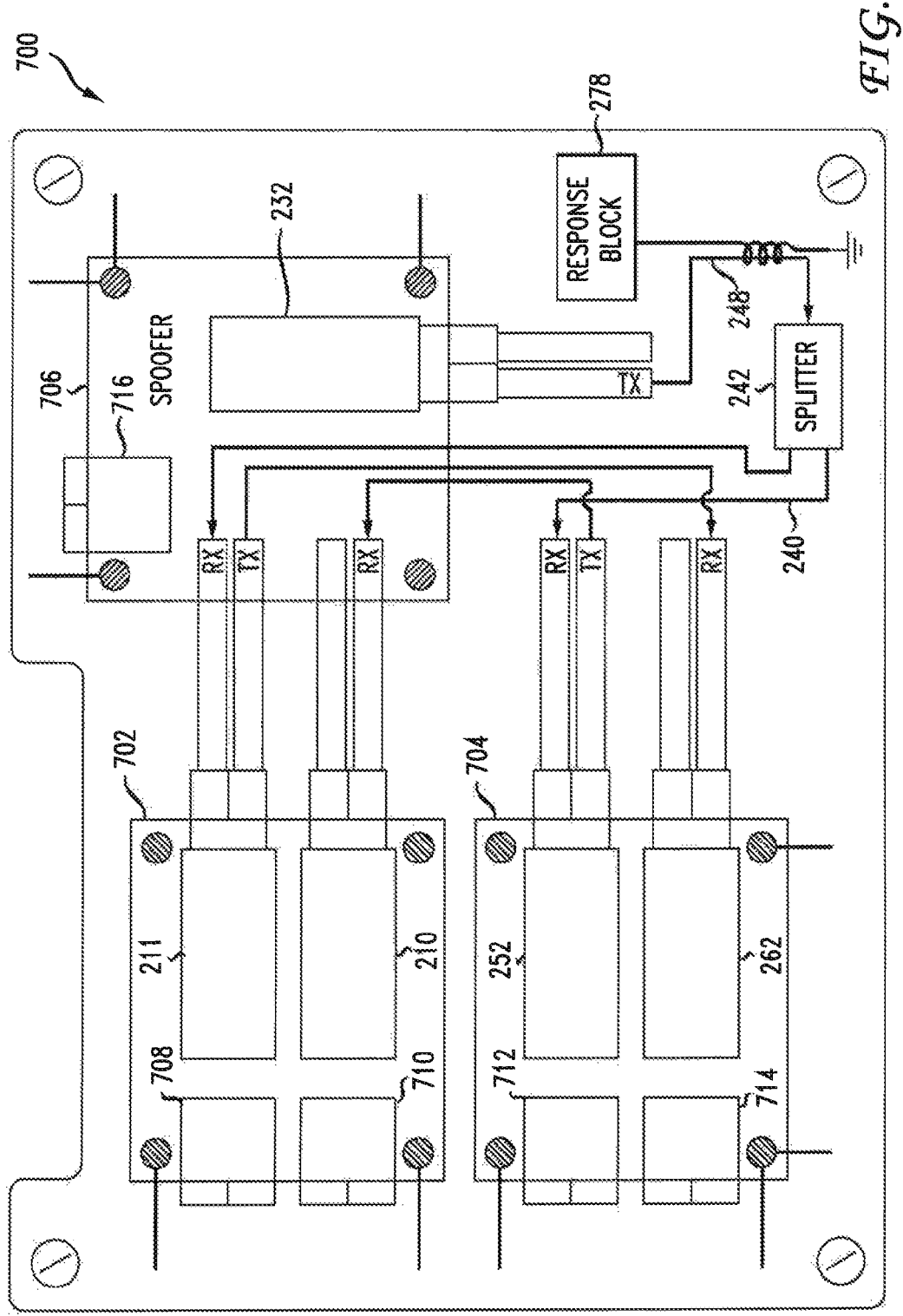
FIG. 7 illustrates another aspect of the hardware components for the controlled interface.

FIG. 7 illustrates a simplified version 700 of the controlled interface 200 shown in FIG. 2A. Feature 702 can represent a structure for holding the various media converters 211 and 210. An input port 708 can be connected to media converter 211. Input port 710 can provide a connection to media converter 210. Structure 704 can contain an input port 712, which connects media converter 252 and input port 714 for connecting to media converter 262. A structure 706 can contain the spoof or media converter 232. A connecting port 716 is not necessary needed for the spoof or media converter 232, and can be eliminated or not used.

The basic signal communication is as follows. A transmit signal 248 is provided by the spoof or media converter 232. Via a splitter 242, a first signal 244 is provided to the receive port of the media converter 211. A signal 246 is provided to the receive port of media converter 252. As noted above, the spoofing signal provides a basic fiber-optic signal which can be viewed by the receive ports of media converters 211, 252, which makes the media converters 211, 252 believe that there is an appropriate bidirectional communication, and which enables the media converters to transmit a signal.

The transmit port of media converter 211 is connected to the receive port of media converter 262. The transmit port of media converter 252 is connected to the receive port of media converter 210. The addressing convention disclosed herein, working in convention with the use of the controlled interface 700 disclosed herein, enables bidirectional communication between devices in such a way as to completely hide the network addressing identification for the respective devices 204, 206 from each other.

A response block 278 can be provided to protect the circuit 700 from hacking. The response block can cause an explosion to occur, can melt the fiber-optic cable 248 to prevent further communication, or can perform any other action. Response block 278 can be triggered by light, an attempt to hack, movement, heat, external news events, manually, and so forth can trigger the response. Any combination of factors can also be detected to trigger the response block 278. For example, light for longer than 10 seconds in connection with movement.

Figure 8:
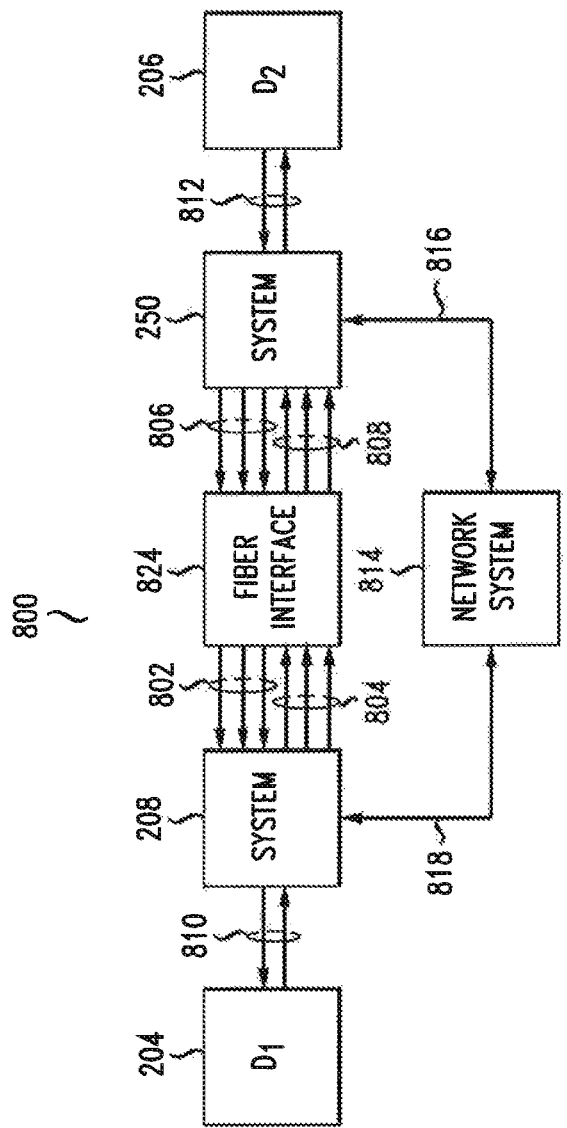
FIG. 8 illustrates another aspect of the controlled interface.

FIG. 8 illustrates the controlled interface with a more simplified structure. The system 800 includes the various components utilized for communicating data from a first device 204 to and from a second device 206. As shown by signal 810, bidirectional communication is possible to and from the first device 204. Assume data to be transmitted from the first device 204 to the second device 206 is communicated 810 to the system 208. Utilizing the programming disclosed herein, the system 208 will change the packet headers for that data and assign, according to a new addressing scheme, addressing information for one or more data streams 804 for the data to be transmitted through the fiber-optic interface 276. The fiber-optic interface 276 utilizes one or more media converters that convert and electrical signal into a fiber-optic signal. The fiber interface 276 includes at least one spoofer media converter which provides a spoofing signal to one or more of the other media converters to simulate a bidirectional communication link. Data is transmitted from system 208 through the fiber-optic interface 276 on one or more streams 804, 808 according to low-level hardware addressing scheme disclosed herein to system 250. System 250 encapsulates the data in the appropriate packet headers for communicating the data 812 to the second device 206. The same process, of course, can work in reverse for data communicated from the second device 206 to the system 250, such that one or more data streams 806 are provided to the fiber interface 276 which data is communicated 802 to the system 208 for conversion with respect to the packet headers and delivery 810 to the first device 204.

As is noted above, in one scenario, systems 208 and 250 are preconfigured with XML or other data files that enable the conversion from an IP address that is associated with the devices 204, 206 and optionally, the system 208 and 250 to the low-level hardware addressing scheme disclosed herein, which enables communication through the fiber-optic interface 276.

Another aspect of this disclosure can include a more dynamic and automated approach in which dynamic updates, additions, deletions, or modifications of the XML files can occur via a network-based system 814 that communicates with the system 208 and system 250. For example, assume that user of device 206 desires to surf the Internet. Not every website and on the Internet is configured within the XML files on system 250 and 208. Assume the device 204 represents a website that the user desires to access via their browser operating on device 206. Assume the website is www.newwebsite.com. Since new website is not configured within the XML files on devices 208, 250, the user would not be able to access that website, and retrieve HTML data or interact with the website. Of primary interest is security for the device 206. The network-based system 814 could include, for example, a listing of safe websites which can be accessed by the device 206. These websites can be organized in a certain criteria such as different levels of security or safety for each site that is desired to be accessed. Assume that the newwebsite.com site is considered to be sufficiently safe for the device 206 access. When the user of device 206 enters in www.newwsite.com into their browser, the system 250 will recognize that it does not have the capability of accessing the site and will communicate a request through an application programming interface 816 or other communication channel to the system 814 with a request access to the site that the user is requesting to access. The system 814 would review its data and confirm the reliability and safety associated with the requested site. The system 814, assuming that its evaluation confirms that the site is appropriate for the device 206 to access, transmits via communication links 816, 818, an update to the XML configuration files of the system 208 and 250. The updated XML configuration file will then include the necessary data for the device 206 to be able to send data to the device or Web server 204 and receive responses back from the Web server which will be communicated through the fiber interface 276. It is noted that a fiber interface 276 could also exist between the system 250 and the system 814. Another fiber interface 276 could also exist between the network system 814 and the system 208 to provide for secure vindication between these devices. Such controlled interfaces 276 could be bidirectional or unidirectional such that update data can only flow in one direction from the system 814 to one or more of system 208 and 205.

In another aspect, the request from device 206 could be provided directly to the system 814 to access a new device 204 that is not already configured within the systems 208, 250. In such a scenario, a unidirectional fiber interface 276 could be provided between the system 814 and system 208 and/or 250 for communicating updated data to the XML files in those respective systems.

The system 814 could also monitor the safety and reliability of the various devices 204 that are configured within XML files of system 28 and system 250. Should one of those devices become compromised or increase with respect to security risk, the system 814 could also modify the XML files on system 208 and/or system 250 to remove devices from the XML files such that they are no longer able to communicate through the fiber interface 276 with device 206.

Is further noted that several of the devices disclosed herein include safety features for severing a fiber-optic link (or other data link) from the spoofer to one or more of the media converters. A similar safety feature could also be provided to eliminate the fiber-optic link 248 between a network system 814 and one or more of the systems 208 or 250. These links might be fiber-optic links, or more standard electrical communication links. At least a portion of the communication link 816, 818 could be a fiber-optic link. A safety mechanism, which could be connected to the triggered mechanisms disclosed herein, could be separate system. For example, if a configuration such as FIG. 8 is established, and one of the triggering mechanisms to shut down the fiber interface 276 is fired, a corresponding mechanism could eliminate the communication link 816 and/or 818 as well between the system 814 and one or more of system 208 and system 250.

Is generally understood that system 814 could maintain a listing of safe devices 204 that could be accessible by device 206. The communication of data between system 814 and systems 208, 250 can be dynamic as a user searching the Internet. For example, if a user of device 206 begins with a search on google.com, the data returned from google.com will include a listing of the search results. The search results will include many different sites of varying security risks. In one aspect, the interface presented to the user's browser on device 206 could be a modified search result list, which is based on only secure sites, which have existing data in the XML files on system 208, 250. In another aspect, the search results that are presented might include sites that are either found within the XML files on systems 208, 250 as well as a combination of approved sites that are listed on the database on system 814. In this regard, if the user of device 206 clicks on a search result that is associated with a site listed as appropriate in the database on system 814, then the system 814 can provide through the communication links 816, 818, the data necessary for the device 206 to be able to access that site 204 and communicate in the normal fashion via a browser. For example, the new XML files might include new addressing such as:

AB 0.00.40.55.35$eth1ebay.com

The system would also do the round robin approach of providing an initial simple communication to the new site and go through the process of establishing all of the necessary data points in the XML files for communication between the device and the new site. Depending on the type of data that will be communicated to and from the new site, such as ebay.com, the system 814 can provide all the necessary channels and addressing for communicating data to and from the new site. For example, if audio, control signals, video, metadata, or any other data will be communicated to and/or from a device, such information could be determined in advance, such that all of the channels that will be necessary for bidirectional communication through the fiber-optic component 276 can be added to system 208 and system 250. The system 814 can also indicate with a DNS server, which is a server that contains a database of public IP addresses and associated host names. The system 814 can also periodically review and update XML files in cases where host names correlated to certain public IP addresses might change. For example, if the public IP address for ebay.com changes, such a change can be reported to the system 814 an updated XML files can be provided to the system 208 and the system 250. The users to utilize a dynamic service 814 would be responsible in one aspect for maintaining the security of their passwords for the site as any access to the Internet can increase the risk.

The system 814 can apply the evaluation algorithms to crawl the Internet and test and evaluate sites for including is database of safe sites or authorized sites. Sites can have different levels of safety. Thresholds can be set with respect to the circumstances under which a device 206 would be allowed to access a particular site 204. For example, sites 204 may only be accessible at certain times of the day. The systems 208, 250 can be configured such that the accessibility of such sites is only possible during windows of time. System 814 can also be included as part of a time-based accessibility control aspect. Certain sites 204 may only be accessible when the device 206 is in certain locations. Thus, there could be geographic controls which are coordinated with the XML files and systems 208, 250 which limit the accessibility of devices 204, based on a geographic position of one or more of device 204, or device 206 or any other component disclosed herein.

The accessibility of device 204 through the fiber interface 276 could also be based on other outside factors, such as current events, weather conditions, government regulations, market conditions, social media data, and so forth. Thus, a threshold could be set such that certain devices 204 would no longer be accessible given a terror threat level. Either through a triggering mechanism as disclosed herein or through modifying the XML, files in system 208 and system 250, access to particular devices 204 can be dynamically modifiable based on any one or more of the factors disclosed herein.

In another aspect, the server 814 is not needed to dynamically set up new devices for communication. The challenge is getting both sides to cooperate. The system needs an XML file on both system 208 and 250. In one aspect, system 814 would be a controlled interface itself that would be set up to communicate with device 208 and 250. In another aspect, authentication such as facial recognition, biometric authentication, voice authentication, passwords protection, the use of captchas (textual, visual audible), or any combination of these features and be utilized at one or more of device 250, 208 and 814. The authentication could also occur at device 204 and/or 206. In one aspect, system 250 and system 208 could both be set up with an improved set of authorization data. For example, each system could store fingerprint authorizations for authorized users to gain access to new devices that are not currently established on the system. Thus, if a user of device 206 desired to to add a communication link to Facebook.com, the user would authenticate themselves through fingerprint or other mechanisms with system 250. The XML files in system 208 and system 250 could include a set of virtual threads which are purely utilized for command-and-control. This dedicated set of virtual threads could be utilized to establish an approach for dynamically adding a new device 204 to be accessible from device 206 through the controlled interface 276.

The process could proceed as follows. The user device, 206 submits a request to add a new website or to access a new website www.facebook.com. This can be done through an interface presented on device 206 or through some other means such as the user entering the URL that they desire to access. The requesting user would authenticate themselves either on device 206 or on the system 250 as described above. Any authentication method can be utilized. A command-and-control thread would be established between device 250 and device 208. For example, a data packet containing the 208 with following address:

AA.00.04.00.55.55$ETH029000

The use of "AA" indicates that this is a unicast signal and assume in this case that the system has established virtual threads associate with protocol types 29000-29200 to the command-and-control virtual threads. Thus, device 250 which transmits a connection request with the information associated with that indication of the user. The payload could also include the requested URL or identification of the new device 204 that the user desires to connect to. Device 208 to confirm the authentication information by accessing a store database of authorized user identity case and data, such as facial patterns, fingerprints, and so forth. Assuming that the user is authorized to access the additional sites 204, the system 208 could send back a response which can establish a communication session between device 28 and device 250 such that the virtual threads and addressing scheme could be established for the new device. For example, the devices might agree on a set of virtual threads for communication with the new device 204. For example, following could be the potential range of protocol types for the communication between device 206 and device 204 as follows:

AB.00.04.00.55.55$ETH-120500-
AB.00.04.00.55.55$ETH020600

While the devices 208 and 250 are utilizing the command-and-control virtual threads to establish an updated XML file in each case, the device 28 could also reach out and establish communication link with the new device 204 to confirm its IP address and establish or retrieve any other data necessary for updating its XML files. Thus, a dynamic approach can be provided to enable, in an automated way, additional devices to be able to be connected through the controlled interface 276. The process generally includes receiving the initial request for new device from device 206, through user authentication and authorization, providing a negotiation between device 208 and device 250 to establish and assign the appropriate range of virtual threads that will be utilized to communicate data between device 208 and device 250 that is to be transmitted to or received from the new device, and establishing and retrieving information from the new device 204 at the device 208 for updating the XML files with the appropriate high level IP protocol stack data associated with the new device 204. Once the IP protocol stack data is identified for device 204, and the XML files in device 208 and vice 250 are automatically updated, a confirming message can be sent from device 250 to the device 206, which can confirm to the user that they are now authorized and able to communicate with the new device 204.

And interface for enabling the dynamic addition of a new device into the system can include data requested from the user of device 206 which not only can simply identify and address of the new device 204, but can also request additional data such as will the communication be bidirectional, will there be other devices on network 207 that will desire access to the new device 204, what kind of data will be communicated between the devices, what level of security might be desired, which devices on network 207 will need only to receive data from device 204 or which devices might need to be able to control or transmit data from the respective device to the new device 204. Thus, an administrator could utilize a graphical user interface for configuring the particular level and type of communication that will occur with the new device 204. This data will be utilized by device 208 and device 250 in terms of how the XML files will be set up and established. An XML file could also be created as well. The confirmation from device 208 after a communication with the new device 204 might also have to be validated by a person via a separate authorization. For example, an authorized user of device 208 might need to be confirmed before the new device 204 can be communicated with. A human authorization from new device 204 might also be required. Tokenized data or cryptographically processed data can be utilized in any stage.

In another aspect, the graphical user interface will allow an administrator to easily customize the list of allowed websites by choosing which sites to add to or remove from the safe website list (database on system 814, on system 208, or a subset database created to protect the integrity of the original database on system 814). This GUI will give an administrator the ability to modify the safe website list without having to know how to program an XML file.

Figure 9:
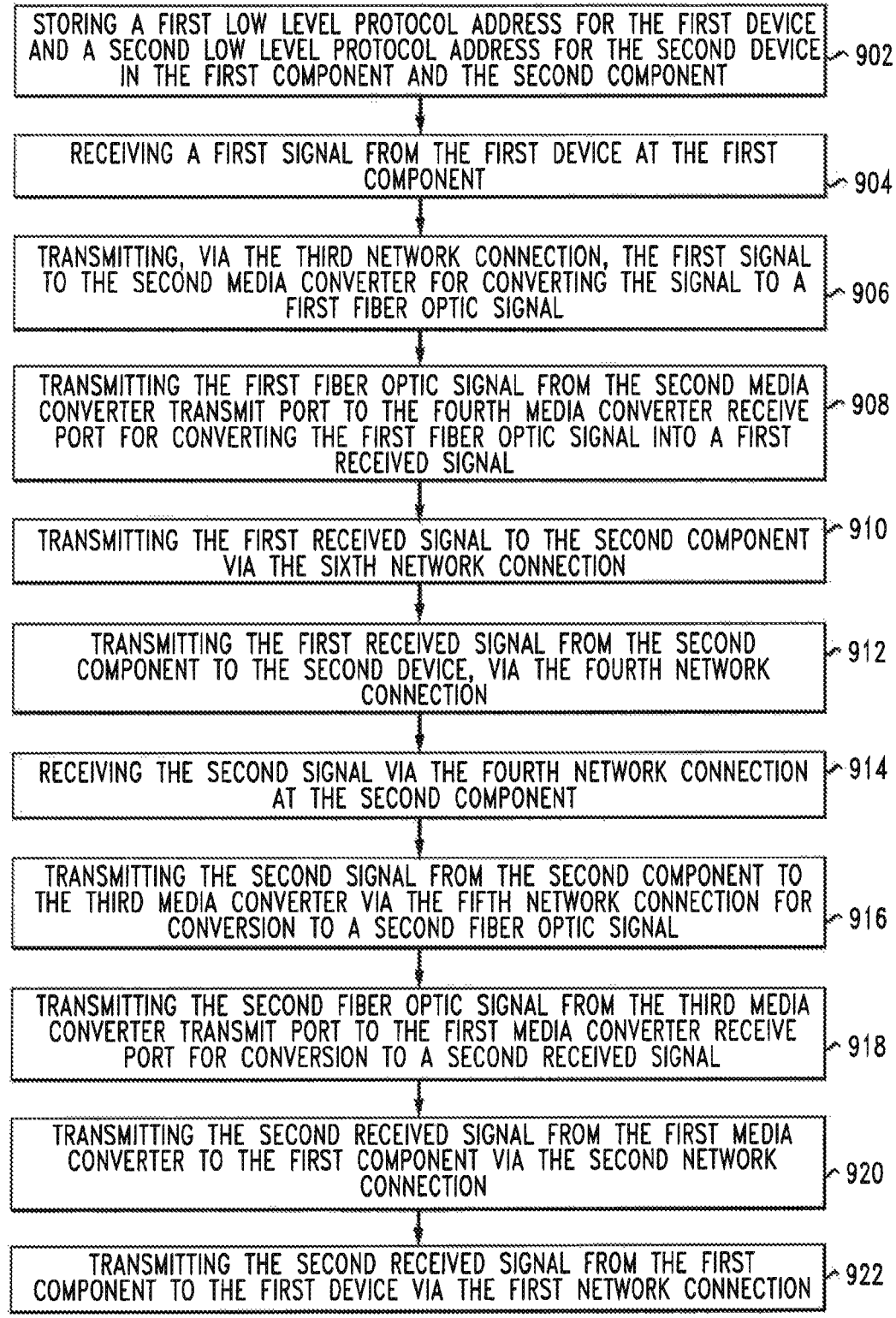
FIG. 9 illustrates a method example.

Another aspect of this disclosure is shown in FIG. 9 and relates to a method embodiment or method example. A method of communicating signals between a first device and a second device via a controlled interface includes the controlled interface including several features: (1) a first component communicating with the first device via a first network connection; (2) a first media converter having a first media converter disabled transmit port and a first media converter receive port, the first media converter connected via a second network connection to the first component; (3) a second media converter having a second media converter transmit port and a second media converter receive port, the second media converter connected via a third network connection to the first component; (4) a second component communicating with the second device via a fourth network connection; (5) a third media converter having a third media converter transmit port and a third media converter receive port, the third media converter communicating with the second component via a fifth network connection (6) a fourth media converter having a fourth media converter disabled transmit port and a fourth media converter receive port, the fourth media converter communicating with the second component via a sixth network connection; and (7) a fifth media converter having a fifth media convert disabled receive port and a fifth media converter transmit port. A spoofing fiber-optic signal transmitted from the fifth media converter transmit port is communicated to both the second media converter receive port and the third media converter receive port. The fifth media converter can include a set of media converters each producing a spoofing signal that is transmitted respectively to the second media converter receive port and the third media converter receive port. The third media converter transmit port can be connected to the first media converter receive port and the second media converter transmit port can be connected to the fourth media converter receive port.

With the above configuration, the method can include storing a first low-level protocol address for the first device and a second low-level protocol address for the second device in the first component and the second component (902), receiving a first signal from the first device at the first component (904), transmitting, via the third network connection, the first signal to the second media converter for converting the signal to a first fiber-optic signal (906), transmitting the first fiber-optic signal from the second media converter transmit port to the fourth media converter receive port for converting the first fiber-optic signal into a first received signal (908), transmitting the first received signal to the second component via the sixth network connection (910) and transmitting the first received signal from the second component to the second device, via the fourth network connection (912).

The method can further include transmitting a second signal from the second device by: receiving the second signal via the fourth network connection at the second component (914), transmitting the second signal from the second component to the third media converter via the fifth network connection for conversion to a second fiber-optic signal (916), transmitting the second fiber-optic signal from the third media converter transmit port to the first media converter receive port for conversion to a second received signal (918), transmitting the second received signal from the first media converter to the first component via the second network connection (920) and transmitting the second received signal from the first component to the first device via the first network connection (922).

Figure 10:
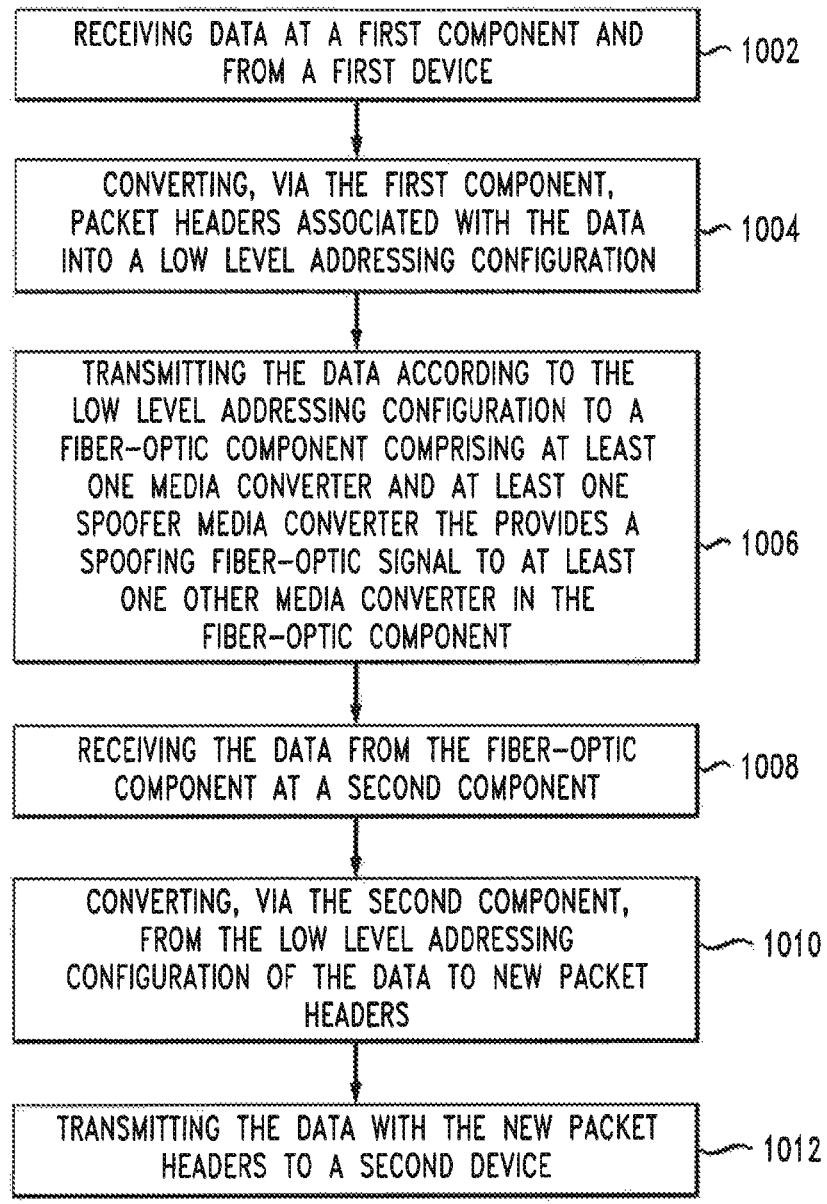
FIG. 10 illustrates another method example.

FIG. 10 illustrates another method example of this disclosure. The method includes receiving data at a first component and from a first device (1002), converting, via the first component, packet headers associated with the data into a low-level addressing configuration (1004) and transmitting the data according to the low-level addressing configuration to a fiber-optic component including at least one media converter and at least one spoofer media converter the provides a spoofing fiber-optic signal to at least one other media converter in the fiber-optic component (1006). The low-level addressing configuration can be a connectionless protocol. While a fiber-optic component 276 is disclosed as the preferred embodiment, other communication means can also be utilized as well, such as an Ethernet connection, a wired connection, or a wireless connection.

The method further includes receiving the data from the fiber-optic component at a second component (1008), converting, via the second component, from the low-level addressing configuration of the data to new packet headers (1010) and transmitting the data with the new packet headers to a second device (1012). The new packet headers can be of a higher-level protocol such as an IP protocol or X.25. The converting that occurs via the first component and/or the second component can occur via application of configured XML files which identify IP addresses (or other addressing data) associated with the first device and the second device and associated low-level addressing data used for communicating data through the fiber-optic components. The converting of the data from the low-level addressing scheme into a higher-level packet header scheme can include generating the necessary packet headers for transmitting the data to a device with a MAC address or an IP address.

Various examples or embodiments of this disclosure can be claimed from the standpoint of different respective devices. For example, methods, systems, or computer readable device embodiments could be claimed from the standpoint of signals sent and/or received from any of the device 204, the system 208, the fiber-optic component 276, the system 250, the system 206, and/or the system 814. Any two or more of these devices could be combined into a claims system as well. For example, a system can include a portion or all of the fiber-optic interface 276 and the component 208. The various processes performed by any individual component as well as signals transmitted from such component and signals received at such component can be included within the respective claimed embodiment. In another aspect, a claimed embodiment can include subcomponents such as the combination of spoofer media converter 232 and one other media converter like media converter 211. These two components could be combined and claimed according to their respective functions and interactions.

Any of the components disclosed herein can include security measures to control access to the device. For example, any one or more of components 208, 250, 814, 204, 206 can include security measures, such as fingerprint access, voice print access, facial identification, password protection, or any combination of these measures to provide security. For example, a fingerprint may be required before an XML file is updated on the components 208, 250 either in a manual fashion or via the server 814.

In another aspect, an embodiment could focus on the structure of the addressing scheme disclosed herein, and how it impacts the communication of data through the fiber-optic component 276 and the relationship to an IP based device. In this regard, the XML or other data file that is used by system 208 and system 250 represent a specific type of addressing structure that designed to improve the way the computers transmit data from one to another. Conventional IP addressing can be too easy to hack. This disclosure presents a specific implementation of a solution to the problem of simply communicating data from one device to another using the standard IP addressing scheme. As can be appreciated, the improvement to computer technology that is disclosed herein, in one aspect, relates to the new physical configuration and use of the systems 208, 250 as well as the respective media converters and how data flows through those converters. In another aspect, the improvement is found by the novel and nonconventional processes which utilize the low-level hardware addressing scheme which enables the system 208 and 250 to communicate data between each other utilizing the fiber-optic component 276, while at the same time noting that the system 208 knows nothing about device 206 and system 250 knows nothing about device 204.

Figure 11:
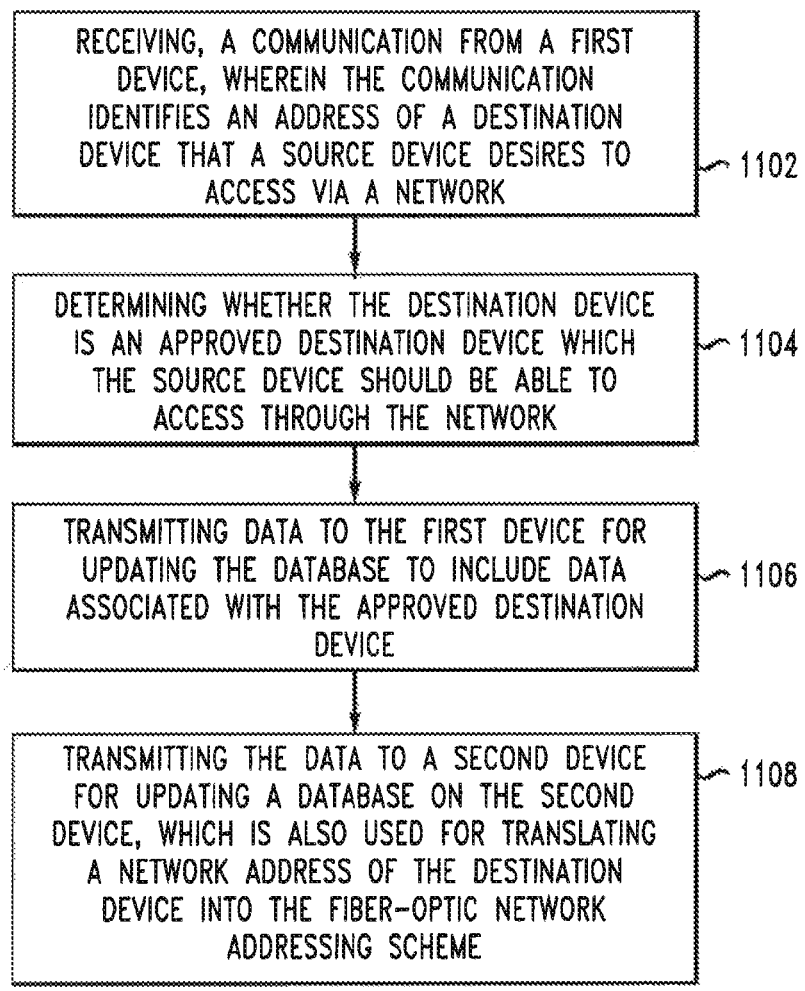
FIG. 11 illustrates a method example.

FIG. 11 illustrates an example method embodiment from the standpoint of the system 814 in FIG. 8. The method can include receiving a communication from a first device, wherein the communication identifies an address of a destination device that a source device desires to access via a network (1102). The destination device in this scenario is not found within the database stored on the first device for use in translating a first network address of the source device into a fiber-optic low-level network addressing scheme. The low-level addressing scheme can include an address, a port and a device name, for example. The method includes determining whether the destination device is an approved destination device which the source device should be able to access through the network (1104). If so, the method includes transmitting data to the first device for updating the database to include data associated with the approved destination device (1106). The method also includes transmitting the data to a second device for updating a database on the second device, which is also used for translating a network address of the destination device into the fiber-optic network addressing scheme (1108). The data that is transmitted to the first device and the second device are then utilized for bidirectional communication within a fiber-optic component that includes at least two media converters for communicating data between the first device and the second device and at least one spoofer media converter that is used to generate a fiber-optic signal which is input to the receive port of one or more of the media converters for convincing the media converters that there is a bidirectional communication link.

Figure 12:
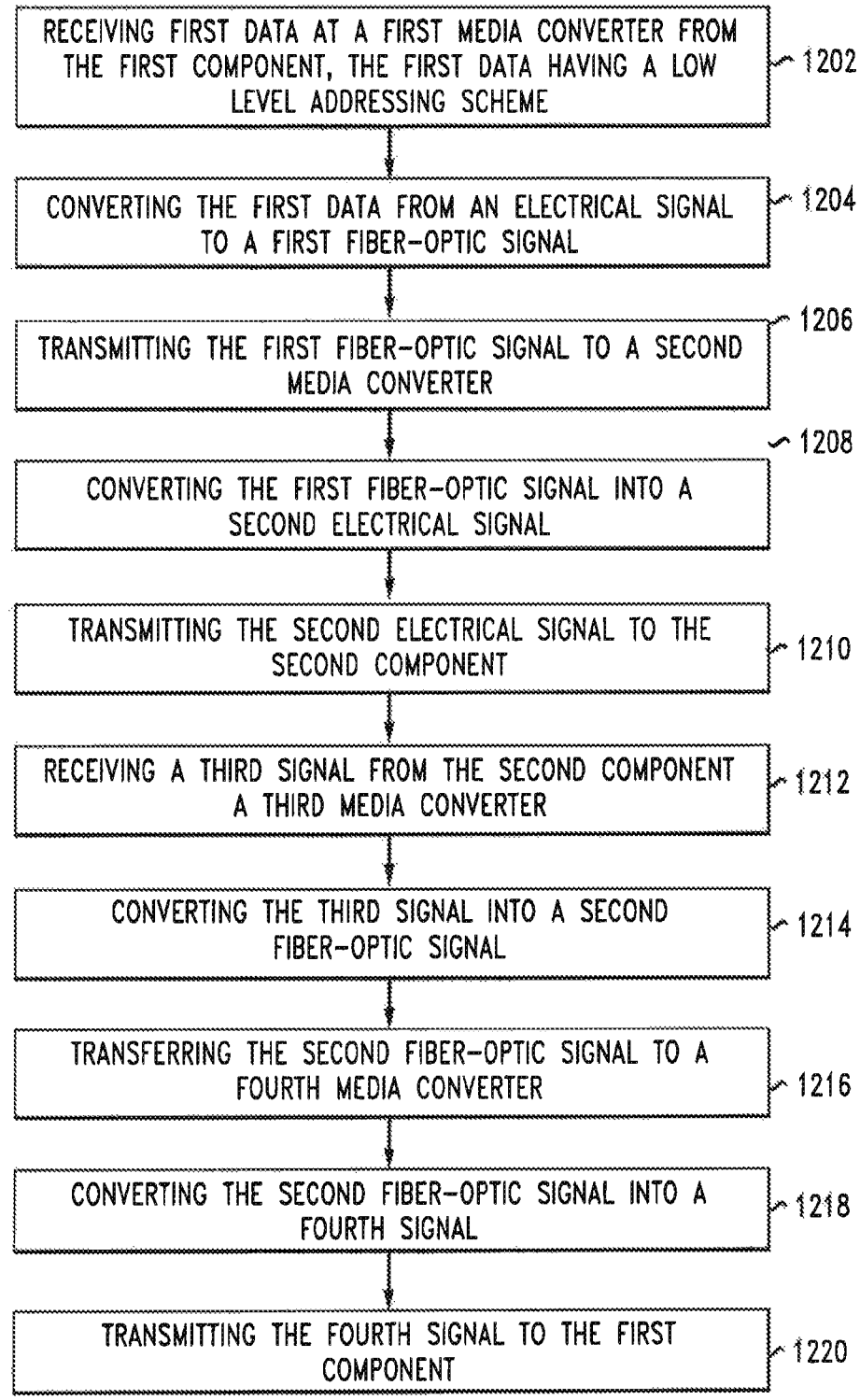
FIG. 12 illustrates a method example.

FIG. 12 illustrates another method example from the standpoint of the fiber-optic component 276. The fiber-optic component 276 includes at least one spoofer media converter and one or more other media converters for communicating data between a first component 208 and a second component 250. The spoofer media converter provides a fiber-optic signal to one or more of the other media converters for the purpose of imitating a bidirectional communication. The fiber-optic component 276 performs a method including receiving first data at a first media converter from the first component 208, the first data having a low-level addressing scheme (1202), converting the first data from an electrical signal to a first fiber-optic signal (1204), transmitting the first fiber-optic signal to a second media converter (1206), converting the first fiber-optic signal into a second electrical signal (1208), and transmitting the second electrical signal to the second component 250 (1210).

The method can also include receiving a third signal from the second component at a third media converter (1212), converting the third signal into a second fiber-optic signal (1214), transferring the second fiber-optic signal to a fourth media converter (1216), converting the second fiber-optic signal into a fourth signal (1218) and transmitting the fourth signal to the first component (1220). The system or device, defined as a single component or a number of different components working together, can include the device structure as well as separately or in coordination with operations performed by the system or device, or individual components of the system.

Figure 13:
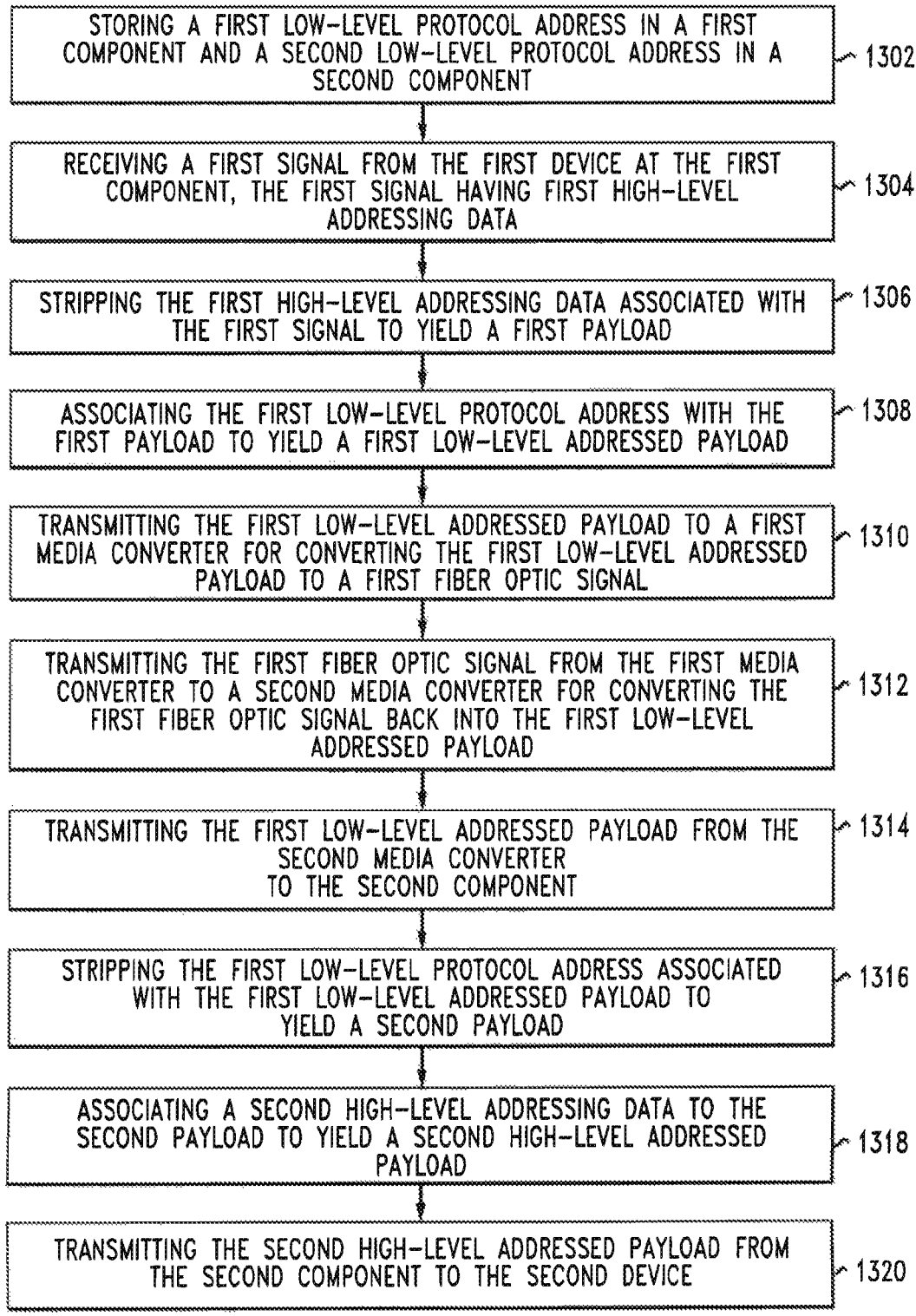
FIG. 13 illustrates another method example.

FIG. 13 illustrates another method example disclosed herein. A method of using a controlled interface for managing data communicated between a first device and a second device is described. The method includes storing a first low-level protocol address in a first component and a second low-level protocol address in a second component (1302), receiving a first signal from the first device at the first component, the first signal having first high-level addressing data (1304), stripping the first high-level addressing data associated with the first signal to yield a first payload (1306), associating the first low-level protocol address with the first payload to yield a first low-level addressed payload (1308), and transmitting the first low-level addressed payload to a first media converter for converting the first low-level addressed payload to a first fiber-optic signal (1310).

The method further includes transmitting the first fiber-optic signal from the first media converter to a second media converter for converting the first fiber-optic signal back into the first low-level addressed payload (1312), transmitting the first low-level addressed payload from the second media converter to the second component (1314), stripping the first low-level protocol address associated with the first low-level addressed payload to yield a second payload (1316), associating a second high-level addressing data to the second payload to yield a second high-level addressed payload (1318) and transmitting the second high-level addressed payload from the second component to the second device (1320).

For bidirectional communication, signals need to flow the other way as well. The method can further include transmitting a second signal from the second device to the first device. In this aspect, the method essentially performs the same process in reverse and includes receiving the second signal at the second component, the second signal having second high-level addressing data, stripping the second high-level addressing data associated with the second signal to yield a third payload, associating the second low-level protocol address with the third payload to yield a second low-level addressed payload, transmitting the second low-level addressed payload from the second component to a third media converter for conversion to a second fiber-optic signal, transmitting the second fiber-optic signal from the third media converter to a fourth media converter for conversion back to the second low-level addressed payload, transmitting the second low-level addressed payload from the fourth media converter to the first component, stripping the second low-level addressing data associated with the second low-level addressed payload to yield a fourth payload, associating a third high-level address to the fourth payload to yield third high-level addressed payload and transmitting the third high-level addressed payload from the first component to the first device.

A fifth media converter can include a first spoofer media converter and a second spoofer media converter, wherein the first spoofer media converter provides a first spoofing fiber-optic signal to the second media converter receiver port and the second spoofer media converter provides a second spoofing fiber-optic signal to the third media converter receiving port.

At least one of the first component and the second component stores low-level hardware addresses configured to identify at least one or more of an address, a protocol type, and a device name. The protocol type can include at least one or more of Ethernet, TCP, UDP, UDP multicast, or other web service. The address can include an address used to communicate a data stream from the first component to the second component through one or more of the first media converter, the second media converter, the third media converter and the fourth media converter.

In another example, a claimed embodiment could be a product by process. One example product by process could involve a process of one manufacturer building the fiber-optic circuit which includes at least one spoofer media converter 232 an at least two other media converters 276. A different manufacturer could build a circuit having the first component 208 and the second component 250. The fiber-optic circuit 276 and the combination of components 208, 250 could then be combined into a single unit or device by a third entity, which would also load the necessary operating system and computer programming to perform the functions disclosed herein. Thus, the "product" or device 200 shown in FIG. 2A, which includes the first component 208, the second component 250 and the fiber-optic circuit 276, can be defined in the manner of how individual components are manufactured by specific entities, and then combined together by another entity that also loads computer programming for ultimate deployment. This manufacturing process can provide additional security so that a single entity is not aware of all of the components or the programming.

The systems disclosed herein can be installed or integrated into any one or more of the following devices and/or used for the following applications in order to protect Federal or local government, commercial and civilian systems from man-in-the-middle attacks and outside device or network penetrations: (1) Any electronic device that radiates a frequency that can be detected, analyzed and/or compromised; (2) Any device that connects to the Internet or other modes of telecommunications; (3) GPS systems, satellites, microwave systems on microwave towers, cellular towers, other communications towers and systems; (4) Television and radio transmissions of all types; (5) Cable modems; (6) Wireless routers; (7) Ethernet cards (NIC cards); (8) Computer motherboards; (9) Wireless network surveillance cameras and security systems; (10) Primary computers on various modes of transportation such as spaceships, aircraft, military and civilian drones, ships, submarines, trains, trucks, automobiles, motorcycles, etc.; (11) Traffic infrastructure such as stop lights, train signals, airport runway taxi systems, etc.; (12) Offensive and defensive military weapons such as missiles, lasers, tanks, hover crafts. UAV's, etc.; (13) Satellite phones; (14) Police and military radios; (15) Smart speakers; (16) Smart TV's, DVD players, any such device that connects to the internet or cellular networks; (17) Voice over Internet Protocol (VoIP) devices; (18) Medical devices such as pacemakers; (19) Smart batteries for cellphones; (20) Power grid and any components associated with the power grid; (21) Communications grids; (22) Water treatment centers; (23) FEMA facilities; (24) TV and radio stations; (25) Airport security systems; (26) Military transportation systems; (27) Commercial transportation systems; (28) Banks and ATM's; (29) Congressional networks; (30) White House communications; (31) Solar powered devices of any type; (32) Home computers; (33) Wireless device; or (34) SCIF's (Sensitive Compartmented Information Facilities).

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Other applications can include protections for cryptocurrency wallets or mining devices. For example, Bitmain is a company that sells cryptocurrency mining devices that enable users to enter their wallet address and mining pool settings to start mining. The technology disclosed herein can be used as a controlled interface between a mining device and a pool, or between a wallet and the Internet. A controlled interface can connect the mining device any another other device in a pool, for example, or the Internet. In some cases, for example, a service might be on a local area network that can include client devices, server devices, supervisor devices, a recording server, a file server and so forth. One or more of the devices might be miners like a bitcoin miner. A controlled interface can be established with the IP address of the various components to enable communication in a secure manner between them.

5G Applications

Another aspect of this disclosure relates to 5G applications and networks. The main service types considered for 5G include enhanced mobile broadband which relates to human centric and enhanced access to multimedia content, services and data with improved performance and a seamless user experience. The enhanced mobile broadband experience will cover use cases with very different requirements. For example, hot spots can be characterized by high user density, high traffic capacity and low user mobility concepts, or can relate to wide area coverage with medium to high user mobility. There will be a need for seamless radio coverage practically anywhere and anytime but with the visible improvement and user data rates compared to existing data rates. The 5G services also require reliable and low latency communications which relate to such use cases as wireless control of industrial manufacturing or production processes, remote medical surgery, distribution automation in a smart grid, transportation safety, and so forth. These types of services will provide a large part of the fundamental for the next Industrial Revolution and have a subsequent impact on industries far beyond the information and communication technology industry. Secure communications between devices is particularly important in these various contexts. The principles disclosed herein with respect to cellular networks can also apply to more traditional networks and not just 5G contexts.

Another aspect of this disclosure relates to massive machine type communications which involve services that are characterized by a very large number of connected devices typically transmitting a relatively low volume of non-delay sensitive data. However, an important challenge here is that devices are usually required to be low cost and have a very long battery lifetime. Examples of the service type can be logistics applications that might involve the tracking of tagged objects, smart metering, agricultural applications with small low-cost and low-power sensors which are sprinkled over large areas to measure ground characteristics and so forth. In all of these scenarios, the technology disclosed herein with respect to the controlled interface can have important applicability to enable secure communication between respective devices. The communication in the controlled interface can be one way or may be bidirectional. Accordingly, the following disclosure sets forth various aspects of incorporating a controlled interface of the type disclosed herein with the appropriate tables established for communication between devices into one or more components of the 5G infrastructure or other cellular or wireless infrastructure. Also disclosed herein is the concept of handoffs where in a heterogeneous 5G type environment which can include cell coverage, WiFi coverage, and direct communications, what is disclosed is the ability to enable a make before break paradigm which maintains communication from a first device to a second device is being handled through a controlled interface even when transitioning from one controlled interface to another. The handoff procedures can also apply in any network environment, and not just 5G.

For example, in 5G, the time during which a device cannot exchange data packets because of hand over procedures should have a minimum requirement for mobility interruption time as 0 ms. This is essentially a make before break paradigm that has to be applied such that the connection to the new cell has to be set up before the old one is dropped. In the present scenario, as disclosed herein, each cell or the radio hardware of any type that communicates wireless signals to and from a mobile device will include either a controlled interface in connection with the respective node or will manage the flow of streams of data to another node that does maintain a controlled interface such that communications of a secure type are insured to be always handled through one or more controlled interfaces. This disclosure will set forth both scenarios of 5G infrastructure which maintains a single controlled interface or provides handoffs from a first node having its respective controlled interface to a second node having its respective controlled interface.

Figure 14:
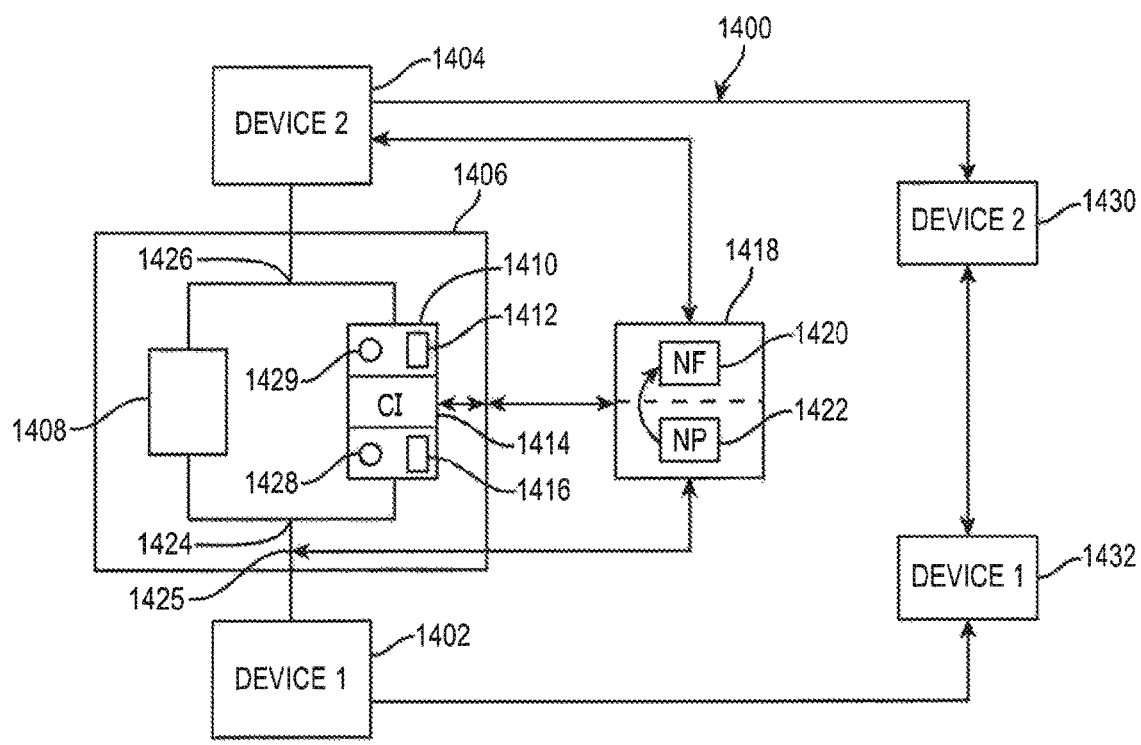
FIG. 14 illustrates an example 5G or other wireless system.

FIG. 14 illustrates an example wireless environment which could apply to 5G or any wireless environment. Environment 1400 includes a first device 1402 that is going to communicate with a second device 1404. These devices can be mobile devices, desktop devices, laptops, and Internet of things device, or any kind of device that will communicate data to another device on the network. While the primary context as wireless, wired communications could also apply.

Node 1406 is revised in an important aspect. The node is revised to include a controlled interface component 1410. Signals that are communicated from device 1402 can be received at the new node 1406 and can be routed either to the traditional processing for the node 1408 or can be routed for communication through the controlled interface 1410. A switch 1424 can be configured to perform this routing based on any number of factors. For example, data packets may have a packet header which indicates that the communication or the data stream should be routed in one direction or another. Other mechanisms as well might be included which cause a data stream to be routed to the controlled interface 1410 rather than through the traditional processing. Streams exiting the controlled interface 1410 can be routed through a switch or an element 1426 to the destination device 1404. As disclosed above, for the controlled interface 1410 to function, it needs tables or XML files (or other types of files) which are populated with the necessary data to enable the device 1402 to communicate unidirectionally or bidirectionally with device 1404 through the controlled interface 1410 in such a way that neither device is aware of the IP address or identification address of the other respective device. Features 1412 and 1416 represent the tables or XML files that need to be populated for the controlled interface to work. The fiber component of the control interface 1414 represents the fiber transceivers disclosed elsewhere in this application. What is disclosed is how the node 1406 properly and securely sets up this infrastructure so that the device 1402 can communicate with device 1404 without revealing their respective IP addresses to each other.

Accomplishing this set up can occur in many different ways. One example approach would include the first device 1402 initiating a communication with the second device 1404 with some kind of indicator that this communication is to be secure and to utilize the controlled interface. The device 1402 may include a special app that identifies this functionality or the user may have established that certain devices will be communicated with using the controlled interface in advance or dynamically chosen. For example, an attorney may utilize his or her cell phone in its normal fashion for communications with family and friends but have preprogrammed certain phone numbers such as to clients or to a judge that will be routed through a controlled interface. When such a phone number is styled or a URL accessed or any kind of communication is initiated, data indicating that such communication should be routed through controlled interface can be process that the node 1406 such that element 14 to 4 routes that adjudications to the controlled interface 1410.

There may be a scenario where an initial communication causes tables to be populated with data such that there is a longer setup time for that communication through the controlled interface. Later, the user may have a quicker setup to a communication because the tables will already be populated for communication between two particular devices.

This disclosure includes methods performed by one or more components disclosed herein for performing the operations described. For example, a node in the network could receive that indication of a communication that is to be performed through the use of a controlled interface and then implement, based on the communication, a routing for that communication through a controlled interface (or more than one controlled interface) and establish the appropriate data needed for the files to achieve unidirectional or bidirectional communication. All steps that include set up, requests, responses, handshakes, confirmations, error control, fail notifications, success notifications, and so forth are considered within the scope of this disclosure and can be performed by any one or more components within the system.

As is explained above, device 1402 basically believes that it is communicating with an IP address associated with the control interface and nothing more. The IP address of the control interface 1410 is represented as feature 1428. As described above, the controlled interface communicates that data stream through the fiberoptic network 1414 and to the other side of the control interface which has its IP address 1429 from which the data stream is transmitted through the element 1426 to the recipient device 1404. Again, one aspect of this disclosure is essentially setting up in advance the established pairs of devices which will communicate with each other and including any necessary header data or triggers which will cause the communications to be routed to the proper controlled interface(s).

In other scenarios, there may be no pre-established or predetermined pairs of devices for which use of the controlled interface to handle the communication of data between the devices. In this scenario, the following process could be implemented. A user of device 1402 initiates a communication to device 1404 with some kind of indication that the communication between the two devices should be handled through controlled interface. The device 1402 might dial a phone number or identify a URL or start an app or any other kind communication that is meant to or is destined for device 1404. Device 1404 can be a server, another computer, a mobile device, a landline phone, a network node, a network-based service, and so forth. The initiation of the request from device 1404 is received at the node 1406. Rather than being routed directly to the recipient device 1404 and the normal manner, the processing in this scenario would require that the IP address of device 1404 or any identifying data for that device should be kept hidden from device 1402. Thus, at element 1425, the node 1420, 1406 can communicate that request to a separate controller 1418. The controller 1418 can be either at the same location as the node or at a separate location. The controller 1418 can receive the request to access device 1404 and can initiate a network function 1422 which essentially receives that request. The controller 1418 can then utilize the data associated with request, such as the called a phone number, the URL, or any other identifying information for device 1404 and can initiate or spawn a new network function 1420 which can act as a proxy for device 1402. The proxy device 1420 can then in a proxy action continue the request to communicate with device 1404 as though it were originating the request to access the device. An IP address can be shows associated with network function 1420 as well as network function 1422. In this scenario, it would be as though the device 1402 called the network function 1422 and separately through the network function 1420 called the device 1404. The regular handshake and acknowledgments can occur between these network functions and the respective devices such that communications can be set up respectively between the pairs of devices. In this scenario, the basic communication is essentially established between device 1402 and device 1404 but utilizing the separate network functions 1420, 1422. Then, the controller 1418 can transition the communication from the network controller 1418 to the controlled interface 1410. Utilizing the respective information known about the respective IP address as of device 1402 and 1404, the controller 1418 can populate the necessary tables 1412, 1416 with the necessary information for linking the data stream from device 1402 to be able to reach device 1404 through the controlled interface. The controller can manage the population of the tables 1412, 1416 according to the protocols described above such that upon the completion of the necessary testing and set up of the communication link, which can be done in the background, the user of device 1402 can uni or bidirectionally communicate with device 1404 either by voice or by data communication and so forth. The network functions 1420, 1422 are envisioned to be virtual objects that are spawned or created to establish this communication and after properly transitioning to the controlled interface, these virtual objects can be destroyed and completely deleted so that no record outside of the controlled interface exists which connects device 1402 device 1404 as communicating with each other. Appropriate encryption of all communications can occur between nodes or between devices to ensure that the data that ultimately populate tables 1412, 1416 can remain secured. Furthermore, a controlled interface can be established between the node 1416 and the controller 1418 such that all of the data that is communicated is also secure for populating the tables. Once the tables a populated and the set up protocol is established to be operational, device 1402 can communicate with device 1404 in a secure manner. As is described above, in this scenario, the device 1402 believes that it is communicating with the controlled interface 1410 having an IP address identified by feature 1428. The device 1402 has no idea about the IP address of device 1404.

Similarly, device 1404 appears to be communicating with the controlled interface 1410 having IP address identified by feature 1429. However, device 1404 has no idea of the ultimate IP address of device 1402 in this structure.

After tables are setup following an initial communication between devices, future communications can be easier. Mary may be able to dial John Doe's phone number and reach him—in which the network from her standpoint only knows to access the IP address of the controlled interface and lets the interface know that she is trying to reach John Doe's phone number—the tables with the controlled interface that store that data and cause the communication to go through securely to the other device.

In a 5G environment, or other wireless environment, device 1402 and device 1404 can transition from one node to another node which can include a heterogeneous environment where the types of modes differ in terms of communication. FIG. 14 illustrates device 1 (1402) moving to a new position 1432 and device 2 (1404) moving to a new position 1430 in which they are close to each other and have direct communication. Given that the controlled interface 1410 has the knowledge of the respective IP addresses in the respective tables, a handoff from communication through the controlled interface to a direct communication between the devices could appropriately occur inasmuch as the respective devices are appropriately identified and can securely communicate data directly with each other without the need of any network node which can be hacked.

Figure 15:
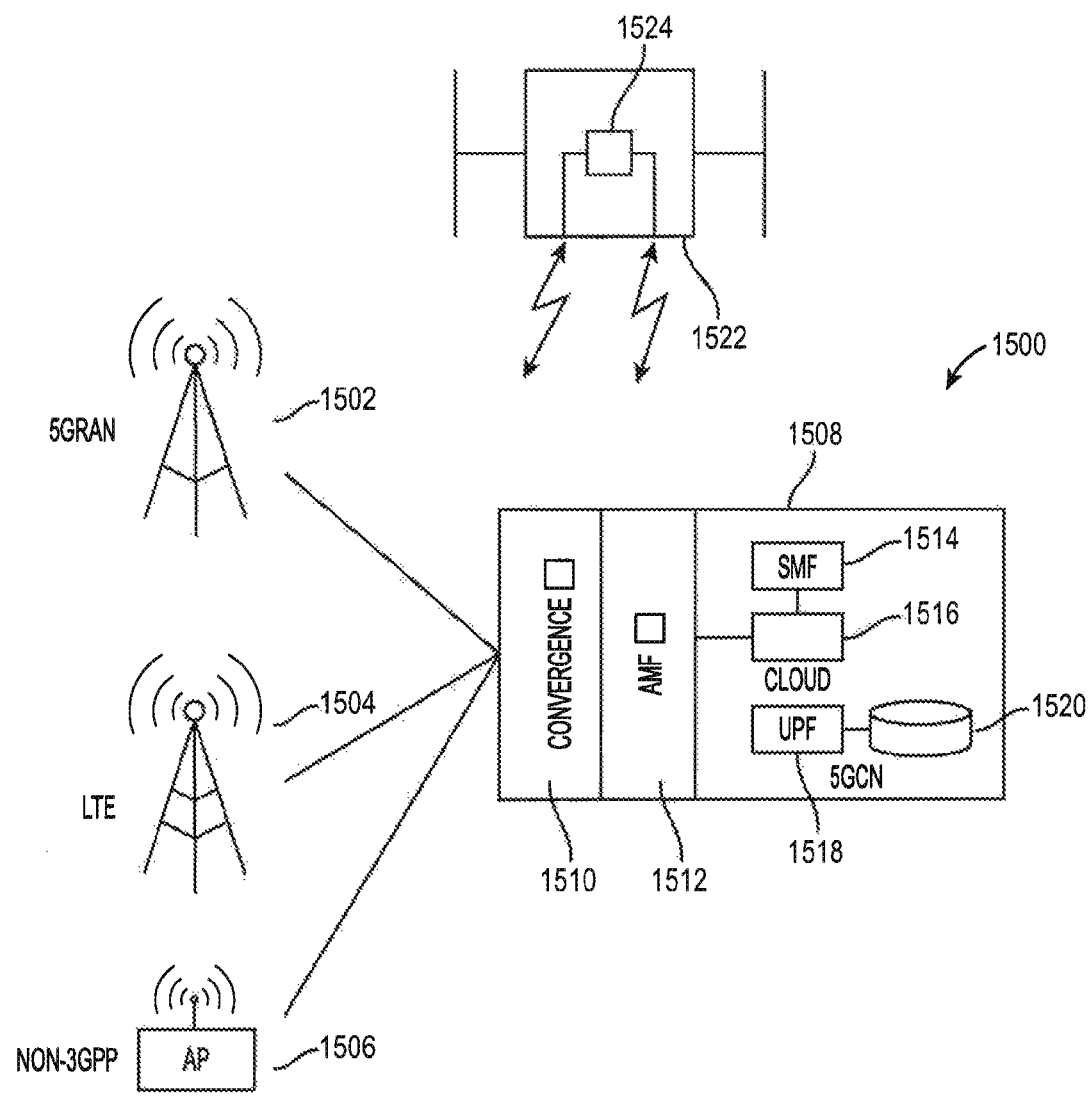
FIG. 15 illustrates an example 5G or other wireless system.

FIG. 15 illustrates a 5G infrastructure 1500 which includes a 5G radial access network 1502 and LTE cellular access point 1504 and a non-3GP access point 1506, such as a WiFi network. A network node 1508 can manage the communication from these disparate types of networks and can include a convergence function 1510, and access and mobility management function 1512 which can coordinate its communication from the different types of network. A session management function 1514 can communicate or control a cloud-based node 1516 which can coordinate the transmission of data between devices within the network. The user plane function 1518 is also used to transmit data to routers 1520.

The session management function (SMF) 1514 can handle such aspects as session management, traffic steering, policy enforcement, and control of quality of service. The SMF can include functionality related to the routing of traffic through control interfaces and the setup of the necessary table data for enabling to communications through a controlled interface.

The user access and mobility management function 1512 can include security issues, authentication, mobility management and SMF selection. This component in a 5G network can also be used to manage the routing of communications through a controlled interface component.

The user plane function 1518 can perform the functions of packet routing, packet inspection, a usage reporting and user plane quality of service handling. Again, this component in a 5G core network can also be used to route packets appropriately to a controlled interface component within the network.

The system can also include a satellite 1522 that can provide communication between devices. The system can incorporate a controlled interface 1524 into a satellite such that the satellite becomes the component that includes the controlled interface hardware and/or software functionality of the controlled interface.

A 5G network can handle and prioritize different traffic types and even different packets belonging to the same traffic type. In one scenario, data between a first device and the second device through the controlled interface may need to be divided into audio data, video data, text data, control data, or any other kind of data stream. By providing a granular means of communication, different packets belonging to different traffic types can be routed to different channels within the controlled interface or even to different controlled interfaces. For example, data streams with lots of data, such as video streams, can be directed to a large capacity controlled interface (which perhaps can be configured to dissipate more heat, for example), and low data streams may be routed to controlled interfaces which can handle less bandwidth. Different cost structures can be applied as well. Thus, with a single communication between different devices, different aspects of the communication can be separated and routed through different controlled interfaces and integrated for final viewing or consumption at the destination device.

One the aspects of a 5G network is to enable within the architecture a flexibility and heterogeneous access and vertical business integration and leveraging the significant advance on network function virtualization and software defined networking. In 5G, the system is able to create tenant or service specific networks. They do this through the concept of network slicing. Network slicing involves a decoupling of software based network functions from the underlying infrastructure resources by means of utilizing different resource abstraction technologies. In general, a network slices the logical network that provides specific network capabilities and network characteristics and includes the network functions, compute and network resources to meet the performance requirements of the tenants for instant verticals. A network slice can include both radio access network and control network functions and, depending on the degree of freedom desired, can also have management and orchestration components. A network slice can be dedicated to a specific tenant or partially shared by several tenants that have the same performance requirements for different security or policy settings. The decoupling between the virtualization of the physical infrastructure allows for the efficient scaling up or down of the slices and hence suggests that the economic viability of this approach can be adapted and used on demand. For example, different tenants can get their own network customers for specific purposes and an infrastructure provider can assign the required resources for network slice which in turn realizes each service of a service provider portfolio. The required resources are provided according to different resource commitment models ranging from rather static reservations to on-demand provisioning.

Part of the control plane, the common control network function (CCNF), is common to all or several slices. It includes the access and mobility management function (AMF) as well as the network slice selection function (NSSF), which is in charge of selecting core network slice instances. Different network slices can also have dedicated control plane functions such as the session management function (SMF), which manages PDU (protocol data unit) sessions. User plane functions can be dedicated to each slice. The radio access network selects a CCNF for a new PDU session. The CCNF may initiate the redirection of service for a device towards another CCNF, initially at session setup, or later on.

Network functionalities can be performed by a programmable and logical centralized controller that abstracts and homogenizes different network technologies. Such controller can make network slices programmable by controlling the top logical topology and functionality of the service chains as well as resource control inside the network slices. The approach implies multiple control points for the network. By operating a small number of such controllers, network operators reduce the complexity of the network management and control. In one aspect, virtual network functions can be deployed closely to users such as in a network slice supporting particular URLs thus reducing their experience latency. Through using network slices, new services can be enabled by just modifying the controller functions such that services that were not initially included by an operator in its architecture design can now be introduced and implemented as service specific enhancements. For example, a base station scheduler can communicate with a controller because the controller has a global view of the network slice and can optimize the mid to long-term behavior of scheduling algorithms and the resource all across allocation across them independently of the functional split implemented in the slice. Controllers can facilitate the optimization of network utilization such that a network and infrastructure providers can allocate unused resources to demanding network slices provided that the service level agreement is satisfied for all hosted network slices. More verticals can share the same infrastructure thus reducing operational costs as well as avoiding a time-consuming deployment of dedicated infrastructure. In these aspects, one centralized flexible application can control the heterogeneous network functions through specialized interfaces. Applying these general principles from 5G to the present case, network slices can include the applications of access to a controlled interface for desired secured communications. One of the new services that can be included and offered by a controller can be the use of or access to a controlled interface or a group of controlled interfaces for a communication. Geographic election of a particular controlled interface can also occur for latency purposes or to place the controller physically close to one of the nodes in a communication. Controlled interfaces could also be provided for containers in a network that have virtual IP addresses rather than physical IP addresses. Any two devices, services, virtual components, container, routers, and so forth can communicate with each other through a controlled interface.

Now, as disclosed above, a primary aspect of the controlled interface is the use of physical fiber-optic transceivers as described herein. Thus, in one aspect, a series of controlled interfaces could be established within the network which can then be accessed as part of this new architecture. There can be a decoupling of the software-based network functions, secured communications according to the protocols described herein, from the underlying physical hardware infrastructure resources by using an abstraction technology. Thus, a controller could securely maintain the necessary IP addresses (physical or virtual) and data utilized in the respective tables disclosed herein. A software-based version of the controlled interface could be deployed using proxy virtual objects for the hardware IP addresses on either side of the fiber-optic component of a controlled interface. In another aspect, a controller could maintain the necessary data for the underlying hardware-controlled interfaces and enable through software based network functions the assignment of communications between specifically identify devices to respective underlying hardware controlled interface infrastructure in a similar manner to network slicing in 5G.

In one aspect, a controller could also strategically assign or establish the location of a controlled interface either close to a device 1404 or close to a device 1406 depending on latency needs, availability of channels within a controlled interface, characteristics of different controlled interfaces, and so forth. In other words, controlled interface hardware may be distributed in various nodes throughout a network. A network controller with a global view of resources and capabilities may assign one or more controlled interfaces for use in a communication between a first device and the second device. In this aspect, a 5G or other network could offer a controlled interface as a service (ClaaS) capability. This capability could be paid for on-demand on a per use basis, could be built into a service level agreement for a customer, or could be pre-established for a set of components for regular communication across the controlled interface.

Different controlled interfaces could have different characteristics—such as different levels of security, different bandwidth capabilities, different affinities for different types of data (video versus metadata or control data), etc. A controller could route different data streams through different controlled interfaces according to any number of parameters such as cost, bandwidth needs, load-balancing, the desire to match data stream characteristics with controlled interface characteristics, etc.

Figure 16:
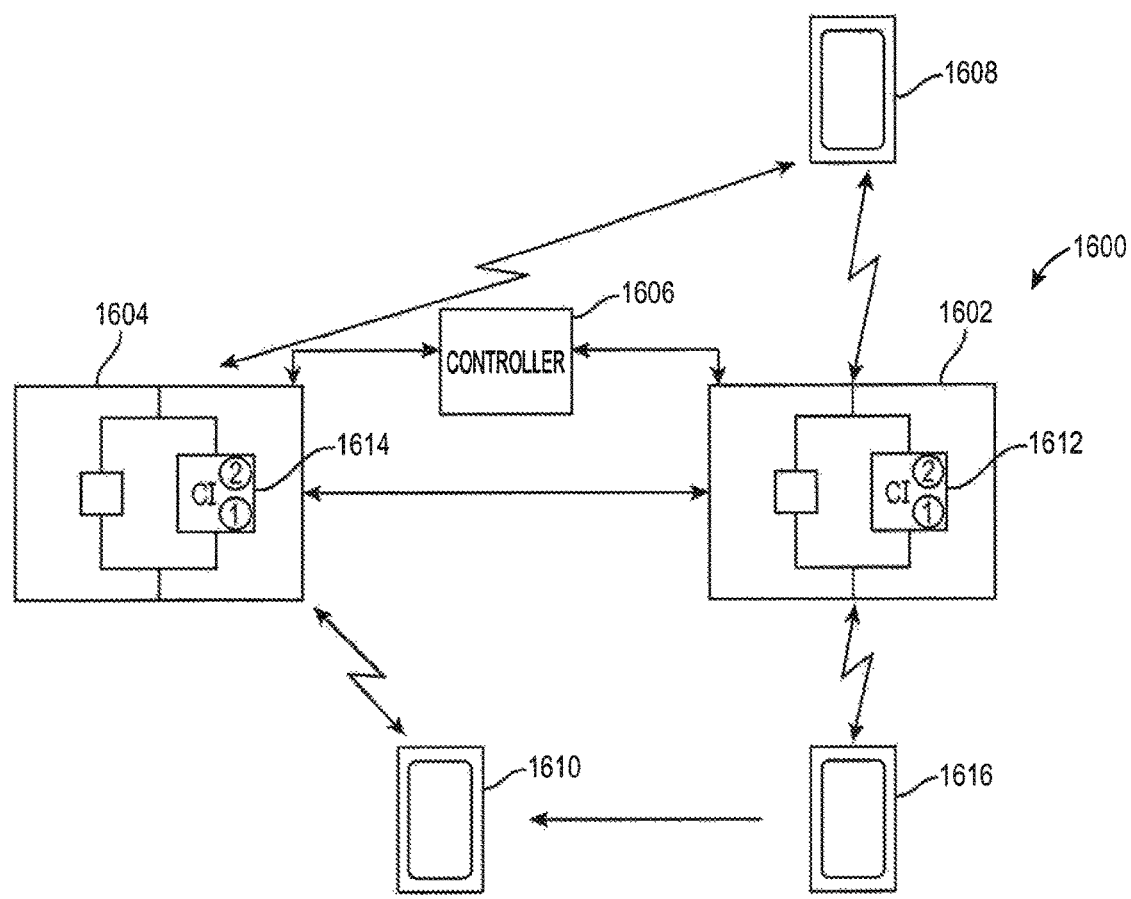
FIG. 16 illustrates a handoff in a wireless system.

FIG. 16 illustrates a handoff procedure given a first node 1602 and enough to a second node 1604 and a network 1600. These can be heterogeneous nodes types or they can be of the same type. Initially, assume the device 1610 is communicating with device 1608 through a node 1602 and its controlled interface 1612. As has been explained herein, device 1610 essentially only sees an IP address represented by the number (1) in the controlled interface 1612. Device 1608 only sees address (2) of the controlled interface 1612. Considering the scenario that device 1610 moves to a new position such that it no longer communicates with node 1602 but needs to transition or to have a handoff experienced to node 1604. In this scenario, a controller 1606 or via direct communication between node 1602 and node 1604, the fact that device 1610 needs to experience a handoff from one node to another involves some specialized procedures. As device 1610 begins to move towards the cell coverage area of device 1604, the system can communicate the necessary data in the tables of the controlled interface 1612 to the tables of controlled interface 1614. Preliminary communications can occur as described above with respect to establishing that the proper communication between device 1508 and device 1610 through node 1604 can occur through the controlled interface 1614. With the acknowledgments and establishment of the property communication occurring in node 1604, the system can transition the communications from being between device 1602 and device 1604. As noted above, there should be a make before break approach which requires the additional confirmation of communication between the controlled interface compared to regular handoffs in the cellular or 5G scenario. Accordingly, a handoff in the context of communication between a controlled interface might take longer to establish than a regular handoff. This extra time should be taken into account with respect to handoff protocols such that they either start earlier or the communication between the transferring node 1602 might need to be maintained longer.

In another aspect, because there is extra processing needed for controlled interface handoffs, in one scenario, a currently serving node 1602 could pre-establish data in respective tables of neighboring nodes such that the appropriate communications and establishment of the proper connections can be made in advance such that the handoff time is reduced and does not have to be performed dynamically. One potential way to confirm the entire communication link through a controlled interface would be to generate proxy network functions which can virtualize the existence of the respective devices. For example, in a pre-establishment of communications in node 1604, a virtual proxy version of device 1610 can be generated on the node 1404 as well as a proxy version of device 1608. In this scenario, the proxy device 1608 can communicate with the controlled interface 1614 use what utilizing the IP address (2) and can send test data to a proxy virtual function representing device 1610. By testing the communication link using proxy virtual devices, once device 1610 is close enough in the range of the cell coverage of node 1604, a quicker transition can occur which can enable a seamless transition from node 1602 to node 1604 while maintaining the entire time all communications through a controlled interface.

In yet another aspect, the device 1610 can transition from node 1602 to node 1604 but because the communication between device 1610 and 1608 is through a controlled interface, the controller 1606 can cause communication signals from device 1610 to be muted from node 1604 back to nodes 1602 and through the controlled interface 1612 which is already configured for secure communication between device 1610 and 1608. In this manner, a network virtual function can include the management of the communication between device 1610 and device 1608 is always being through one or more controlled interfaces.

Figure 17:
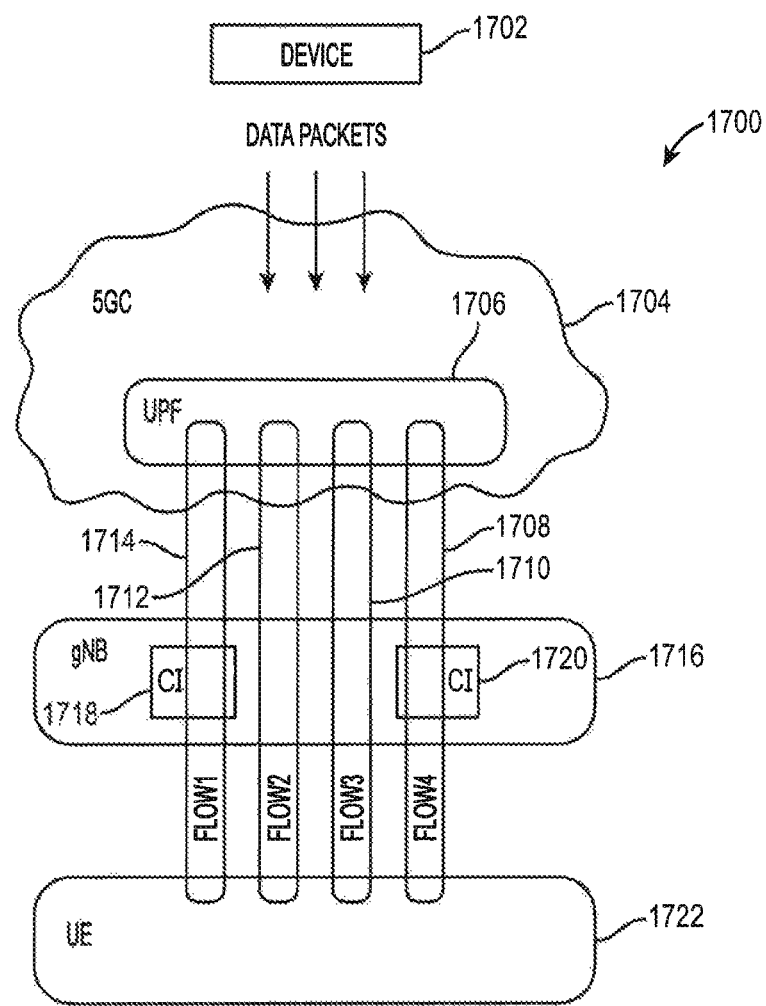
FIG. 17 illustrates an approach to controlling data flows in a wireless or other system.

FIG. 17 illustrates data flow 1700 between a device 1702 and user equipment 1722. Data packets travel through a 5G network 1704 which includes the user plane function 1706 which maps data packets to quality of service flows based on classification rules provided by the SMF 1514. This occurs on the down link. In the down link, the gNB 1716 maps quality of service flows to data radio bearers. The data packets are ultimately received by the user equipment 1722. Data flow one 1714, data flow to 1712, data flow 3 1710 and data flow for 1708 are shown as different quality of service flows. It is noted the data flow one 1714 is shown as flowing through a controlled interface 1718. Similarly, data flow for 1708 is shown as being routed through controlled interface 1720. Within 5G, a service data flow (SDF) classification and quality of service related information provided by the SMF 1514 to the user plane function 1706 can include data regarding routing of a particular flow through a controlled interface for a secure communication. The coordination between various components within a 5G network can occur to enable the proper population of tables with the necessary data in order to allow the communication between respective devices.

Generally speaking, in 5G, there is a flow-based approach which allows the decoupling of the assignment of packets to flows which is controlled by the core network, from the assignment of flows to data radio bearers which is typically the responsibility of the radio access network. Different quality of service flows are mapped to different flows shown in FIG. 17. The flexibility of managing the data flows within a 5G network enables the ability of routing a particular flow through a controlled interface (or more than one controlled interface) for the purpose of enabling a secure communication for that respective flow.

Figure 18:
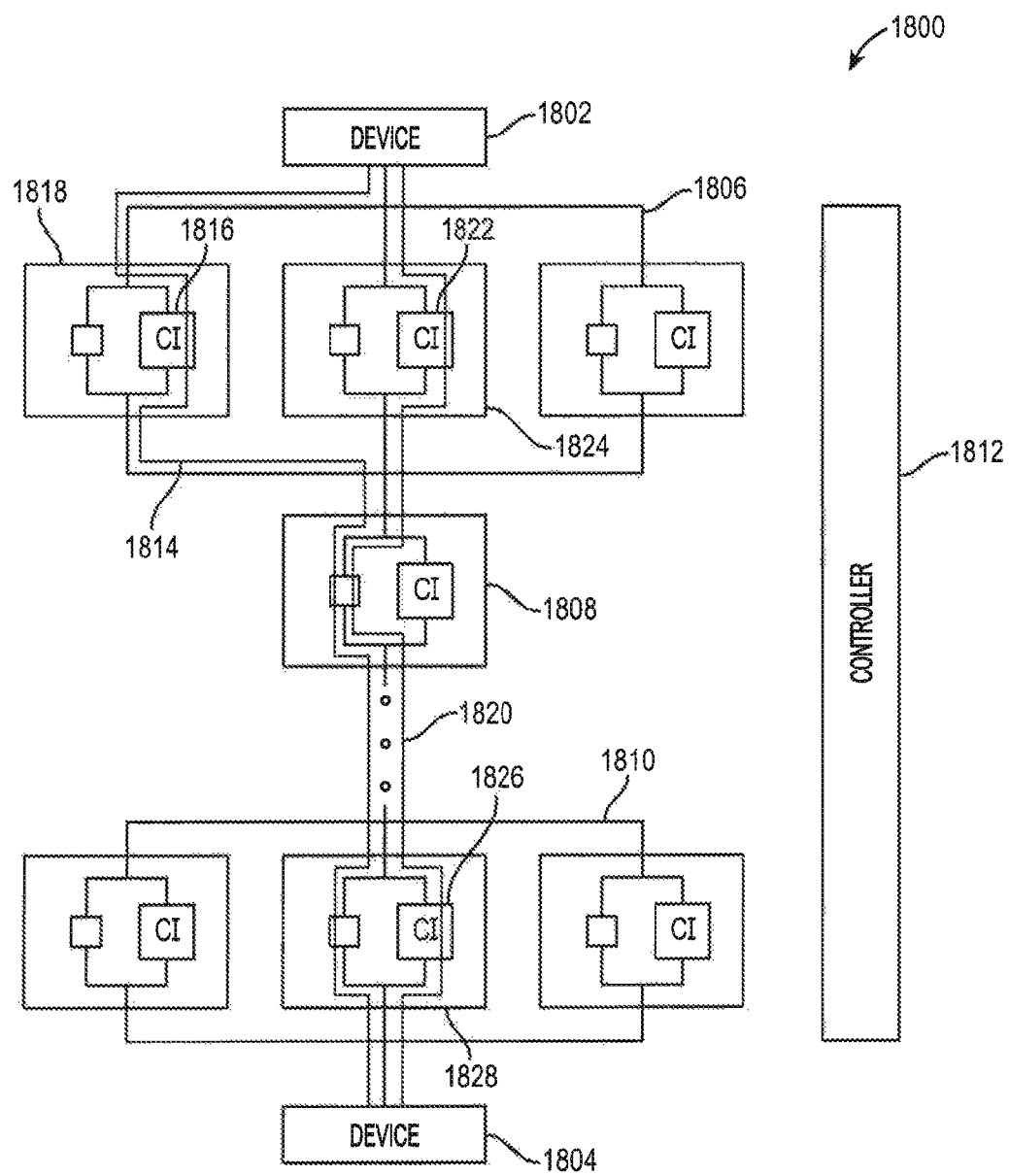
FIG. 18 illustrates flow control through various components of a system.

FIG. 18 illustrates an aspect of this disclosure and which a network 1800 provides communication between device 1802 and device 1804. In this scenario, a controller 1812 can be used to control the various aspects as has been disclosed herein. In this example, a series of nodes 1806 are shown as each including respective controlled interface. A node 1808 also is shown as including a controlled interface as well as feature 1810 which shows three nodes each having a respective controlled interface. This figure shows an example of how a network can include multiple different nodes in which respective nodes can each have controlled interfaces and how a controller 1812 or through distributed decentralized functionality, can provide for communication between device 1802 and device 1804 through one or more controlled interfaces. For example, routes 1814 can provide a communication path through controlled interface 1816 on node 1818. The selection of the control interface 1816 can be because it is close in proximity to device 1802 or for some other reason. Again, the selection of the controlled interface 1816 can be because of a number of different reasons and can be managed by one or more network components. In path 1814, only a single control interface 1816 is utilized. In another example, path 1820 is shown it is shown as going through a first controlled interface 1822 at node 1824 and then also through a second controlled interface 1826 at node 1826 which is near device 1804. In this scenario, the communication path goes through two controlled interfaces which provides even extra security. In this scenario, the tables established in controlled interface 1822 include an identification address for device 1802 on one end and an identification address for one side of the control interface 1826. In this scenario, data communicated between controlled interface 1822 and controlled interface 1826 only know of each other's respective IP addresses for the communication. The device 1804 only knows of the IP address of its side of the controlled interface 1826. In similar scenarios, communications can be established through chains of controlled interfaces which can include two or more controlled interfaces depending on the level of security and desired structure of the communication.

Figure 19:
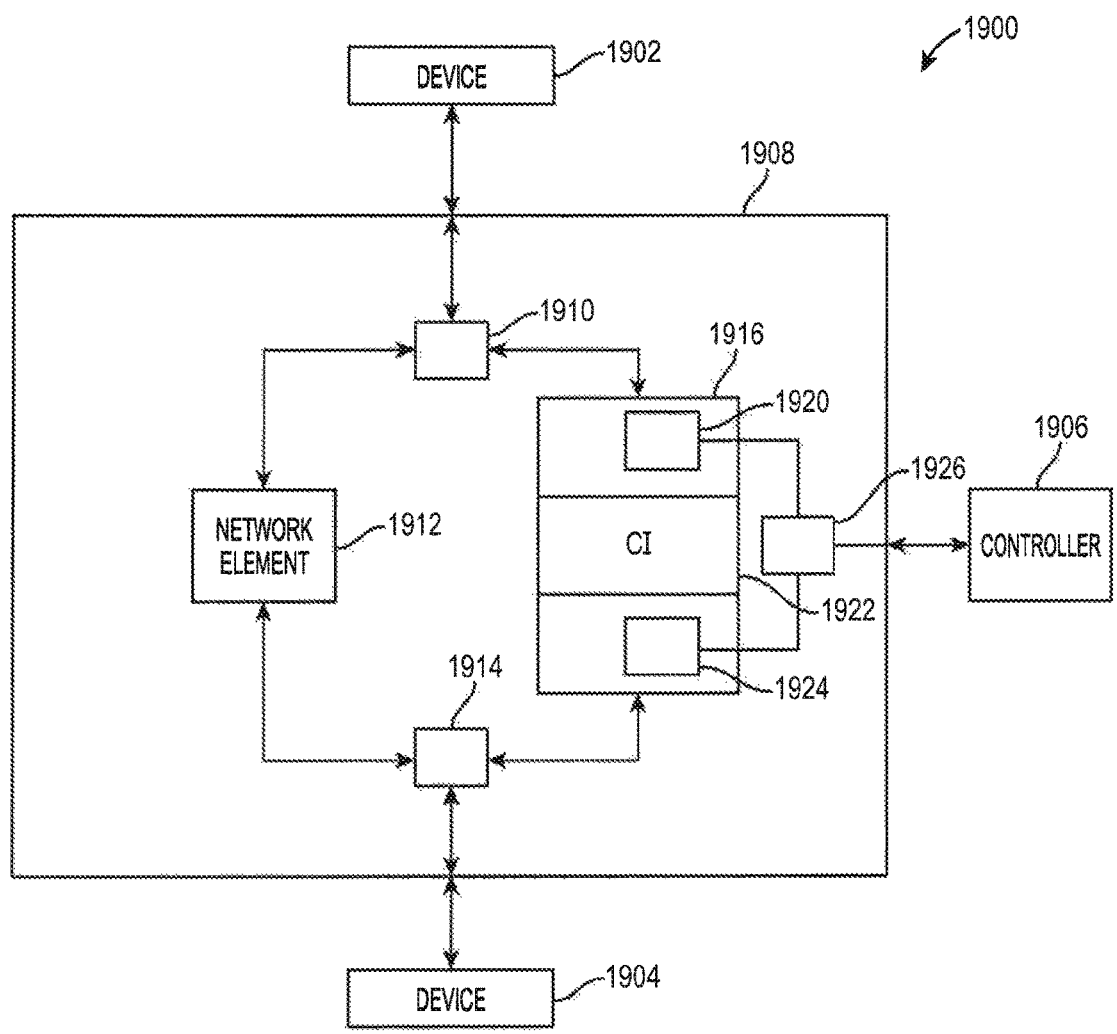
FIG. 19 illustrates another aspect of a 5G or other wireless system.

FIG. 19 illustrates another example network 1900 which includes a first device 1902 connected with a second device 1904. A network node 1908 represents any network node of any type in a 5G or other cellular network. A controller 1906 is shown which can represent any of the controllers in a 5G or other network. Element 1910 can represent a switch or routing element or even a controlled interface. A controlled interface 1916 is shown with one table 1920 on one side of control interface 1922 and a second table 224 on the other side of the controlled interface 1922. Element 1926 is used to communicate data between the node 1908 and the controller 1906. Again, the element 1926 can represent a controlled interface between the controlled interface 1916 and the controller 1906. The strength of this approach is that it can be a pre-established communication between the controller 1906 and the controlled interface 1916 such that it would be very difficult to hack into the controlled interface 1916 and identify the IP address is in the respective tables 1920, 1924. Network element 1912 represents the standard data flow through the node 1908. Element 1914 can be a switch or router and can include a controlled interface as well. Device 1904 communicates with node 1908 as described herein.

Figure 20:
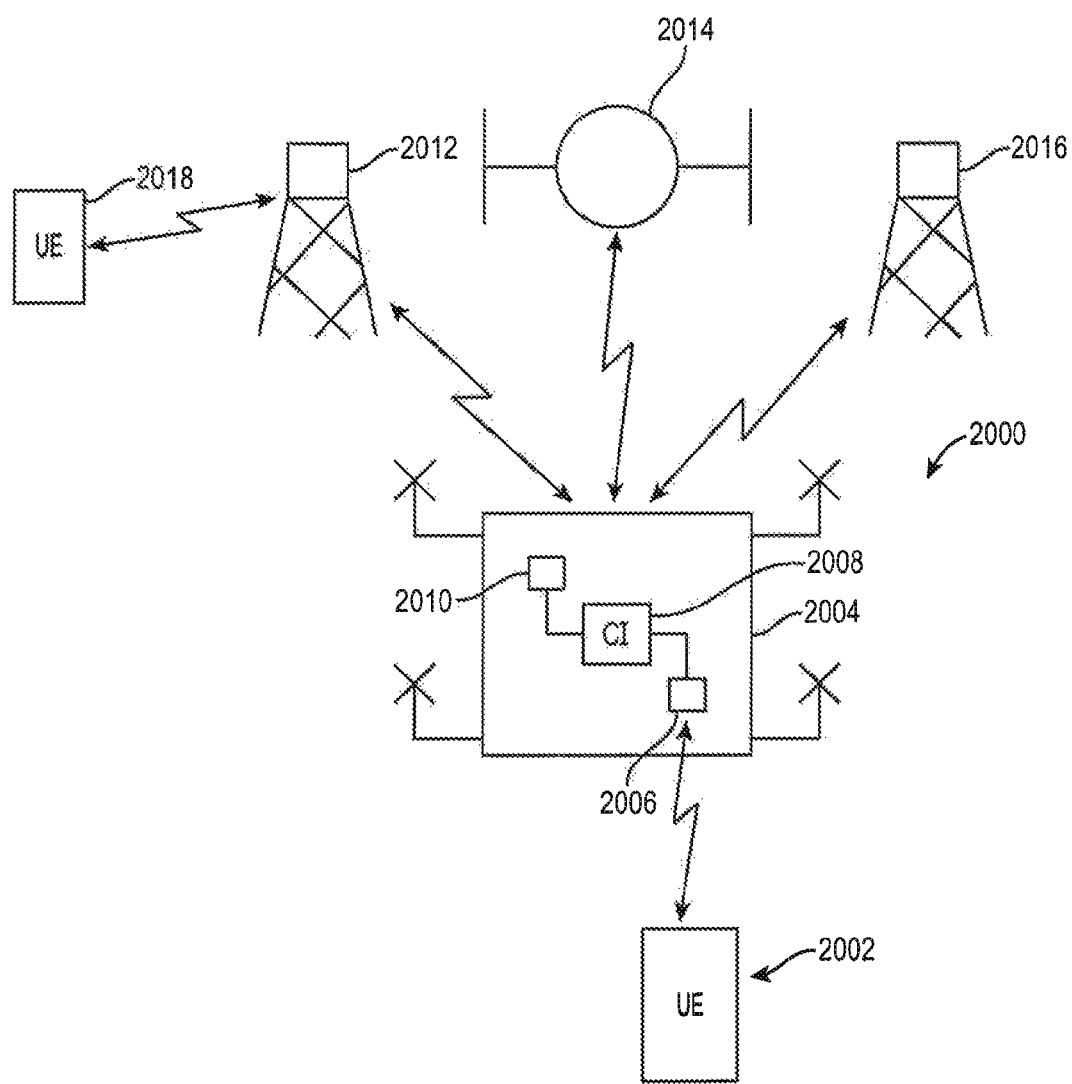
FIG. 20 illustrates a drone having a controlled interface.

FIG. 20 illustrates a drone aspect of this disclosure. In this aspect, the system 2000 can include a drone component which can enable the following functionality. Assume user equipment 2002 is implemented by a user who desires to communicate through a controlled interface is disclosed herein. The user may desire to have a consistent communication link with high bandwidth such as through a WiFi access point. The communication could be scheduled or could be dynamic. As shown in FIG. 20, a drone 2004 configured with a controlled interface 2008 could be deployed to be in the vicinity of the user equipment 2002. A communication module 2006 can be established with any wireless communication protocol such as WiFi, 5G, 4G, LTE, and so forth. The chosen communication protocol can depend on the distance that the drone 2004 will experience between it and the user equipment 2002. For example, if, given the terrain, the drone 2004 will be able to stay within a close enough proximity to the user equipment 2002, then a higher bandwidth WiFi communication link can be established. Either in advance, based on machine learning predictions of user motion, or dynamically, the drone 2004 can follow the user equipment such that the user equipment does not have to perform handoffs from one node to another as the user equipment moves. The user equipment 2002 can maintain a single consistent wireless connection to the drone 2004. The drone could also switch modes between a first mode (like a WiFi mode) at closer ranges and a second mode (such as WiFi, satellite or cellular) at longer ranges. The necessary tables can be populated between the user equipment 2002 and the other device 2018 that it communicates with in any manner as disclosed herein. For example, a separate controller can be used to receive initiation of communication from the user equipment 2002 and establish the appropriate addressing information and populate the tables on the drone. In some scenarios, the user might have an app which is used to initiate the communication and which orders the drone to come to the user equipment 2002 and to have the communication established with the drone 2004. The drone can use a communication module 2010 to communicate with various other nodes 2012, 2014, 2016 within a network and can perform handoffs from node to node as the drone moves through cell spaces.

A method aspect of this disclosure can include the process of requesting a drone having a controlled interface configured thereon, establishing necessary data within the tables associated with the controlled interface such that communication between a first device and a second device can occur by directionally or unidirectionally, enabling communication between the first device and the second device using the drone and through the controlled interface, and controlling the movement of the drone to follow or track movement of the first device such that no handoff is necessary as the first device moves. Again, the drone could switch between wireless protocols depending on any one or more of a distance to the user device, desired bandwidth or throughout, data requests (low data request or large data request). The drone can include a communication module that will communicate with various other nodes in a communication network and can perform handoffs from node to node on one side of the controlled interface for communication with the second device while maintaining a communication link with the first device via the other side of the controlled interface. One benefit of this approach is that it maintains a single communication link with the user equipment and does not require transitioning from one controlled interface on one node in the network to another controlled interface on another node of the network.

Another aspect of this disclosure relates to new mechanisms for securely transmitting IP address or device identification data to a controlled interface. Currently, Apple Pay, a process for enabling the delivery of payment data to a website or an application is being rolled out. There are certain APIs and components that combine to enable this process of improving payments to websites or applications. Merchants create a merchant ID and a payment processing certificate and program their website or their applications using the proper code to enable Apple Pay. PassKit APIs or Apple Pay APIs are built into software components on computing devices or browsers in order for the application or website to present a simple apple pay button. Upon pressing the button, a request is transmitted to a software module such as a Payment Authorization View Controller. PassKit Framework, browser such as Safari. The software component then retrieves stored payment data from a secure element on the user's device. This can be encrypted in connection with the request for a purchase. The software component than communicates with an apple server that re-encrypts the data and returns a payment token to the software module. The software module then communicates the payment token to the website or applications which can either decrypt the token itself or send the token off to a payment processor. This basic process enables a one-time use payment token that does not reveal the user's credit card or payment data in the payment process.

Applicant summarizes the Apple Pay approach above because it can be applicable to a mechanism of delivering securely an IP address or device identification data in connection with setting up a secure committee between a device and a second device. For example, a controlled interface can register with a network entity with identification data similar to a merchant ID. A communication processing certificate can be created as well. IDs and certificates can be set up separately for both sides of a controlled interface or just one for the controlled interface could be set up. Upon a first device requesting or initiating a communication with a second device that should be performed using a controlled interface therebetween, a request can be sent from a first side of the controlled interface to a software module associated with the first device. The request can include data for the communication that is unique. The software module on the first device can perform a number of different actions similar to Apple Pay or different as well. For example, secure data can be stored in a secure element of the device which can be retrieved by the software module through an API programmed with protocols for communicating such data. This can be an initial encrypted token. The software module can transmit the first encrypted token to a network entity that encrypts again the token using the controlled interface ID and sends back the second token to the software module, which can then transmit the second token via the API to the first side of the controlled interface. A similar process can occur for the second device and the second side of the controlled interface. In this manner, the XML tables that need to be established to enable the secure communication can each receive the identification data for the respective devices in a secure manner via one-time use tokens that are tailored and encrypted specific to the controlled interface and even to a particular side of the controlled interface. Controlled interface verification processes can occur in a similar way to merchant verification processes occur in Apple Pay.

All signaling, requests, responses, acknowledgements, encryption, tokenization, security measures, or other communications, using wireless modes. APIs, protocols for communicating data as described or suggested herein, are considered as part of this disclosure. Embodiments can include any mixing or matching of features described in any example. Examples can also be described from the standpoint of any component, node, controlled interface, router, or combination of components.

Another aspect of this disclosure can relate to blockchain technology. Blockchain technology can be used to store data about the setup needs for a controlled interface to handle the communication between entities. Blockchain technology utilizes a distributed ledger in a trustless environment of a plurality of nodes that will operate a consensus algorithm to determine whether new transactional data is proper to add to the blockchain network (i.e., to add a new block to the blockchain recording the transaction information). The data about a set up (the right IP addresses of the endpoints and other addressing for the opposite sides of the controlled interface, etc.), can be stored on the blockchain and accessed by the necessary sides of the controlled interface for populating the proper tables. For example, a user might call a number or seek access to a network server through a browser, or in another way seek a communication from one entity to another. The data about that overall communication could be accessed and identified and stored securely on the blockchain. Then the communication points on either side of the controlled interface might then be able to access the necessary data from the blockchain and populate their tables to enable the communication.

In one aspect, at each controlled interface node, the node could also be a node of a blockchain network such that a ledger of the blockchain could be right at the controlled interface such that no network communication that can be hacked exists between the controlled interface and the source of the addressing data. The ledger or a copy of the ledger can be stored in a secure way the data and can also be used to keep the data apart between the two entities communicating with each other. A smart contract could be programmed on the blockchain for managing the steps that need to occur to identify the endpoint addresses and populate the controlled interface tables and initiate the communication between the endpoints through the controlled interface. In one aspect, the distributed ledger on the blockchain can also store securely the tables necessary for the controlled interface to work. In this regard, when the data would be in the ledger, a first endpoint can request to access a second endpoint (telephone call, URL access via a browser, connecting with a camera, etc.), can initiate the communication. Typically, the first endpoint will only know the IP address or address data for a first side of the controlled interface. As the first endpoint initiates that communication, the controlled interface can access the table stored on the blockchain to populate the necessary tables on both sides of the controlled interface to then set up the communication between the first endpoint and the second endpoint such that the two endpoints can communicate but not actually know of each other's addresses.

The following are various statements related to the concepts disclosed herein. A controlled interface for managing data communicated between a first device and a second device can include a first component communicating with the first device via a first network connection: a first media converter having a first media converter disabled transmit port and a first media converter receive port, the first media converter being connected via a second network connection to the first component; a second media converter having a second media converter transmit port and a second media converter receive port, the second media converter being connected via a third network connection to the first component; a second component communicating with the second device via a fourth network connection; a third media converter having a third media converter transmit port and a third media converter receive port, the third media converter communicating with the second component via a fifth network connection; a fourth media converter having a fourth media converter disabled transmit port and a fourth media converter receive port, the fourth media converter communicating with the second component via a sixth network connection; a fifth media converter having a fifth media converter disabled receive port and a fifth media converter transmit port. A spoofing fiber-optic signal transmitted from the fifth media converter transmit port can be communicated to both of the second media converter receive port and the third media converter receive port. The third media converter transmit port can be connected to the first media converter receive port. The second media converter transmit port can be connected to the fourth media converter receive port.

The controlled interface can further include a splitter that receives the spoofing fiber-optic signal transmitted from the fifth media converter transmit port and splits the spoofing fiber-optic signal into a first spoofing fiber-optic signal and a second spoofing fiber-optic signal and sends the first spoofing fiber-optic signal to the second media converter receiver port and the second spoofing fiber-optic signal to the third media converter receive port.

The fifth media converter can include a first spoofer media converter and a second spoofer media converter, wherein the first spoofer media converter provides a first spoofing fiber-optic signal to the second media converter receiver port and the second spoofer media converter provides a second spoofing fiber-optic signal to the third media converter receiving port.

The fifth media converter can be configured to disable a link loss forwarding feature. At least one of the first component and the second component can store low-level hardware addresses configured to identify at least one or more of an address, a protocol type or port, and a device name. The protocol type can include at least one or more of Ethernet, TCP, UDP, UDP multicast, or other web service. The address can include an address used to communicate a data stream from the first component to the second component through one or more of the first media converter, the second media converter, the third media converter and the fourth media converter.

The first component can receive first data from the first device, strips IP protocol metadata associated with the first data, assign a low-level address to the first data according to an addressing protocol, and transmit the first data to the second media converter according to the low-level address for communication to the fourth media converter.

A method of communicating signals between a first device and a second device via a controlled interface can involve a first component communicating with the first device via a first network connection; a first media converter having a first media converter disabled transmit port and a first media converter receive port, the first media converter connected via a second network connection to the first component; a second media converter having a second media converter transmit port and a second media converter receive port, the second media converter connected via a third network connection to the first component; a second component communicating with the second device via a fourth network connection; a third media converter having a third media converter transmit port and a third media converter receive port, the third media converter communicating with the second component via a fifth network connection; a fourth media converter having a fourth media converter disabled transmit port and a fourth media converter receive port, the fourth media converter communicating with the second component via a sixth network connection; a fifth media converter having a fifth media convert disabled receive port and a fifth media converter transmit port. A spoofing fiber-optic signal transmitted from the fifth media converter transmit port can be communicated to both of the second media converter receive port and the third media converter receive port. The third media converter transmit port can be connected to the first media converter receive port. The second media converter transmit port can be connected to the fourth media converter receive port.

The method can include storing a first low-level protocol address for the first device and a second low-level protocol address for the second device in the first component and the second component; receiving a first signal from the first device at the first component; transmitting, via the third network connection, the first signal to the second media converter for converting the first signal to a first fiber-optic signal; transmitting the first fiber-optic signal from the second media converter transmit port to the fourth media converter receive port for converting the first fiber-optic signal into a first received signal; transmitting the first received signal to the second component via the sixth network connection and transmitting the first received signal from the second component to the second device via the fourth network connection.

The method can further include transmitting a second signal from the second device by receiving the second signal via the fourth network connection at the second component; transmitting the second signal from the second component to the third media converter via the fifth network connection for conversion to a second fiber-optic signal; transmitting the second fiber-optic signal from the third media converter transmit port to the first media converter receive port for conversion to a second received signal; transmitting the second received signal from the first media converter to the first component via the second network connection; and transmitting the second received signal from the first component to the first device via the first network connection.

A method of using a controlled interface for managing data communicated between a first device and a second device can include storing a first low-level protocol address in a first component and a second low-level protocol address in a second component; receiving a first signal from the first device at the first component, the first signal having first high-level addressing data; stripping the first high-level addressing data associated with the first signal to yield a first payload; associating the first low-level protocol address with the first payload to yield a first low-level addressed payload;

transmitting the first low-level addressed payload to a first media converter for converting the first low-level addressed payload to a first fiber-optic signal; transmitting the first fiber-optic signal from the first media converter to a second media converter for converting the first fiber-optic signal back into the first low-level addressed payload; transmitting the first low-level addressed payload from the second media converter to the second component; stripping the first low-level protocol address associated with the first low-level addressed payload to yield a second payload; associating a second high-level addressing data to the second payload to yield a second high-level addressed payload; and transmitting the second high-level addressed payload from the second component to the second device.

The first media converter can receive a spoofer fiber-optic signal at a receive port. The method can further include transmitting a second signal from the second device to the first device by: receiving the second signal at the second component, the second signal having second high-level addressing data; stripping the second high-level addressing data associated with the second signal to yield a third payload; associating the second low-level protocol address with the third payload to yield a second low-level addressed payload; transmitting the second low-level addressed payload from the second component to a third media converter for conversion to a second fiber-optic signal; transmitting the second fiber-optic signal from the third media converter to a fourth media converter for conversion back to the second low-level addressed payload; transmitting the second low-level addressed payload from the fourth media converter to the first component; stripping the second low-level addressing data associated with the second low-level addressed payload to yield a fourth payload; associating a third high-level address to the fourth payload to yield third high-level addressed payload; and transmitting the third high-level addressed payload from the first component to the first device.

The method can further include providing a spoofing fiber-optic signal to the third media converter.

A fifth media converter an include a first spoofer media converter and a second spoofer media converter, wherein the first spoofer media converter provides a first spoofing fiber-optic signal to the second media converter receiver port and the second spoofer media converter provides a second spoofing fiber-optic signal to the third media converter receiving port.

The fifth media converter can be configured to disable a link loss forwarding feature.

At least one of the first component and the second component can store low-level hardware addresses configured to identify at least one or more of an address, a protocol type, and a device name. The protocol type can include at least one or more of Ethernet, TCP, UDP, UDP multicast, or other web service. The address can include an address used to communicate a data stream from the first component to the second component through one or more of the first media converter, the second media converter, the third media converter and the fourth media converter.

In one aspect, the first component is connected to the first device and the second component is connected to the second device. Any of the methods disclosed above can include one or more of the steps outlined in any order. Steps from one example can also be applied in another example.

Methods according to the above-described examples can be implemented using computer-executable instructions that are stored or otherwise available from computer readable media. Such instructions can include, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Any feature described in any embodiment or example can be combinable with any other feature of any other example or embodiment. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

---

APPENDIX A: Example XML code

```
elementFormDefault="qualified"
targetNamespace="Cicero"
xmlns:xs="http://www.w3.org/2001/XMLSchema">
<xs:annotation>
  <xs:documentation xml:lang="en">
  </xs:documentation>
</xs:annotation>
<xs:complexType name="IPV4EndpointQualifier">
  <xs:sequence>
    <xs:element name="underscore" fixed,"">
      <xs:simpleType>
        <xs:restriction base="xs:token">
          <xs:length value="1" />
        </xs:restriction>
```

APPENDIX A: Example XML code

```xml
      </xs:simpleType>
    </xs:element>
    <xs:element name="octet1">
      <xs:simpleType>
        <xs:restriction base="xs:unsignedByte">
          <xs:minInclusive value="0"/>
          <xs:maxInclusive value="255" />
          <xs:pattern value,"[0-9]{1,3}" />
        </xs:restriction>
      </xs:simpleType>
    </xs:element>
    <xs:element name="period1" fixed=".">
      <xs:simpleType>
        <xs:restriction base="xs:token">
          <xs:length value="1" />
        </xs:restriction>
      </xs:simpleType>
    </xs:element>
    <xs:element name="octet2">
      <xs:simpleType>
        <xs:restriction base="xs:unsignedByte">
          <xs:minInclusive value="0" />
          <xs:maxInclusive value="255" />
          <xs:pattern value,"[0-9]{1,3}" />
        </xs:restriction>
      </xs:simpleType>
    </xs:element>
    <xs:element name="period2" fixed=".">
      <xs:simpleType>
        <xs:restriction base="xs:token">
          <xs:length value="1" />
        </xs:restriction>
      </xs:simpleType>
    </xs:element>
    <xs:element name="octet3">
      <xs:simpleType>
        <xs:restriction base="xs:unsignedByte">
          <xs:minInclusive value="0" />
          <xs:maxInclusive value="255" />
          <xs:pattern value="[0-9]{1,3}" />
        </xs:restriction>
      </xs:simpleType>
    </xs:element>
    <xs:element name="period3" fixed=".">
      <xs:simpleType>
        <xs:restriction base="xs:token">
          <xs:length value="1" />
        </xs:restriction>
      </xs:simpleType>
    </xs:element>
    <xs:element name="octet4">
      <xs:simpleType>
        <xs:restriction base="xs:unsignedByte">
          <xs:minInclusive value="0" />
          <xs:maxInclusive value="255" />
          <xs:pattern value,"[0-9]{1,3}" />
        </xs:restriction>
      </xs:simpleType>
    </xs:element>
    <xs:element name="dollarSign" fixed="$">
      <xs:simpleType>
        <xs:restriction base="xs:token">
          <xs:length value="1" />
        </xs:restriction>
      </xs:simpleType>
    </xs:element>
    <xs:element name="quadgraph" >
      <xs:simpleType >
        <xs:restriction base="xs:string">
          <xs:length value="4" />
          <xs:enumeration value="_tcp"/>
          <xs:enumeration value="_udp"/>
          <xs:enumeration value="_umc"/>
          <xs:enumeration value="iws1"/>
          <xs:enumeration value="iwc1"/>
        </xs:restriction>
      </xs:simpleType>
    </xs:element>
    <xs:element name="port">
      <xs:simpleType>
        <xs:restriction base="xs:unsignedShort">
          <xs:minInclusive value="0" />
          <xs:maxInclusive value="65535" />
          <xs:pattern value,"[0-9]{1,5}" />
        </xs:restriction>
      </xs:simpleType>
    </xs:element>
    <xs:element name="colon" fixed=": ">
      <xs:simpleType>
        <xs:restriction base="xs:token">
          <xs:length value="1" />
        </xs:restriction>
      </xs:simpleType>
    </xs:element>
  </xs:sequence>
</xs:complexType>
<xs:complexType name="CIEndpointQualifier">
  <xs:sequence>
    <xs:element name="underscore" fixed="_">
      <xs:simpleType>
        <xs:restriction base="xs:token">
          <xs:length value="1" />
        </xs:restriction>
      </xs:simpleType>
    </xs:element>
    <xs:element name="octet1">
      <xs:simpleType>
        <xs:restriction base="xs:hexBinary">
          <xs:length value="1" />
        </xs:restriction>
      </xs:simpleType>
    </xs:element>
    <xs:element name="period1" fixed=".">
      <xs:simpleType>
        <xs:restriction base="xs:token">
          <xs:length value="1" />
        </xs:restriction>
      </xs:simpleType>
    </xs:element>
    <xs:element name="octet2">
      <xs:simpleType>
        <xs:restriction base="xs:hexBinary">
          <xs:length value="1" />
        </xs:restriction>
      </xs:simpleType>
    </xs:element>
    <xs:element name="period2" fixed=".">
      <xs:simpleType>
        <xs:restriction base="xs:token">
          <xs:length value="1" />
        </xs:restriction>
      </xs:simpleType>
    </xs:element>
    <xs:element name="octet3">
      <xs:simpleType>
        <xs:restriction base="xs:hexBinary">
          <xs:length value="1" />
        </xs:restriction>
      </xs:simpleType>
    </xs:element>
    <xs:element name="period3" fixed=".">
      <xs:simpleType>
        <xs:restriction base="xs:token">
          <xs:length value="1" />
        </xs:restriction>
      </xs:simpleType>
    </xs:element>
    <xs:element name="octet4">
      <xs:simpleType>
        <xs:restriction base="xs:hexBinary">
          <xs:length value="1" />
        </xs:restriction>
      </xs:simpleType>
    </xs:element>
```

| APPENDIX A: Example XML code |
|---|
| ```
<xs:element name="period4" fixed=".">
    <xs:simpleType>
        <xs:restriction base="xs:token">
            <xs:length value="1" />
        </xs:restriction>
    </xs:simpleType>
</xs:element>
<xs:element name="octet5">
    <xs:simpleType>
        <xs:restriction base="xs:hexBinary">
            <xs:length value="1" />
        </xs:restriction>
    </xs:simpleType>
</xs:element>
<xs:element name="period5" fixed=".">
    <xs:simpleType>
        <xs:restriction base="xs:token">
            <xs:length value="1" />
        </xs:restriction>
    </xs:simpleType>
</xs:element>
<xs:element name="octet6">
    <xs:simpleType>
        <xs:restriction base="xs:hexBinary">
            <xs:length value="1" />
        </xs:restriction>
    </xs:simpleType>
</xs:element>
<xs:element name="dollarSign" fixed="$">
    <xs:simpleType>
        <xs:restriction base="xs:token">
            <xs:length value="1" />
        </xs:restriction>
    </xs:simpleType>
</xs:element>
<xs:element name="quadgraph" >
    <xs:simpleType>
        <xs:restriction base="xs:string">
            <xs:length value="4" />
            <!-- <xs:enumeration value="en0"/> -->
            <xs:enumeration value="eth1"/>
            <xs:enumeration value="eth2"/>
            <xs:enumeration value="eth3"/>
            <xs:enumeration value="eth4"/>
        </xs:restriction>
    </xs:simpleType>
</xs:element>
<xs:element name="protocor>
    <xs:simpleType>
        <xs:restriction base="xs:hexBinary">
            <xs:length value="2" />
        </xs:restriction>
    </xs:simpleType>
</xs:element>
<xs:element name="colon" fixed=":">
    <xs:simpleType>
        <xs:restriction base="xs:token">
            <xs:length value="1" />
            </xs:restriction>
        </xs:simpleType>
    </xs:element>
    </xs:sequence>
</xs:complexType>
<xs:element name="RuntimeEndpoints">
    <xs:complexType>
        <xs:sequence>
            <xs:element name="Source" minOccurs="1" maxOccurs="1">
                <xs:complexType>
                    <xs:choice>
                        <xs:element xmlns:cli="Cicero" name="CtrlIF" type="cli:CIEndpointQualifier" />
                        <xs:element xmlns:cli="Cicero" name="IPV4" type="cli:IPV4EndpointQualifier" />
                    </xs:choice>
                </xs:complexType>
            </xs:element>
            <xs:element name="Destination" minOccurs="1" maxOccurs="4">
``` |

| APPENDIX A: Example XML code |
|---|
| ```
                <xs:complexType>
                    <xs:choice>
                        <xs:element xmlns:cli="Cicero" name="CtrlIF" type="cli:CIEndpointQualifier" />
                        <xs:element xmlns:cli="Cicero" name="IPV4" type="cli:IPV4EndpointQualifier" />
                    </xs:choice>
                </xs:complexType>
            </xs:element>
        </xs:sequence>
    </xs:complexType>
</xs:element>
</xs:schema>
``` |

What is claimed is:

1. A controlled interface for managing data communicated between a first device and a second device, the controlled interface comprising:
 a first component communicating with the first device via a first network connection;
 a first media converter having a first media converter disabled transmit port and a first media converter receive port, the first media converter being connected via a second network connection to the first component;
 a second media converter having a second media converter transmit port and a second media converter receive port, the second media converter being connected via a third network connection to the first component;
 a second component communicating with the second device via a fourth network connection;
 a third media converter having a third media converter transmit port and a third media converter receive port, the third media converter communicating with the second component via a fifth network connection;
 a fourth media converter having a fourth media converter disabled transmit port and a fourth media converter receive port, the fourth media converter communicating with the second component via a sixth network connection;
 a fifth media converter having a fifth media converter disabled receive port and a fifth media converter transmit port, wherein:
  a spoofing fiber-optic signal transmitted from the fifth media converter transmit port is communicated to both of the second media converter receive port and the third media converter receive port;
  the third media converter transmit port is connected to the first media converter receive port; and
  the second media converter transmit port is connected to the fourth media converter receive port.

2. The controlled interface of claim 1, further comprising:
 a splitter that receives the spoofing fiber-optic signal transmitted from the fifth media converter transmit port and splits the spoofing fiber-optic signal into a first spoofing fiber-optic signal and a second spoofing fiber-optic signal and sends the first spoofing fiber-optic signal to the second media converter receiver port and the second spoofing fiber-optic signal to the third media converter receive port.

3. The controlled interface of claim 1, wherein the fifth media converter comprises a first spoofer media converter and a second spoofer media converter, wherein the first spoofer media converter provides a first spoofing fiber-optic signal to the second media converter receiver port and the second spoofer media converter provides a second spoofing fiber-optic signal to the third media converter receiving port.

4. The controlled interface of claim 1, wherein the fifth media converter is configured to disable a link loss forwarding feature.

5. The controlled interface of claim 1, wherein at least one of the first component and the second component stores low-level hardware addresses configured to identify at least one or more of an address, a protocol type or port, and a device name.

6. The controlled interface of claim 5, wherein the protocol type comprises at least one or more of Ethernet, TCP, UDP, UDP multicast, or other web service.

7. The controlled interface of claim 5, wherein the address comprises an address used to communicate a data stream from the first component to the second component through one or more of the first media converter, the second media converter, the third media converter and the fourth media converter.

8. The controlled interface of claim 1, wherein the first component receives first data from the first device, strips IP protocol metadata associated with the first data, assigns a low-level address to the first data according to an addressing protocol, and transmits the first data to the second media converter according to the low-level address for communication to the fourth media converter.

9. A method of communicating signals between a first device and a second device via a controlled interface, wherein the controlled interface comprises:
a first component communicating with the first device via a first network connection;
a first media converter having a first media converter disabled transmit port and a first media converter receive port, the first media converter connected via a second network connection to the first component;
a second media converter having a second media converter transmit port and a second media converter receive port, the second media converter connected via a third network connection to the first component;
a second component communicating with the second device via a fourth network connection;
a third media converter having a third media converter transmit port and a third media converter receive port, the third media converter communicating with the second component via a fifth network connection;
a fourth media converter having a fourth media converter disabled transmit port and a fourth media converter receive port, the fourth media converter communicating with the second component via a sixth network connection;
a fifth media converter having a fifth media convert disabled receive port and a fifth media converter transmit port, wherein: (1) a spoofing fiber-optic signal transmitted from the fifth media converter transmit port is communicated to both of the second media converter receive port and the third media converter receive port; (2) the third media converter transmit port is connected to the first media converter receive port; and (3) the second media converter transmit port is connected to the fourth media converter receive port, the method comprising:
storing a first low-level protocol address for the first device and a second low-level protocol address for the second device in the first component and the second component;
receiving a first signal from the first device at the first component;
transmitting, via the third network connection, the first signal to the second media converter for converting the first signal to a first fiber-optic signal;
transmitting the first fiber-optic signal from the second media converter transmit port to the fourth media converter receive port for converting the first fiber-optic signal into a first received signal;
transmitting the first received signal to the second component via the sixth network connection; and
transmitting the first received signal from the second component to the second device via the fourth network connection.

10. The method of claim 9, further comprising transmitting a second signal from the second device by:
receiving the second signal via the fourth network connection at the second component;
transmitting the second signal from the second component to the third media converter via the fifth network connection for conversion to a second fiber-optic signal;
transmitting the second fiber-optic signal from the third media converter transmit port to the first media converter receive port for conversion to a second received signal;
transmitting the second received signal from the first media converter to the first component via the second network connection; and
transmitting the second received signal from the first component to the first device via the first network connection.

11. A method of using a controlled interface for managing data communicated between a first device and a second device, the method comprising:
storing a first low-level protocol address in a first component and a second low-level protocol address in a second component;
receiving a first signal from the first device at the first component, the first signal having first high-level addressing data;
stripping the first high-level addressing data associated with the first signal to yield a first payload;
associating the first low-level protocol address with the first payload to yield a first low-level addressed payload;
transmitting the first low-level addressed payload to a first media converter for converting the first low-level addressed payload to a first fiber-optic signal;
transmitting the first fiber-optic signal from the first media converter to a second media converter for converting the first fiber-optic signal back into the first low-level addressed payload;
transmitting the first low-level addressed payload from the second media converter to the second component;
stripping the first low-level protocol address associated with the first low-level addressed payload to yield a second payload;
associating a second high-level addressing data to the second payload to yield a second high-level addressed payload; and
transmitting the second high-level addressed payload from the second component to the second device.

12. The method of claim 11, wherein the first media converter receives a spoofer fiber-optic signal at a receive port.

13. The method of claim 11, further comprising transmitting a second signal from the second device to the first device by:

receiving the second signal at the second component, the second signal having second high-level addressing data;

stripping the second high-level addressing data associated with the second signal to yield a third payload;

associating the second low-level protocol address with the third payload to yield a second low-level addressed payload;

transmitting the second low-level addressed payload from the second component to a third media converter for conversion to a second fiber-optic signal;

transmitting the second fiber-optic signal from the third media converter to a fourth media converter for conversion back to the second low-level addressed payload;

transmitting the second low-level addressed payload from the fourth media converter to the first component;

stripping the second low-level addressing data associated with the second low-level addressed payload to yield a fourth payload;

associating a third high-level address to the fourth payload to yield third high-level addressed payload; and transmitting the third high-level addressed payload from the first component to the first device.

14. The method of claim 13, further comprising:

providing a spoofing fiber-optic signal to the third media converter.

15. The method of claim 10, wherein a fifth media converter comprises a first spoofer media converter and a second spoofer media converter, wherein the first spoofer media converter provides a first spoofing fiber-optic signal to the second media converter receiver port and the second spoofer media converter provides a second spoofing fiber-optic signal to the third media converter receiving port.

16. The method of claim 15, wherein the fifth media converter is configured to disable a link loss forwarding feature.

17. The method of claim 10, wherein at least one of the first component and the second component stores low-level hardware addresses configured to identify at least one or more of an address, a protocol type, and a device name.

18. The method of claim 17, wherein the protocol type comprises at least one or more of Ethernet, TCP, UDP, UDP multicast, or other web service.

19. The method of claim 18, wherein the address comprises an address used to communicate a data stream from the first component to the second component through one or more of the first media converter, the second media converter, the third media converter and the fourth media converter.

20. The method of claim 11, wherein the first component is connected to the first device and the second component is connected to the second device.

* * * * *